US008843388B1

(12) United States Patent
Westfall et al.

(10) Patent No.: US 8,843,388 B1
(45) Date of Patent: Sep. 23, 2014

(54) METHOD AND SYSTEM FOR PROCESSING AN EMPLOYMENT APPLICATION

(75) Inventors: Robin Lanae Westfall, Bennington, NE (US); Wendi Lee Zeller, Elkhorn, NE (US)

(73) Assignee: West Corporation, Omaha, NE (US)

( * ) Notice: Subject to any disclaimer, the term of this patent is extended or adjusted under 35 U.S.C. 154(b) by 736 days.

(21) Appl. No.: 12/477,978

(22) Filed: Jun. 4, 2009

(51) Int. Cl.
*G06Q 10/00* (2012.01)
*G06Q 10/06* (2012.01)

(52) U.S. Cl.
CPC .... *G06Q 10/063112* (2013.01); *G06Q 10/0639* (2013.01)
USPC .......... 705/7.13; 705/7.14; 705/7.32; 706/45; 706/60

(58) Field of Classification Search
None
See application file for complete search history.

(56) References Cited

U.S. PATENT DOCUMENTS

| 5,164,897 | A | * | 11/1992 | Clark et al. ................... 705/321 |
| 5,326,270 | A | * | 7/1994 | Ostby et al. .................... 434/362 |
| 5,978,768 | A | * | 11/1999 | McGovern et al. ........... 705/321 |
| 6,272,467 | B1 | * | 8/2001 | Durand et al. .................... 705/5 |
| 7,080,057 | B2 | * | 7/2006 | Scarborough et al. .......... 706/60 |
| 7,162,433 | B1 | * | 1/2007 | Foroutan ...................... 705/7.42 |
| 7,310,626 | B2 | * | 12/2007 | Scarborough et al. .......... 706/60 |
| 7,321,858 | B2 | * | 1/2008 | Andino et al. .................. 705/12 |
| 7,472,097 | B1 | * | 12/2008 | Scarborough et al. .......... 706/26 |
| 7,555,441 | B2 | * | 6/2009 | Crow et al. ................... 705/7.14 |
| 7,593,860 | B2 | * | 9/2009 | Mitchell ...................... 705/7.29 |
| 7,606,778 | B2 | * | 10/2009 | Dewar ............................ 706/21 |
| 7,778,938 | B2 | * | 8/2010 | Stimac .......................... 705/321 |
| 7,792,685 | B2 | * | 9/2010 | Andino et al. ................. 705/1.1 |
| 7,873,533 | B2 | * | 1/2011 | Younger et al. .............. 705/7.14 |
| 7,991,635 | B2 | * | 8/2011 | Hartmann .................... 705/7.14 |
| 2001/0034630 | A1 | * | 10/2001 | Mayer et al. ....................... 705/7 |
| 2001/0042000 | A1 | * | 11/2001 | Defoor, Jr. ......................... 705/9 |
| 2001/0049674 | A1 | * | 12/2001 | Talib et al. ......................... 707/1 |
| 2002/0007301 | A1 | * | 1/2002 | Reuning .......................... 705/9 |
| 2002/0046199 | A1 | * | 4/2002 | Scarborough et al. .......... 706/21 |
| 2002/0128893 | A1 | * | 9/2002 | Farenden ........................... 705/8 |
| 2002/0128894 | A1 | * | 9/2002 | Farenden ........................... 705/8 |
| 2002/0165752 | A1 | * | 11/2002 | Miller .............................. 705/8 |
| 2003/0037251 | A1 | * | 2/2003 | Neece et al. ...................... 707/1 |
| 2003/0050816 | A1 | * | 3/2003 | Givens et al. .................... 705/7 |
| 2003/0105642 | A1 | * | 6/2003 | Andino et al. .................... 705/1 |
| 2003/0154406 | A1 | * | 8/2003 | Honarvar et al. ............. 713/201 |
| 2003/0195786 | A1 | * | 10/2003 | Dewar ............................. 705/8 |
| 2003/0200136 | A1 | * | 10/2003 | Dewar ............................ 705/11 |
| 2004/0267607 | A1 | * | 12/2004 | Maddux ......................... 705/11 |
| 2005/0080656 | A1 | * | 4/2005 | Crow et al. ...................... 705/8 |

(Continued)

OTHER PUBLICATIONS

Chang, Hae-Ching, and Raymond McLeod Jr. "The development of a computer-based decision support system for use in evaluating candidates for the position of programmer-analyst." ACM SIGCPR Computer Personnel 13.1 (1991): 9-19.*

(Continued)

*Primary Examiner* — Gurkanwaljit Singh

(57) ABSTRACT

A web-based employment application process is accessed by a candidate who browses, from a client terminal, to the website that hosts the process. From the website, maintained by a server, the candidate launches the program that executes and manages the process. During an online session, the candidate can navigate through the entire process, including the eligibility determination, resume submission and evaluation, and KSA assessment. Following the last stage of the process, an interview conducted by an interactive voice response system, the program evaluates the interview responses. If acceptable, the candidate is hired.

16 Claims, 88 Drawing Sheets

(56) References Cited

U.S. PATENT DOCUMENTS

| | | | |
|---|---|---|---|
| 2005/0080657 A1* | 4/2005 | Crow et al. | 705/8 |
| 2005/0114279 A1* | 5/2005 | Scarborough et al. | 706/21 |
| 2005/0246299 A1* | 11/2005 | Scarborough et al. | 706/21 |
| 2006/0235884 A1* | 10/2006 | Pfenninger et al. | 707/104.1 |
| 2007/0038486 A1* | 2/2007 | Mohn | 705/4 |
| 2007/0192172 A1* | 8/2007 | Milman | 705/11 |
| 2007/0233547 A1* | 10/2007 | Younger et al. | 705/9 |
| 2008/0052103 A1* | 2/2008 | Andino et al. | 705/1 |
| 2008/0172284 A1* | 7/2008 | Hartmann | 705/9 |
| 2008/0208907 A1* | 8/2008 | Tolve et al. | 707/104.1 |
| 2009/0024457 A1* | 1/2009 | Foroutan | 705/12 |
| 2009/0132313 A1* | 5/2009 | Chandler et al. | 705/7 |
| 2009/0187414 A1* | 7/2009 | Haskins et al. | 705/1 |
| 2009/0187446 A1* | 7/2009 | Dewar | 705/7 |
| 2011/0112977 A1* | 5/2011 | Baumgarten et al. | 705/321 |

OTHER PUBLICATIONS

Lim, Kee Yong, and John Brian Long. "A method for (recruiting) methods: facilitating human factors input to system design." Proceedings of the SIGCHI conference on Human factors in computing systems. ACM, 1992.*

Franklin, Dianna. "An effective way to hire technical staff." Proceedings of the 14th annual ACM SIGUCCS conference on User services: setting the direction. ACM, 1986.*

Lin, Chin-Yew, and Eduard Hovy. "Automatic evaluation of summaries using n-gram co-occurrence statistics." Proceedings of the 2003 Conference of the North American Chapter of the Association for Computational Linguistics on Human Language Technology-vol. 1. Association for Computational Linguistics, 2003.*

\* cited by examiner

EMPLOYMENT VERIFICATION

I verify that all of the information on my application is true, correct and complete. I understand that false or misleading information on this application may result in rejection of my application or, if hired, termination of employment, whenever discovered. I authorize investigation of all information contained in this application. I release all persons or companies from damages that result from liability from conduction such an investigation or responding to inquiries, and from any damages that result from furnishing or obtaining such information. As a condition of consideration for employment and hiring, I agree that all information which I receive during my employment relating to the business activities, program concepts, designs, trade secrets and propriety information of all West Companies will be maintained in confidence, will not be disclosed to any unauthorized person either during or after my employment, and will not be used by me in any manner adverse to the employment and that, if hired, I will be employed at-will and not for any specific time period. I further understand that I may resign or be terminated at any time without notice or procedures of the West Companies.

☐ Read and Acknowledged

I grant the West Companies permission to check any and all information submitted by me in connection with this Application and to make a thorough investigation of my past employment, education and activities. I authorize the employers listed in this Application or other required documents, unless otherwise indicated, to give the West Companies any and all information concerning my previous employment and other pertinent information they may have, personal or otherwise. I release the West Companies and all persons or entities supplying such information to the West Companies from all liability for any damage which may result from furnishing information to the West Companies.

☐ Read and Acknowledged

I, the undersigned applicant, agree that any claim or lawsuit relating to my service with any of the West Companies or any of its subsidiaries, must be filed no more than six (6) months after the date of employment action that is the subject of the claim or lawsuit. I waive any statute of limitations to the contrary.

☐ Read and Acknowledged

First Name:
Last Name:

[eSignature]  01/29/2008 9:37:38AM

18  In a selling situation, the salesperson should...

| A | Let the customer control the direction of the call. |
|---|---|
| B | Maintain conversational control and keep the call moving in the right direction toward a sale. |
| C | Maintain a friendly rapport with the customer by letting him or her talk as much as possible. |

My Response: [ ▾ ]

19  You are on the phone with a customer at the end of a sales call. The customer wants to purchase your service. What do you do?

| A | Take down the customer's information and thank her for buying your service. |
|---|---|
| B | Complete the sale and then mention other additional services your company offers and ask the customer if she would be interested in any of them. |
| C | Don't mention any additional services because it might spoil this sale. |

My Response: [ ▾ ]

20  You are a salesperson and have been placing calls all day to potential customers. You have had several successful calls that have turned into sales today, but in the last hour, the 12 people you've talked to have said "No" and many have even hung up on you. You only have 10 minutes until your shift ends. What do you do?

| A | Finish some paperwork and start fresh tomorrow. |
|---|---|
| B | Call another customer, because there is a possibility that there could be another sale for you. |
| C | Take it easy since you only have 10 minutes left in your shift. |

My Response: [ ▾ ]

My Response: [ ▼ ]

24  You have just completed your sales presentation and the customer tells you that even though he likes your product, he feels that it is too expensive. You should handle this objection by...

| A | going over the high points of your presentation one more time. |
| B | pointing out the benefits and value of the product and then ask him to buy the product. |
| C | trying to sell him a less expensive product. |

My Response: [ ▼ ]

25  On a sales call, in what order would you perform any of the following actions?
   I. Ask the customer to buy.
   II. Describe your company's products and their benefits and features.
   III. Identify customer needs and wants.
   IV. Convince the customer to buy your product.

| A | III, IV, II |
| B | II, IV, i |
| C | III, II, I |

My Response: [ ▼ ]

Questions 26 through 33
In this section, you will be given the various steps of an activity. Your job is to arrange the steps in order that they would normally be carried out.
Example: Select the sequence of events for the activity given by choosing the letter corresponding to the sequence.
1. Get dressed.
2. Get out of bed.

FIG. 10J

Questions 26 through 33
In this section, you will be given the various steps of an activity. Your job is to arrange the steps in order that they would normally be carried out.
Example: Select the sequence of events for the activity given by choosing the letter corresponding to the sequence.

1. Get dressed.
2. Get out of bed.
3. Alarm sounds.
4. Wake up.
5. Go to work.

A. 5 2 3 4 1
B. 3 4 2 1 5 - Correct Answer
C. 3 5 4 1 2
D. 3 1 2 4 5

26  Typing and saving a Microsoft Word document on the computer
   1. Turn off the computer.
   2. Type document.
   3. Turn on the computer.
   4. Save document.
   5. Open Microsoft Word.

| A | 3 2 5 4 1 |
| B | 3 1 4 2 5 |
| C | 3 5 2 4 1 |
| D | 3 4 5 1 2 |

My Response: [ ▾ ]

27  Eating dinner
   1. Prepare the food.
   2. Wash dishes.
   3. Put dishes in cupboard.
   4. Carry dishes to sink.
   5. Eat the food.

FIG. 10K

```
West - ER KSA Test - Microsoft Internet Explorer
File  Edit  View  Favorites  Tools  Help
Back ▼   ▼  [icons]  Search  Favorites  [icons]
Address: https://wahapp.west.com/servlets/iclientservlet/HRPRD_WAHAPP/?ICType=Panel&Menu=ROLE_APPLICANT&Market=GBL&PanelGroupName=W_WAHE_ESIGNATURE
```

Response:
_____

27  Eating dinner
   1. Prepare the food.
   2. Wash dishes.
   3. Put dishes in cupboard.
   4. Carry dishes to sink.
   5. Eat the food.

A  2 1 5 4 3
   B  1 3 4 2 5
   C  3 5 4 1 2
   D  1 5 4 2 3

My Response: [▼]

_____

28  Buying gasoline
   1. Drive to the gas station.
   2. Unscrew the gas cap.
   3. Pull up to the pump.
   4. Fill the tank and pay for gas.
   5. Drive away from the station.

A  1 2 3 4 5
   B  1 3 2 4 5
   C  3 2 4 1 5
   D  3 1 2 4 5

My Response: [▼]

_____

29  Ordering food at a fast food restaurant
   1. Eat your food

Done | | | | 🔒 Internet

FIG. 10L

29 Ordering food at a fast food restaurant
   1. Eat your food.
   2. Order your food.
   3. Stand in line at the counter.
   4. Wait until it is your turn to order.
   5. Pay for your order.

A  5 3 4 2 1
   B  3 4 5 1 2
   C  3 4 2 5 1
   D  4 3 2 5 1

My Response: [ ▼ ]

30 Making toast
   1. Put the bread in the toaster.
   2. Push down the lever.
   3. Plug in the toaster.
   4. Eat the toast.
   5. Wait for the toast to brown.

A  1 2 3 4 5
   B  3 1 2 5 4
   C  3 2 1 4 5
   D  3 2 1 5 4

My Response: [ ▼ ]

31 Taking and developing a photograph
   1. Develop film.
   2. Find camera.
   3. Take photograph.
   4. Load film into camera.

Applicant Form Dashboard - Microsoft Internet Explorer

File Edit View Favorites Tools Help

Address: https://forms.west.com/servlets/iclientservlet/HRPRD_WFORMS/?ICType=Panel&Menu=ROLE_APPLICANT&Market=GBLBPanelGroupName=ER_APPLICANT_HOME west

New Hire Forms Checklist

Below is a checklist of forms we request/require you complete prior to beginning employment with West At Home. Completion of these forms will take approximately 30 minutes. Below is a description of each area. If you have any questions, please email us at: WAHNewHire@West.com

- eSignature ✗ = form needs to be completed
- ✓ = form completed
- New Hire Form Form title to be completed. Please click on the title to access the form.
- Required This form is required prior to beginning employment.
- Last Update This is the date you updated/completed the form.

| eSignature | New Hire Form | Required | Last Updated |
|---|---|---|---|
| ✗ | Background Investigation Form | Y | 09/04/2008 9:36:56AM |
| ✗ | Disability Survey | N | 09/04/2008 9:36:56AM |
| ✗ | Equal Employment Opportunity | N | 09/04/2008 9:36:56AM |
| ✗ | Statement of Understanding | Y | 09/04/2008 9:36:56AM |
| ✗ | Form I-9 | Y | 09/04/2008 9:36:56AM |
| ✗ | Proof of ID and Employment Doc | Y | 09/04/2008 9:36:56AM |
| ✗ | Work Authorization Notary Form | Y | 09/04/2008 9:36:56AM |
| ✗ | Workers Comp Decline | Y | 09/04/2008 9:36:56AM |
| ✗ | Emergency Contact Info | Y | 09/04/2008 9:36:56AM |
| ✗ | Tax Forms | Y | 09/04/2008 9:36:56AM |

FIG. 13F

AUTHORIZATION TO CONDUCT A BACKGROUND INVESTIGATION

First Name:                          Middle Initial:

Last Name:                           Prev/Maiden Name:

Address 1:

Address 2:

City:                                State:           Postal Code:

Birthdate:                           Social Security #:

Have you ever been on probation, parole, or deferred adjudication?    ○ Yes   ● No

| Place of Residence/Employment over last 7 years | | |
|---|---|---|
| City: | State: | |

In connection with my application for employment, I authorize any employer, educational institution, law enforcement organization, state and federal government agency, or other information service bureau who is contacted to release information regarding my character, performance, qualifications, background, prior history, work experience, nature, scope of duties and reason for termination of past employment to requesting Employer or its agent and release all parties involved in providing said information from any responsibility or liability.

I also authorize the release of my driving history, criminal records, and investigative consumer report and understand that it may contain information about my background, mode of living, character, and personal reputation. A copy of the Consumer Investigative Report may be obtained by contacting Acxiom. I acknowledge that a telephone call, facsimile or photographic copy shall be as valid as the original. I understand that the decision to hire is solely that of the Employer, and although said decision may be based upon information gathered by a consumer investigative agency, I release consumer investigative agency from any and all liability as related to the Employer's decision.

Such inquiries may be made by written communications, by telephone, in person, or by other means.

FIG. 14A

DISABILITY SURVEY

As an equal opportunity employer, West strives to provide fair treatment to all employees and job applicants. To assist us in meeting this objective, we invite you to complete this survey. Participation is voluntary.

If you believe you qualify as a disabled person (as defined below) and would like to be considered under the Americans with Disabilities Act, please complete the questions below. Any health information you provide will be kept confidential except that:

a. Managers and supervisors may be told of any accommodations needed or limitations of the work of disabled employees
   b. Safety personnel may be told if emergency precautions or treatment might be needed
   c. Officials investigating compliance with government regulations may be informed

Who is Disabled?
An individual is considered to have a disability if that individual meets one of the following criteria which substantially limits one or more of that person's major life activities.

a. A physical or mental impairment; examples: vision, hearing or speech impairment, absence of a limb, paralysis, learning disability
   b. A history of such impairment; examples: residual polio, controlled diabetes or epilepsy
   c. Is regarded as having such an impairment; examples: limp, disfigurement that does not result in an actual physical limitation Note: The examples given in each category are not all inclusive.

1. Please name or describe the nature of your disability:

2. Are you aware of any work-related problem concerning your disability that the Company could reasonably take action to eliminate?

3. Do you feel that your abilities could be more fully utilized with an accommodation that the Company could reasonably provide? If so, please describe:

Schedule Adherence

14. I understand that schedule adherence is critical to West's and my success; therefore, I am expected to meet all schedule adherence requirements by working all of the scheduled hours I have chosen.

15. I also understand that due to customer call volumes, schedule changes are not guaranteed. If I have a schedule conflict that prevents me from being able to meet scheduled hours, I must immediately post my shift(s) for trade.

a. If a conflict arises within 24 hours of my scheduled hours, I must post the scheduled hours for trade. Any scheduled hours not picked up will affect my schedule adherence
    b. If a conflict arises prior to 24 hours of my scheduled hours, I must immediately delete the scheduled hours.

16. I am aware that available and/or scheduled hours may vary from week to week and that my schedule and/or available hours may be changed by Scheduling at any time during my employment. In addition, I am aware that I may be released early from my shift at any time, or I may be held over to sufficiently complete any incoming business.

Sign In / Work End

Hourly, non-exempt employees must maintain a record of actual time worked. To meet this requirement, I am required to utilize the appropriate "sign in" and "work end" functions within the call taking environment. Failure to maintain accurate time records could result in paycheck errors as well as disciplinary action.

17. I understand that I must adhere to the following Time Recording Rules:

a. "Sign In" and "Work End"
       I must "Sign In" at the beginning of a shift
       I must use "Work End" for unpaid breaks and meal breaks and
       "Sign In" when returning from unpaid breaks and meal breaks
       I must use "Work End" at the end of a shift
    b. I should take care of personal needs (hang up coat, obtain refreshment, use the restroom, etc.) prior to using "Sign In".
    c. Failure to follow the proper time record procedures will result in disciplinary action. Any problem or discrepancy pertaining to the time records must be reported immediately.
    d. Falsifying time records or another employee's time records are grounds for immediate dismissal.

Work Area and Safety

18. Home offices must be clean and free from obstructions. The work area must be free of hazardous materials. As a WAH employee, I am responsible for ensuring my home complies with all health and safety requirements.

FIG. 14G

19. I am responsible for absorbing any costs related to remodeling and initial set-up (e.g. furniture) of the designated work space. I agree to limit access to the designated work space by not admitting personal guests in the area while I am working or when any West, contact or client system is running.

20. If I incur a work-related injury while working at home, worker's compensation law and rules apply. I acknowledge that I must notify my supervisor or Employee Relations immediately and complete all necessary and/or requested documents regarding the injury in a timely manner.

Additional Expectations and Responsibilities

21. I will manage dependent care and personal responsibilities in a way that allows me to successfully fulfill my job responsibilities.

22. I understand that as an employee of West, I may have opportunities to purchase products or receive products from clients of the Company. Selling or reselling of client products is strictly prohibited and may be considered a breach of the confidentiality agreement signed by me. I cannot advertise any product for sale that was purchased using the Company Discount program. This advertising includes, but is not limited to, magazines, newspapers, and the internet.

23. I understand that if I wish to terminate employment and remain in good standing, or be considered as re-hirable, I should provide my Team Leader at least fourteen (14) days written notice.

24. WAH reserves the right to change any term and condition of this SOU based on business needs.

25. I understand that West has provided a Work At Home policy manual for my review. I understand that I am responsible for adhering to all the policies contained therein and if at anytime I am uncertain as to the intent of a policy, I must contact Employee Relations. If at any time I do not comply with a policy, immediate disciplinary action may result up to and including termination of employment.

26. I understand that West has provided an Information Security Policies and Standards Manual for my review. I understand that I am responsible for adhering to all the policies contained therein and if at anytime I am uncertain as to the intent of a policy, I must contact Employee Relations. If at any time I do not comply with an Information Security policy or Standard policy, immediate disciplinary action may result up to and including termination of employment.

27. All other terms and conditions of this SOU notwithstanding, employment is at will. West and myself, the employee, retain the right to terminate the employment relationship at any time and for any or no reason with or without notice.

This Agreement is applicable to all Work at Home Employees and the language used is not intended to create or constitute an employment contract. The expectations and responsibilities presented here are subject to applicable detailed interpretation and Company practices and supersede all oral statements and representations. This Agreement

FIG. 14H

25. I understand that West has provided a Work At Home policy manual for my review. I understand that I am responsible for adhering to all the policies contained therein and if at anytime I am uncertain as to the intent of a policy, I must contact Employee Relations. If at any time I do not comply with a policy, immediate disciplinary action may result up to and including termination of employment.

26. I understand that West has provided an Information Security Policies and Standards Manual for my review. I understand that I am responsible for adhering to all the policies contained therein and if at anytime I am uncertain as to the intent of a policy, I must contact Employee Relations. If at any time I do not comply with an Information Security policy or Standard policy, immediate disciplinary action may result up to and including termination of employment.

27. All other terms and conditions of this SOU notwithstanding, employment is at will. West and myself, the employee, retain the right to terminate the employment relationship at any time and for any or no reason with or without notice.

This Agreement is applicable to all Work at Home Employees and the language used is not intended to create or constitute an employment contract. The expectations and responsibilities presented here are subject to applicable detailed interpretation and Company practices and supersede all oral statements and representations. This Agreement is also subject to application in accordance with local, state and federal/national law as appropriate to the jurisdiction where the employee is located. In the event of a conflict, make final decisions concerning the interpretation and application of any policies, procedure, and to change or discontinue them at any time.

This Agreement shall be construed and enforced in accordance with the laws of the State of Nebraska. In case any one or more of the provisions of this Agreement is held to be invalid, illegal or unenforceable in any respect, such invalidity, illegality, or unenforceability shall not affect any other provision hereof, and this Agreement shall be construed as if such invalid, illegal, or unenforceable provision had never been contained herein.

Employee/Candidate agrees that any legal action involving this Agreement in any way will be instituted in the State of Nebraska, and Employee/Candidate consents to jurisdiction of the courts of the State of Nebraska over his or her person for the purposes of any such legal action.

By signing this Agreement I agree to comply with the above noted activities, expectations and responsibilities outlined in this document.

eSignature

Back to Dashboard

Employment Eligibility Verification

INSTRUCTIONS
PLEASE READ ALL INSTRUCTIONS CAREFULLY BEFORE COMPLETING THIS FORM.

Anti-Discrimination Notice. It is illegal to discriminate against any individual (other than an alien not authorized to work in the U.S.) in hiring, discharging, or recruiting or referring for a fee because of that individual's national origin or citizenship status. It is illegal to discriminate against work eligible individuals. Employers CANNOT specify which document(s) they will accept from an employee. The refusal to hire an individual because the documents presented have a future expiration date may also constitute illegal discrimination.

What Is the Purpose of This Form?
The purpose of this form is to document that each new employee (both citizen and non-citizen) hired after November 6, 1986 is authorized to work in the United States.

When Should the Form I-9 Be Used?
All employees, citizens and noncitizens, hired after November 6, 1986 and working in the United States must complete a Form I-9.

Filling Out the Form I-9

Section 1, Employee: This part of the form must be completed at the time of hire, which is the actual beginning of employment. Providing the Social Security number is voluntary, except for employees hired by employers participating in the USCIS Electronic Employment Eligibility Verification Program (E-Verify). The employer is responsible for ensuring that Section 1 is timely and properly completed.

Preparer/Translator Certification. The Preparer/Translator Certification must be completed if Section 1 is prepared by a person other than the employee. A preparer/translator may be used only when the employee is unable to complete Section 1 on his/her own. However, the employee must still sign Section 1 personally.

Section 2, Employer: For the purpose of completing this form, the term "employer" means all employees including those recruiters and referrers for a fee who are agricultural associations, agricultural employers or farm labor contractors.

Employers must complete Section 2 by examining evidence of identity and employment eligibility within three (3) business days of the date employment begins. If employees are

FIG. 14L

Employers must complete Section 2 by examining evidence of identity and employment eligibility within three (3) business days of the date employment begins. If employees are authorized to work but are unable to present the required document(s) within three business days, they must present a receipt for the application of the document(s) within three business days and the actual document(s) within ninety (90) days. However, if employers hire individuals for a duration of less than three business days, Section 2 must be completed at the time employment begins. Employers must record:

1. Document title;
2. Issuing authority;
3. Document number;
4. Expiration date, if any; and
5. The date employment begins.

Employers must sign and date the certification. Employees must present original documents. Employers may, but are not required to, photocopy the document(s) presented. These photocopies may only be used for the verification process and must be retained with the I-9. However, employers are still responsible for completing and retaining the Form I-9.

Section 3, Updating and Reverification: Employers must complete Section 3 when updating and/or reverifying the Form I-9. Employers must reverify employment eligibility of their employees on or before the expiration date recorded in Section 1. Employers CANNOT specify which document(s) they will accept from an employee.

A. If an employee's name has changed at the time this form is being updated/reverified, complete Block A.

B. If an employee is rehired within three (3) years of the date this form was originally completed and the employee is still eligible to be employed on the same basis as previously indicated on this form (updating), complete Block B and the signature block.

C. If an employee is rehired within three (3) years of the date this form was originally completed and the employee's work authorization has expired or if a current employee's work authorization is about to expire (reverification), complete Block B and:

1. Examine any document that reflects that the employee is authorized to work in the U.S. (see List A or C);
  2. Record the document title, document number and expiration date (if any) in Block C, and
  3. Complete the signature block.

What Is the Filing Fee?

There is no associated filing fee for completing the Form I-9. This form is not filed with USCIS or any government agency. The Form I-9 must be retained by the employer and

FIG. 14M

Notary Public Instructions for Work Authorization Verification Form

Upon acceptance of our offer with West At Home, we need to ensure you have the appropriate work authorization.

Please submit the appropriate proof of work authorization documents which have been viewed / notarized by a Notary Public via the "Work Authorization Verification" form. BOTH (copies of) proof of work authorization AND notarized Work Authorization Verification form must be submitted to West At Home Human Resources within 3 days from acceptance of employment. You are required to have the original proof of work authorization document(s) viewed by a Notary Public. Many financial institutions offer notary services; if you are unsure of where to find a notary, please refer to your city's phone directory or contact a financial institution.

To expedite the processing of your paperwork, please send the Proof of Work Authorization Documents AND the Work Authorization Verification form to us at the same time.

Proof of Work Authorization Documents that are acceptable: On the following page you will see "Lists of Acceptable Documents" which contains a list of acceptable documents as defined by the Bureau of Citizenship & Immigration Services. Please review this list and provide West At Home Human Resources with (a copy of) a document from List A OR (copies of) a document from List B and List C. Documentation provided in this list are the ONLY documents that establish employment eligibility; nothing outside of this list is acceptable.

Both (copies of) proof of work authorization or receipts presented for authorization documentation AND notarized Work Authorization Verification form must be sent by one of the methods outlined below:

- Scan and e-mail to: WAHNewHire@west.com

- Fax to: 402-577-8205

- Mail To: West At Home LLC
  ATTN: WAH-HR
  P.O. Box 4007
  Omaha, NE 68104

Again, we ask that you provide the documentation as soon as possible to West At Home Human Resources and within 3 days from acceptance of employment. If this documentation is not received within this timeframe you may have to reapply with West At Home.

FIG. 14P

FIG. 14Q bearing the same name as the passport and containing an endorsement of the alien's nonimmigrant status, if that status authorizes the alien to work for the employer 4. Voter's registration card
5. U.S. Military card or draft card
6. Military dependent's ID card
7. U.S. Coast Guard Merchant Mariner Card
8. Native American tribal document
9. Driver's license issued by a Canadian government authority (Form I-197)
6. ID Card for use of Resident Citizen in the United States (Form I-179)
7. Unexpired employment authorization document issued by DHS (other than those listed under List A)

For persons under age 18 who are unable to present a document listed above:

10. School record or report card
11. Clinic, doctor or hospital record
12. Day-care or nursery school record Illustrations of many of these documents appear in Part 8 of the Handbook for Employers (M-274)

By signing these instructions, I agree to comply with the above instructions, expectations, and responsibilities outlined in this document.

[eSignature]

Back to Dashboard

WORKER'S COMPENSATION NOTICE OF OPTION TO DECLINE

West has worker's compensation insurance coverage to protect you. You can get more information about your worker's compensation rights from your state's office of the Worker's Compensation Commission.

If you are employed in a state that does allow the choice to decline Worker's Compensation Insurance coverage ("opt out"), you may elect to retain your common law right of action, if no later than five days after beginning employment, you notify West in writing that you wish to retain your common law right to recover damages for personal injury. Employees in the state of Kentucky who chose to opt out must complete Form 4. Please contact Employee Relations at WAHNewHire@west.com to obtain a copy of Form 4.

If your state allows the election of common law rights of action and you notify West in writing within five days after beginning employment, you cannot obtain Worker's Compensation income or medical benefits if you are injured.

For possible opting out information please contact the Worker's Compensation Commission by calling:

| Kentucky | (502) 564-5550 ext 4450 |
| Missouri | (800) 775-2667 |
| New Jersey | (609) 292-2515 |
| Texas | (800) 252-7031 |

For all other states, Worker's Compensation rights can be obtained by calling:

| | |
|---|---|
| Alabama (800) 528-5166 | Michigan (888) 396-5041 |
| Arizona<br>Phoenix (602) 542-5241<br>Tuscon (520) 628-5188 | Minnesota (800) 342-5354 |
| Arkansas (800)622-4472 | Mississippi (866) 473 - 6922 |
| Colorado (888) 390-7936 | Nebraska (402) 471-6468 |
| Florida (850) 413-1610 | North Carolina (800) 688-8349 |
| Georgia (800) 533-0682 | Oklahoma (800) 522-8210 |
| Illinois (866) 352-3033 | Rhode Island (401) 462-8100 |
| Indiana (800) 824-COMP | South Carolina (803) 737-5700 |
| Iowa (515) 281-5387 | Tennessee (800) 332-2667 |
| Kansas (785) 296-8464 | Utah (801) 530-6800 |
| Louisiana (225) 342-7555 | Virginia (877) 664-2566 |

FIG. 14V if you are employed in a state that does not allow the choice to decline Worker's
Compensation Insurance coverage ("opt out"), you may elect to retain your common law
right of action, if no later than five days after beginning employment, you notify West in
writing that you wish to retain your common law right to recover damages for personal
injury. Employees in the state of Kentucky who chose to opt out must complete Form 4.
Please contact Employee Relations at WAHNewHire@west.com to obtain a copy of Form 4.

If your state allows the election of common law rights of action and you notify West in
writing within five days after beginning employment, you cannot obtain Worker's
Compensation income or medical benefits if you are injured.

For possible opting out information please contact the Worker's Compensation Commission
by calling:

Kentucky    (502) 564-5550 ext 4450
Missouri    (800) 775-2667
New Jersey  (609) 292-2515
Texas       (800) 252-7031

For all other states, Worker's Compensation rights can be obtained by calling:

| Alabama (800) 528-5166 | Michigan (888) 396-5041 |
| Arizona<br>Phoenix (602) 542-5241<br>Tuscon (520) 628-5188 | Minnesota (800) 342-5354 |
| Arkansas (800)662-4472 | Mississippi (866) 473 - 6922 |
| Colorado (888) 390-7936 | Nebraska (402) 471-6468 |
| Florida (850) 413-1610 | North Carolina (800) 688-8349 |
| Georgia (800) 533-0682 | Oklahoma (800) 522-8210 |
| Illinois (866) 352-3033 | Rhode Island (401) 462-8100 |
| Indiana (800) 824-COMP | South Carolina (803) 737-5700 |
| Iowa (515) 281-5387 | Tennessee (800) 332-2667 |
| Kansas (785) 296-8484 | Utah (801) 530-6800 |
| Louisiana (225) 342-7555 | Virginia (877) 664-2566 |
| Maryland (800) 492-0479 | West Virginia (866) 452-7425 |

To acknowledge the receipt and review of the Worker's Compensation Notice of Option to
Decline please complete the automatic signature option below.

eSignature

Back to Dashboard

FIG. 14W

METHOD AND SYSTEM FOR PROCESSING AN EMPLOYMENT APPLICATION

BACKGROUND OF THE INVENTION

1. Field of the Invention

The present invention relates to an employment application process, and, more particularly, to a method and system for providing an interactive, online, web-based computing platform enabling a candidate to submit a complete application for employment and to receive a real-time evaluation of the application.

2. Description of the Related Art

Efficient human resource management poses a challenge to employers that must contend with a workforce having high turnover and a changing business environment that requires employees with evolving skill sets. As the demographic profile of the employee changes, in response to shifts in the business environment that specify the need for new and different employee skills, employers must be able to adapt to these circumstances and find employees that fit into the business structure.

In order to respond to changes in the business environment, particularly in a global economy where specialized intellectual capital is in increasing demand, employers must continue to concentrate efforts on employee recruitment that identifies candidates who possess the skills that are currently in need. Employers are facing increased pressure to fill positions as competition intensifies for a shrinking labor pool. In order to facilitate the recruitment and hiring process, it is necessary to develop an efficient, streamlined system for identifying suitable candidates according to the current business requirements.

The traditional model of recruitment, involving the collection and processing of resumes, reference checking, and in-person interviewing, is a methodical and time-consuming effort that typically does not meet the more time-sensitive demands of modern businesses that require positions to be filled more rapidly. The review process conducted by human resource personnel can be inconsistent and too subjective, in the absence of uniform standards for evaluating candidates. Oftentimes, candidate evaluation undergoes a series of reviews within the hiring hierarchy, adding further delay and duplicating efforts.

SUMMARY OF THE INVENTION

According to the present invention, a method evaluates an applicant for employment. According to the method, first data relating to qualifications of the applicant are received from the applicant via an interactive electronic medium. Second data, which are suitable for making an assessment of the applicant relative to work performance competency, are also received from the applicant. The applicant furnishes the first data and the second data in response to first and second queries, respectively, which are communicated via the interactive medium. The first and second data are evaluated according to predetermined criteria. Based on the results of the first data evaluation and the second data evaluation, a determination is made as to the suitability of the applicant for employment.

The first data includes resume information, and the second data includes information indicating knowledge, skills, and abilities of the applicant.

In one form, the method further includes receiving third data relating to employment eligibility of the applicant, in response to third queries communicated via the interactive medium. The third data is used to determine an eligibility of the applicant for employment. The first query communication and the second query communication are carried out only upon a satisfactory determination of eligibility.

The method further includes conducting an automated interview with the applicant and generating interview data representative thereof. The interview data is evaluated and a hiring decision is generated, based on the results of the interview data evaluation.

In another form, the method further includes the generation of user-interactive web pages to facilitate communication of the first and second queries to the applicant, and to facilitate collection of the first and second data submitted by the applicant in response to the queries.

According to another embodiment, a system includes a means for generating queries relevant to an application for employment; a means for enabling an applicant for employment to provide responses to the queries; and a means, including a computing facility, for processing and evaluating the applicant responses to determine a suitability of the applicant for employment.

The generating means includes a means for presenting first queries relating to eligibility for employment, second queries relating to qualifications, and third queries relating to an assessment regarding work performance competency. The evaluating means includes a means, responsive to the applicant responses to the first queries, for providing a determination of eligibility of the applicant for employment. The applicant responses to the second and third queries are compared to predetermined criteria.

In a web-based configuration, the generating means includes a server, and the enabling means includes a client connected to the server. The processing and evaluating means includes an executable program placed under the control of the server. The queries are communicated in the form of web pages generated by the server. The client accesses the web pages using a graphical user interface.

The system further includes a means, having an interactive voice response system, for conducting an automated interview with the applicant, and for generating interview data representative thereof. The interview data is evaluated, and a hiring decision is generated based on the results of the interview data evaluation.

According to another embodiment, there is provided a computer-readable medium having computer-executable instructions for execution by a processor. When executed, the instructions cause the processor to generate queries relevant to an application for employment; receive responses to the queries from an applicant seeking employment; and process and evaluate the responses to determine a suitability of the applicant for employment.

The instructions further cause the processor to generate queries relevant to eligibility for employment; receive responses to the eligibility queries; and render an eligibility determination based on the eligibility query responses.

The instructions further cause the processor to generate first queries relating to applicant qualifications; generate second queries relating to an assessment of the applicant relative to work performance competency; receive responses to the first and second queries; and receive information representative of an interview conducted with the applicant. The processor evaluates the query responses and the interview information to determine a suitability of the applicant for employment.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 13A-F are GUI screen shots of web pages illustrating various aspects of the process of FIG. 5 concerning an offer of employment and the demand for completion of new hire forms;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
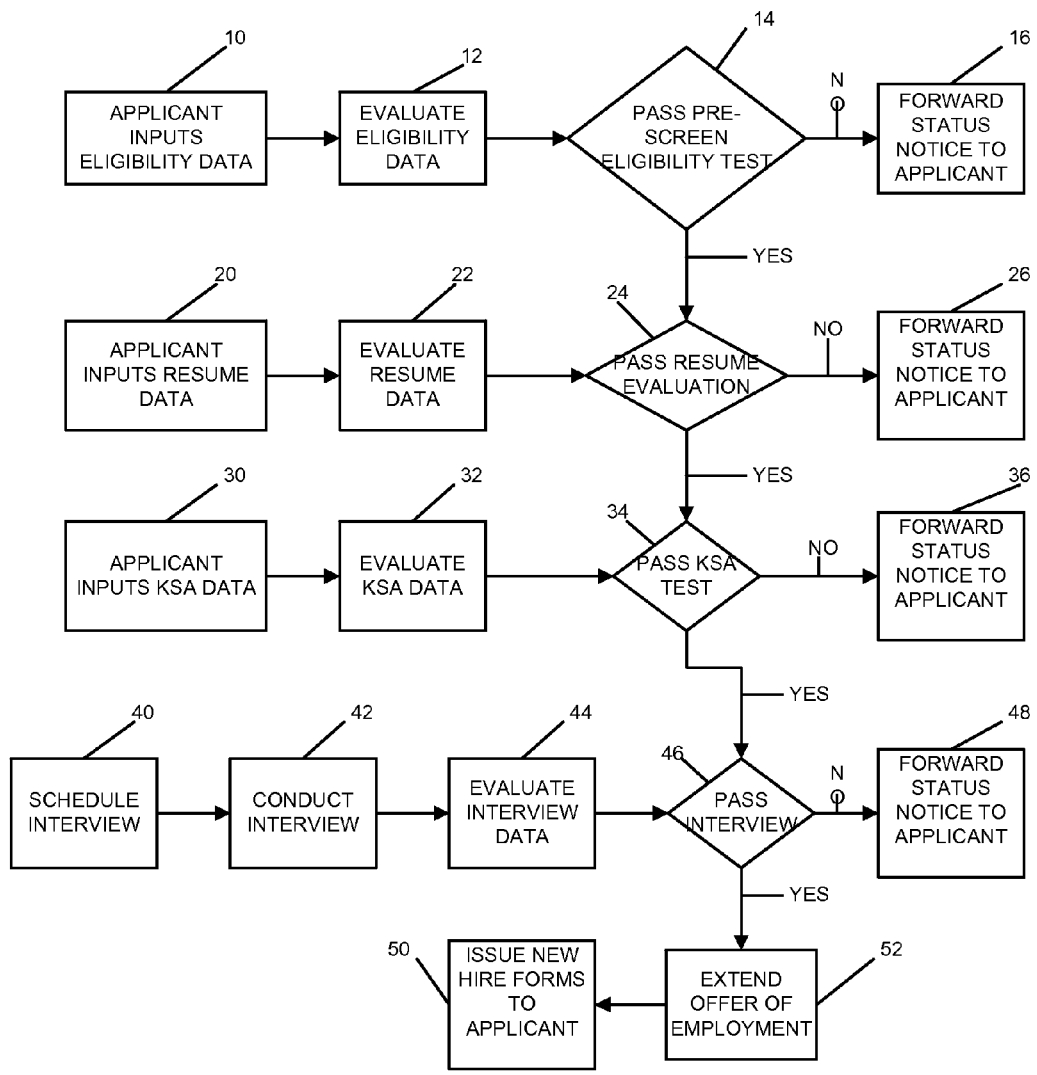
FIG. 1 is a flowchart of an employment application process, according to one form of the present invention.

Referring to FIG. 1, a flowchart of an employment application process is shown, according to the present invention. The process is organized according to a series of functions or operations each corresponding to a distinct stage in the application process. For example, according to one form of the invention, the process is logically ordered to perform, in sequence, a determination of eligibility; an evaluation of resume (qualification) data submitted by the candidate; an assessment of KSA (knowledge, skills, and abilities) data; and an evaluation of responses proffered by the candidate during an automated interview.

Figure 2:
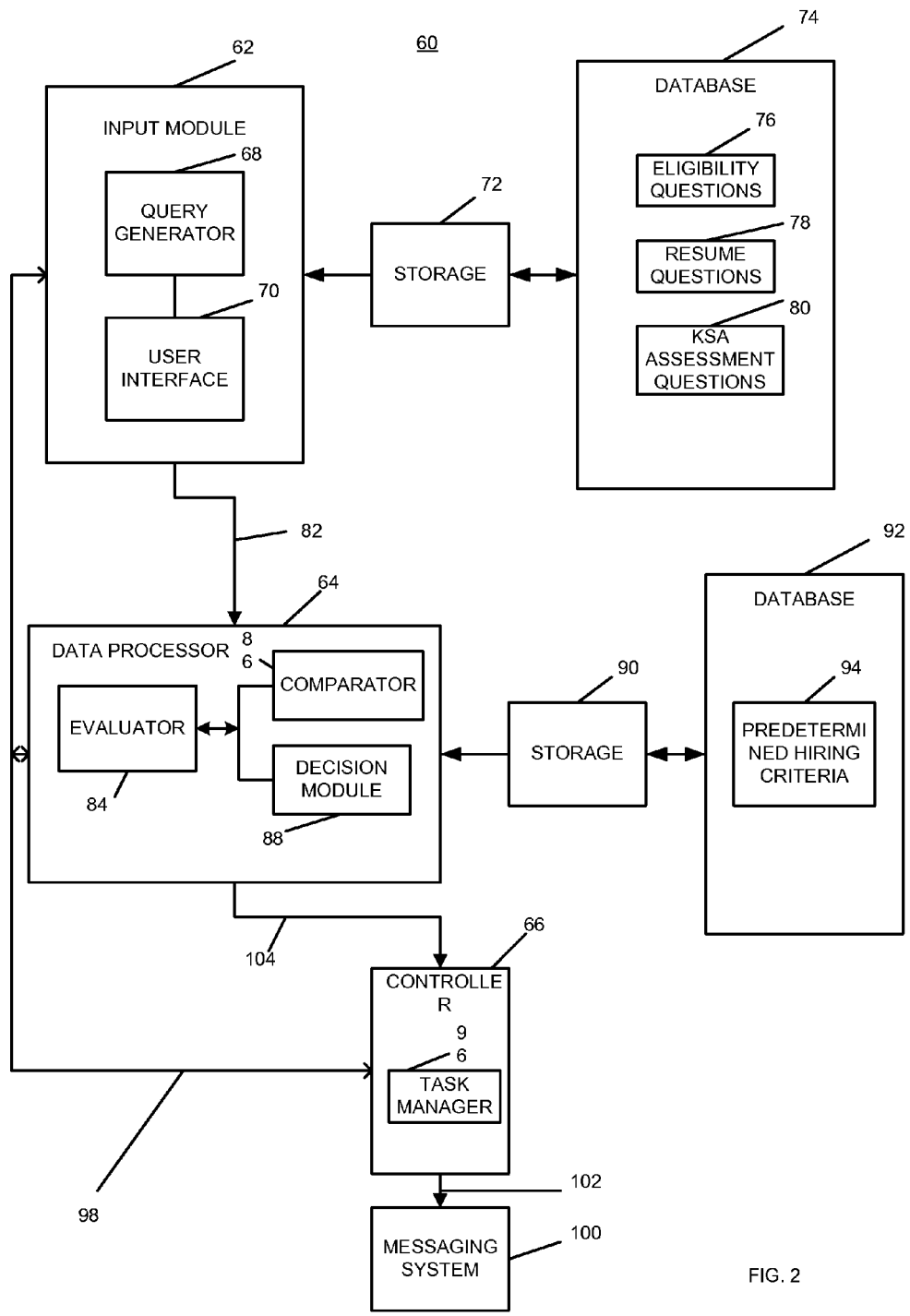
FIGS. 2 and 3 are block diagram illustrations of a system for use with the process of FIG. 1, according to another form of the present invention.
Figure 3:
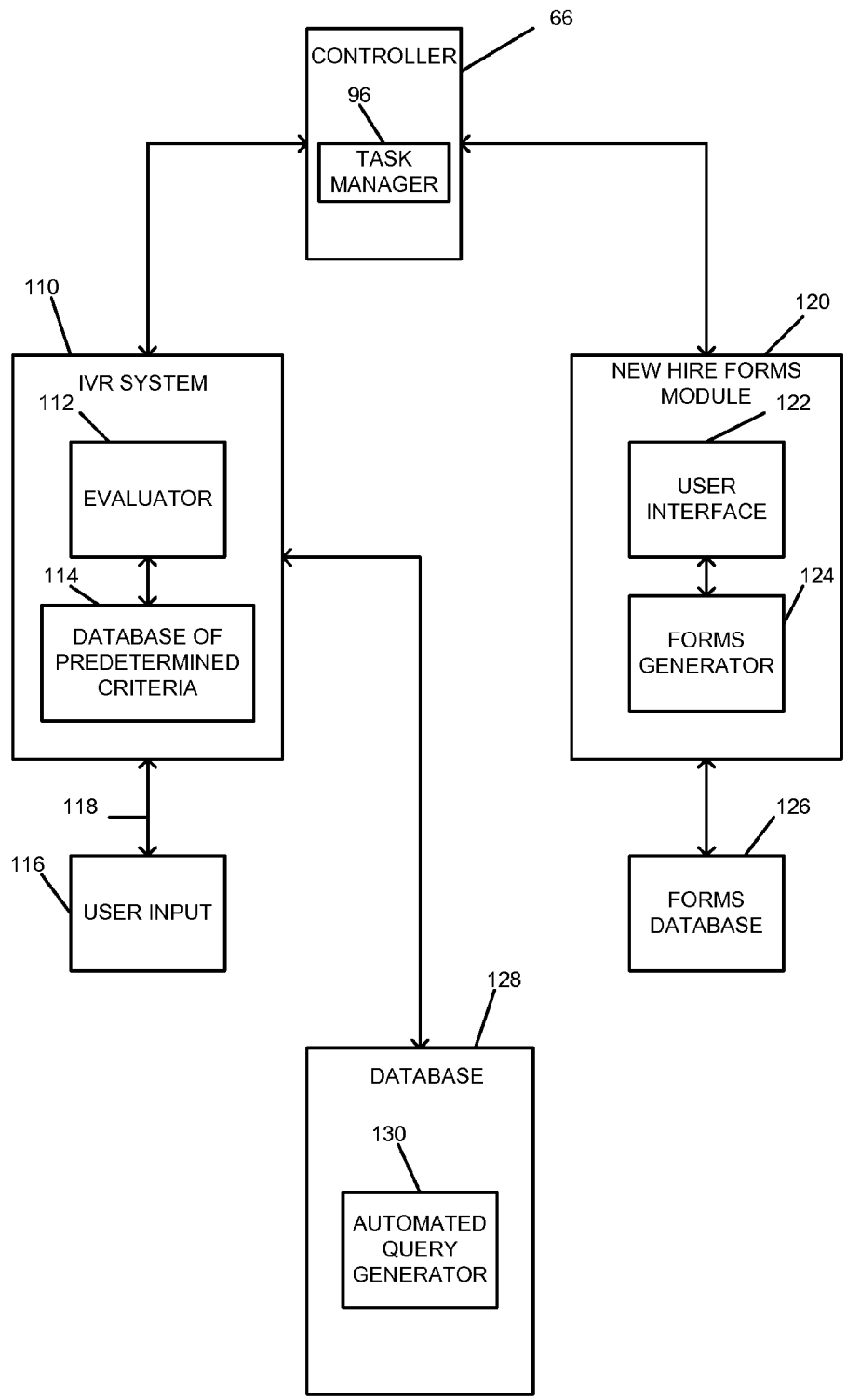
Figure 4:
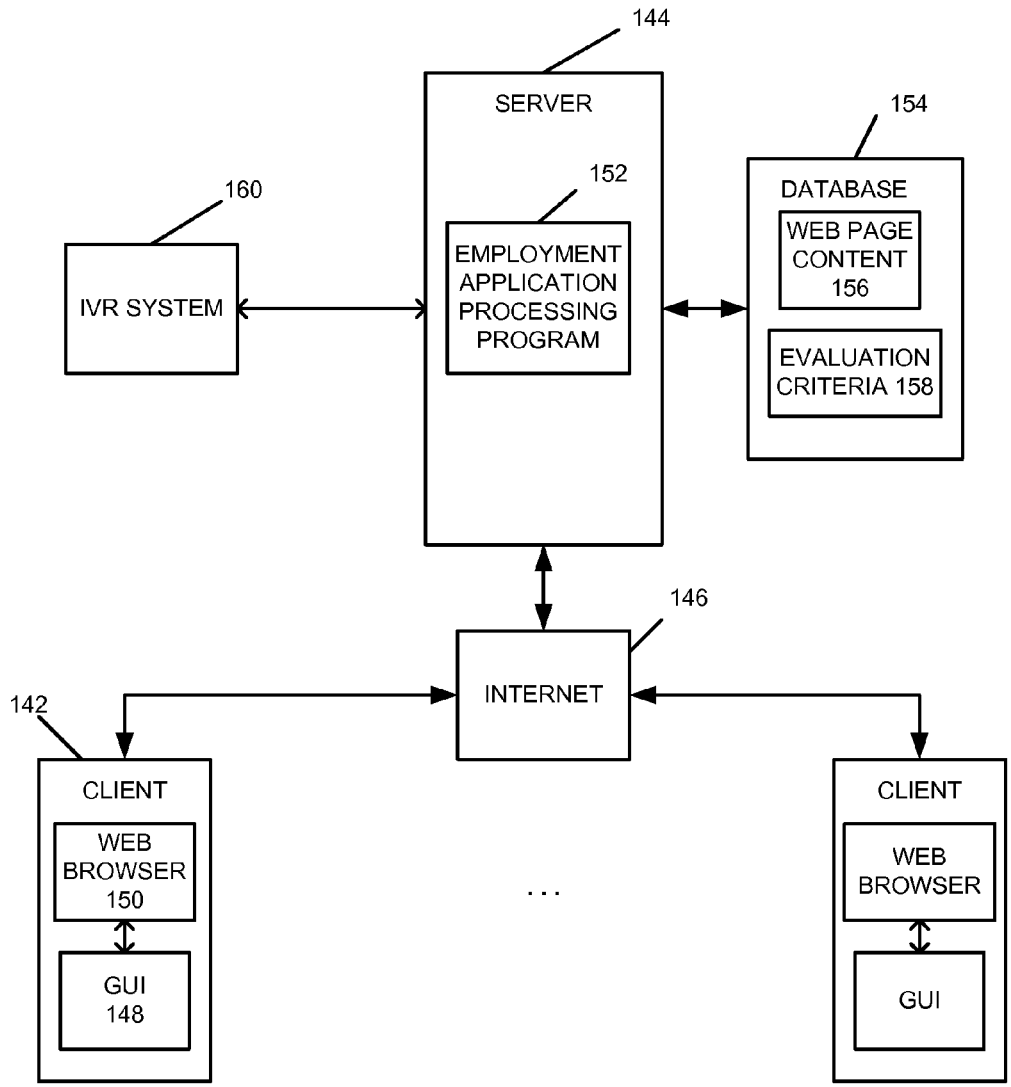
FIG. 4 is a block diagram illustration of an internet-based system for use with the process of FIG. 1, according to another form of the present invention.

Brief mention is first made to the various embodiments of the invention that implement the employment application procedure, set forth in FIGS. 2-4.

In one embodiment, discussed in connection with FIGS. 2-3, the process is implemented using an electronic configuration, such as a computing environment. A computer implementation facilitates the electronic submission, processing, evaluation, and management of the employment application information that originates from the candidate. The use of electronic means enables the application process to be entirely automated.

In another embodiment, discussed in connection with FIG. 4, the process is implemented using an internet-enabled, web-based configuration. The entire application process can be conducted online by the candidate during a communication session between a user-side client and a server. The server hosts a website that maintains a program for facilitating the employment application process. The candidate can access the website, and then launch the application process, by using any suitable means at a client terminal, such as a graphical user interface. The online application experience is facilitated through the use of appropriately constructed web pages having the proper content.

Returning now to the application process of FIG. 1, it is first necessary to determine whether the candidate is eligible for employment, prior to any consideration of qualifications. To facilitate this requirement, the applicant submits eligibility data (step 10). In a preferred form, the process utilizes a query-response format to elicit the required information from the candidate. For example, the submission of eligibility data is prompted by a series of questions, interrogatories, or other such prompts that specify the type of data being requested.

Any suitable means can be provided for facilitating the presentation of such prompts and the submission of responsive information. For example, a graphical user interface with appropriate input fields can be used to allow a candidate to enter information, or, if a request is posed in the form of predetermined options, a menu can be used to make the selection.

The eligibility data is then evaluated according to predetermined criteria and standards developed by the employer (step 12). In particular, the answers supplied by the applicant in response to the eligibility questions are compared to predetermined eligibility criteria, and then a score or ranking may be produced based on the comparison. Any scheme may be used to perform such an evaluation.

As used herein, predetermined criteria refers to any appropriate metric that is suitable for determining whether the data and responses received from the candidate meet relevant standards for employment, or otherwise specify a level of acceptability, sufficiency, or satisfactoriness in whatever aspect of the application is under review.

The results from the eligibility evaluation provide a determination of eligibility, namely, the candidate either is or is not eligible for further consideration (step 14). If not, the candidate is informed of the outcome, and the application process terminates (step 16). Otherwise, the process proceeds to the next stage of the application process, the submission of data indicating candidate qualifications.

At this next stage, following the positive eligibility determination, the candidate submits resume information containing data indicating various areas and bases of qualification (step 20). For example, such qualification data can include information typically presented in a resume, such as education, prior experience, work history, professional affiliations, achievements, recognitions, and an inventory of pertinent skills. Again, a query-response format is used to elicit and collect the requested resume information.

The resume information is then evaluated to determine if the candidate possesses an adequate, sufficient, or at least satisfactory qualification level to permit continuance of the application process (step 22). The evaluation is conducted according to predetermined qualification criteria, such as by comparing the candidate responses to acceptable qualification standards. Based on the evaluation results, a decision is made to terminate the application process or proceed to the next stage in the application process, the assessment test (step 24). If termination is indicated, the candidate is so notified that the qualifications are not satisfactory (step 26).

In this next stage, following evaluation of the resume information, the candidate is required to take an assessment test that indicates, in one preferred form, the knowledge, skills, and abilities of the candidate. To this end, the applicant submits knowledge, skills, and abilities, or KSA, data (step 30). In one form, the KSA data is elicited in the form of a test presented to the candidate, who submits answers to the individual questions.

This KSA assessment attempts to develop information in all three areas to determine whether the candidate possesses the work-related, job-specific attributes and characteristics needed to successfully perform the work encompassed by the position for which the candidate is seeking. The KSA test is typically position-specific and generally reflects the specifications and requirements of the work and other job-related tasks required by the position under consideration. In effect, the KSA assessment test functions as a means to make a prediction or projection of how the candidate would perform on the job. Through the KSA assessment test, the competency or fitness of the candidate for performing a particular job or fulfilling a certain position is analyzed.

Referring to the composite of KSA information, knowledge may include, for example, a body of information applied directly to the performance of a function. Skill may include an observable competence to perform a learned psychomotor act. Ability may include the competence to perform an observable behavior or a behavior that results in an observable product.

However, these KSA descriptions are only illustrative and can encompass any manner or scheme for making a determination of the fitness, competency, and suitability of a candidate for a particular position. Any set of performance-related metrics may be used to implement and fulfill the objectives of the KSA assessment.

The KSA data is then evaluated (step 32). The evaluation, for example, compares the answers supplied by the candidate to predetermined answers, and then generates a score based on the comparison. The candidate is deemed to pass the KSA assessment depending upon whether the score is satisfactory, i.e., meets or exceeds a certain grading metric. Based on the KSA evaluation results, a decision is made to terminate the application process or to proceed to the next stage, the applicant interview (step 34). If the candidate fails the KSA evaluation, a status notice to this effect is communicated to the candidate (step 36).

At this point, the candidate is deemed fit both for employment and the position that is being sought, as determined by the satisfactory results from the resume evaluation (step 22) and the KSA assessment (step 32). Next, the candidate is required to participate in an interview, which is automatically scheduled (step 40). Preferably, the interview is not conducted in a traditional in-person format, but takes place within an automated and user-interactive electronic platform.

The interview scheme, according to a preferred embodiment, utilizes a conventional interactive voice response (IVR) arrangement. According to this protocol, the candidate calls a specified number and is connected to the IVR system. From there, the IVR system is activated and the interview commences (step 42). During the interview, the user replies to a series of questions or prompts by making a voice response or by keying in answers (if the answer requires a selection from a set of choices). The prompts are generated automatically by the IVR system from a database of interview questions. The interview advances from one question to another until completion. Any format or protocol may be used to present the questions. For example, the type and ordering of questions may vary depending on the job for which the interview is being conducted.

The interview answers supplied by the candidate are collected and evaluated (step 44). The evaluation, for example, may be performed by comparing the candidate answers to predetermined answers deemed to be the correct responses. Based on the evaluation results, a decision is made to terminate the application process or to designate the candidate as ready for employment (step 46). If termination is warranted, the applicant is so notified (step 48).

If the candidate passes the interview test, the candidate is extended an offer of employment (step 50). Accompanying this offer is a request for the candidate to complete a set of new hire forms required for employment. For this purpose, the candidate electronically receives a set of new hire forms. The candidate furnishes the requested information, e.g., inserts data into the form fields, and electronically submits the completed forms (step 52).

These forms, for example, may explain the practices and policies of the employer, and serve to facilitate various administrative matters attending employment. Examples of such forms include matters pertaining to: an authorization to release information in furtherance of a background investigation; disability data; equal employment opportunity information; an acknowledgement of employer policies; verification of employment eligibility; verification of work authorization; emergency contact information; and tax information.

Several advantages characterize the employment application process of FIG. 1. At each stage of the application process, the stage-specific information collected from the candidate is evaluated in order to determine whether the candidate meets the criteria relevant to that stage, and, ultimately, to decide if the candidate should be advanced to the next stage in the hiring process. This sequential, stage-by-stage evaluation subdivides the hiring process into discrete, logical, self-contained tasks, producing an economical and efficient scheme. The tasks of one stage are carried out independently of another stage, except in terms of whether to advance to a next stage depending upon the outcome of the application process from the prior stage. As a result, each stage must be satisfactorily completed (e.g., the candidate passes the KSA assessment test) before the tasks of a next stage are ordered and undertaken. No unnecessary tasks are performed.

By comparison, in a batch processing mode, the entire amount of required data is collected and submitted for processing all at once. The drawback to this approach is that if one evaluation shows unacceptable results, then the collection and processing of all the other data was unnecessary and wasteful.

Additionally, the processing and evaluation of the data collected from the candidate are preferably performed in real-time so that the candidate receives immediate feedback and a specific decision on the progress of the application. The process is also organized and structured to span every level of requirement in the application process. As such, the invention takes the candidate all the way through the application process from the initial stage (eligibility determination) to the final ultimate outcome, an offer of employment.

Referring now to FIGS. 2 and 3, there are shown block diagram illustrations of an electronic-based system 60 for implementing the employment application process of FIG. 1, according to one embodiment of the present invention.

Referring to FIG. 2, system 60 includes an input module 62, a data processor 64, and a controller 66.

The input module 62 serves to present and display to the user the questions and interrogatories needed to collect the information relevant to the eligibility determination, the resume evaluation, and the KSA assessment test. The input module 62 also provides a means for the user to visibly perceive the questions and to supply the answers.

The data processor 64 serves to process the data collected by the input module. This processing functionality evaluates the data and determines whether the evaluation results meet certain specified standards and hiring criteria.

The controller 66 receives the evaluation results and controls the application process according to such results. For example, the controller 66 decides whether to continue with the application process, and, if so, directs the input module 62 and data processor 64 to proceed to the next step in the application process.

Referring more particularly to FIG. 2, the input module 62 includes a query generator 68 and a user interface 70. Based on the current stage of the application process—eligibility, resume building, KSA assessment—the query generator 68 will retrieve from storage 72, via database 74, the appropriate questions to be posed to the applicant. For this purpose, database 74 includes storage for eligibility questions 76, resume questions 78, and KSA assessment questions 80.

The user interface 70 is provided to present and otherwise display the questions generated by query generator 68. Any conventional means can be used for such presentation. For example, the user interface 70 may include a graphical user interface (GUI) used with a web browser to display web page content on a computer terminal display. With the GUI, the candidate may review the employment questions and submit the answers.

The data processor 64 receives the answers 82 furnished by the candidate and processes the information, namely, to determine the fitness and suitability of the candidate for employment by examining, analyzing, and otherwise evaluating the answers. The data processor 64 includes an evaluator 84 that retrieves from storage 90, via database 92, model or correct answers that serve as the basis for the evaluation. These correct answers are embodied in predetermined hiring criteria 94 stored in database 92. The evaluator 84 retrieves the appropriate answers from hiring criteria 94 depending on the current stage of the application process.

The evaluator 84 works in conjunction with a comparator 86 and a decision module 88. The comparator 86 compares the answers provided by the candidate to answers developed by the employer, i.e., the predetermined hiring criteria 94. Based on the evaluation results, which may take the form of a score or grade determined by the comparison, a decision module 88 determines whether the evaluation results are acceptable or satisfactory. The decision module 88 effectively makes a judgment whether the candidate meets the hiring standards for the current stage of the application process, namely, whether the candidate is eligible for employment, possesses sufficient qualifications for the job, or passes the KSA assessment test.

Any type or form of comparison can be used to perform the evaluation conducted by data processor 64. For example, at the second stage of the process (resume building), the evaluation may simply determine that the candidate has the appropriate education and a sufficient level of experience. In this case, there would not necessarily be one strictly correct answer, but a range of acceptable answers, e.g., various combinations of acceptable education and work experience. Alternately, for the KSA test assessment, the test may be designed to pose questions that have one correct answer; in this regard, the evaluation is more strictly objective in that each question has but one correct response. It should be apparent to those skilled in the art that any conventional model or scheme of questioning may be used to implement the queries concerning eligibility, resume building, and the KSA assessment.

Referring again to data processor 64, once the evaluation of the candidate answers is completed, the judgment of decision module 88 is then communicated to controller 66 via line 104. The controller 66 includes a task manager 96 that determines the next course of action in the application process. If the judgment indicates that the candidate has met the standards of the current stage of the application process—for example, the candidate qualifications are sufficient—then task manager 96 directs input module 62 and data processor 64 (via control line 98) to proceed to the next stage in the application process. In particular, this advancement will occur by (i) the development and presentation of new questions relevant to the next stage, (ii) the subsequent collection of responsive answers furnished by the applicant, and (iii) analysis and evaluation of the answers relative to the predetermined hiring criteria.

Otherwise, if the candidate does not meet the hiring standards—for example, fails the KSA assessment test—then the task manager 96 directs a messaging system 100 (via control line 102) to send a message to the candidate indicating cessation of the employment application process. In a computer-based environment, messaging system 100 may include an email delivery system that sends an email to the candidate email account, or simply posts a message to the display the candidate is using to navigate through the application.

Referring now to FIG. 3, system 60 also includes an interactive voice response (IVR) system 110. The IVR system is configured to facilitate the interview stage of the employment application process. For example, once the applicant has advanced successfully through the eligibility, resume, and KSA assessment stages, the controller 66 (via task manager 96) interfaces with IVR system 110.

The IVR system 110 may be provided in a variety of conventional forms known to those skilled in the art, but in one arrangement may include an evaluator 112 working in conjunction with a database of predetermined criteria 114. The IVR system 110 also works with a database 128 having an automated query generator 130 for generating the interview questions posed to the candidate.

Basically, once the candidate reaches the interview stage, an interview is scheduled and the scheduling information is communicated to the candidate via message system 100 (FIG. 2). According to conventional IVR protocols, the candidate places a call into the IVR system via a suitable user input 116, e.g., a phone establishing a voice connection 118 to the IVR system.

At this point, once the candidate initiates the interview process, the IVR system 110 retrieves the interview questions from the automated query generator 130 and communicates them to the candidate over the voice connection. In response, the candidate submits an answer via the user input 116. This interview format continues until the interview is finished, i.e., all of the interview questions have been presented and replies received. The evaluator 112 evaluates the candidate answers relative to the predetermined criteria 114, which in one form may embody correct or acceptable answers to the interview questions.

The IVR system 110 then communicates the evaluation results back to controller 66, where the task manager 96 determines the next course of action. If the applicant fails the interview, this status is forwarded to the applicant via the messaging system 100.

Otherwise, if the candidate passes the interview, the candidate is placed into a new hire category and an offer of employment is extended via the messaging system 100. To facilitate the new hire process, system 60 includes a new hire forms module 120 having a user interface 122 and a forms generator 124 connected to a forms database 126. Module 120 electronically transmits to the candidate a set of forms that the new hire needs to complete, via user interface 122 (which may be the same interface 70 in FIG. 3 if the entire application process is performed at the same computer station). The entire set of requisite forms is contained within forms database 126 and uploaded to forms generator 124 for sequential presentation to the candidate, who completes and submits the forms via the user interface 122.

The system 60 of FIGS. 3 and 4 is preferably constructed using an electronic-based implementation, which enables the functions and operations to be performed automatically. In particular forms, suitable computer and networking configurations can be used, combining the appropriate hardware and software of conventional form, to build the system.

Referring now to FIG. 4, there is shown a block diagram illustration of an internet-based application environment 140 for implementing the process of FIG. 1, according to another embodiment of the present invention. The system 60 of FIGS. 2-3 may be implemented using this internet-based configuration.

The system 140 includes a client facility 142 and a server facility 144 connected via the internet 146. This arrangement is constructed according to conventional configurations well known to those skilled in the art. In conventional form, the client 142 includes a graphical user interface (GUI) 148 and a web browser 150 suitably configured in a computing platform having a display.

The server 144 includes an employment application processing program 152 that directs, manages, and otherwise controls the employment application process. The program 152 performs all of the operations and functionalities set forth in the process of FIG. 1. In a preferred form, the application process is conducted within the environment of a website maintained by server 144, which allows the candidate to navigate through the process via a succession of web pages that are accessed from the website. In this manner, the candidate can navigate through the entire application process in an online environment, over the course of one or more communication sessions between the client and server.

The web pages generated by the server present the functionalities and operations needed to advance through the application process. For this purposes, program 152 is connected to a database 154 having web page content 156 that contains all of the material needed to query the candidate and to solicit the information necessary for evaluating the application for employment. Database 154 also includes evaluation criteria 158 useful in performing the evaluation of the candidate answers, e.g., the correct answers to the KSA assessment test.

In operation, the candidate at client terminal 142 initiates the application process by accessing the website maintained and otherwise hosted by server 144, where the employment application processing program 152 is resident. The communication between client 142 and server 144 is conducted according to conventional communication session protocols used in the internet and world wide web.

In response to this access, server 144 activates and otherwise causes the execution of program 152. The program 152 retrieves the appropriate web page content 156 from database 154, depending upon the current stage of the application process, and communicates it to client 142, where it is presented to the candidate via the web browser 150. The candidate enters the requested information into the input fields of the displayed web page using GUI 148, and then submits the completed web page to server 144 for further processing and evaluation by program 152. This sequence continues until the application process is finished, i.e., the process is completed (the candidate is ready for hire) or terminated (the candidate is not suitable for employment).

For purposes of conducting the interview, system 140 also includes an IVR system 160 connected to server 144. This connection enables the interview answers furnished by the candidate during the automated interview process to be evaluated by program 152. For example, the correct or acceptable interview answers may be represented in evaluation criteria 158 of server database 154, and then retrieved by program 152 for comparison to the candidate responses.

As shown, one advantage of the web-based, internet-enabled implementation of FIG. 4 is that several independent client stations 142 can be networked to the same server 144. This distributed environment allows several candidates to navigate through the employment application process at the same time. The internet configuration also allows a candidate to access the server, and effectively apply for employment, without regard to time or geographical constraints.

Several advantages characterize the web-based implementation of FIG. 4. The use of a website for hosting the employment application process enables a candidate to complete the entire application process during an online experience. The server has the capacity to individually handle and process the application for each candidate, and so may store the current state of the application if the candidate cannot finish it during one session and needs to return at a later time. The networking of the IVR system to the server enables the server to function as a single point of processing for all of the application requirements.

Figure 5:
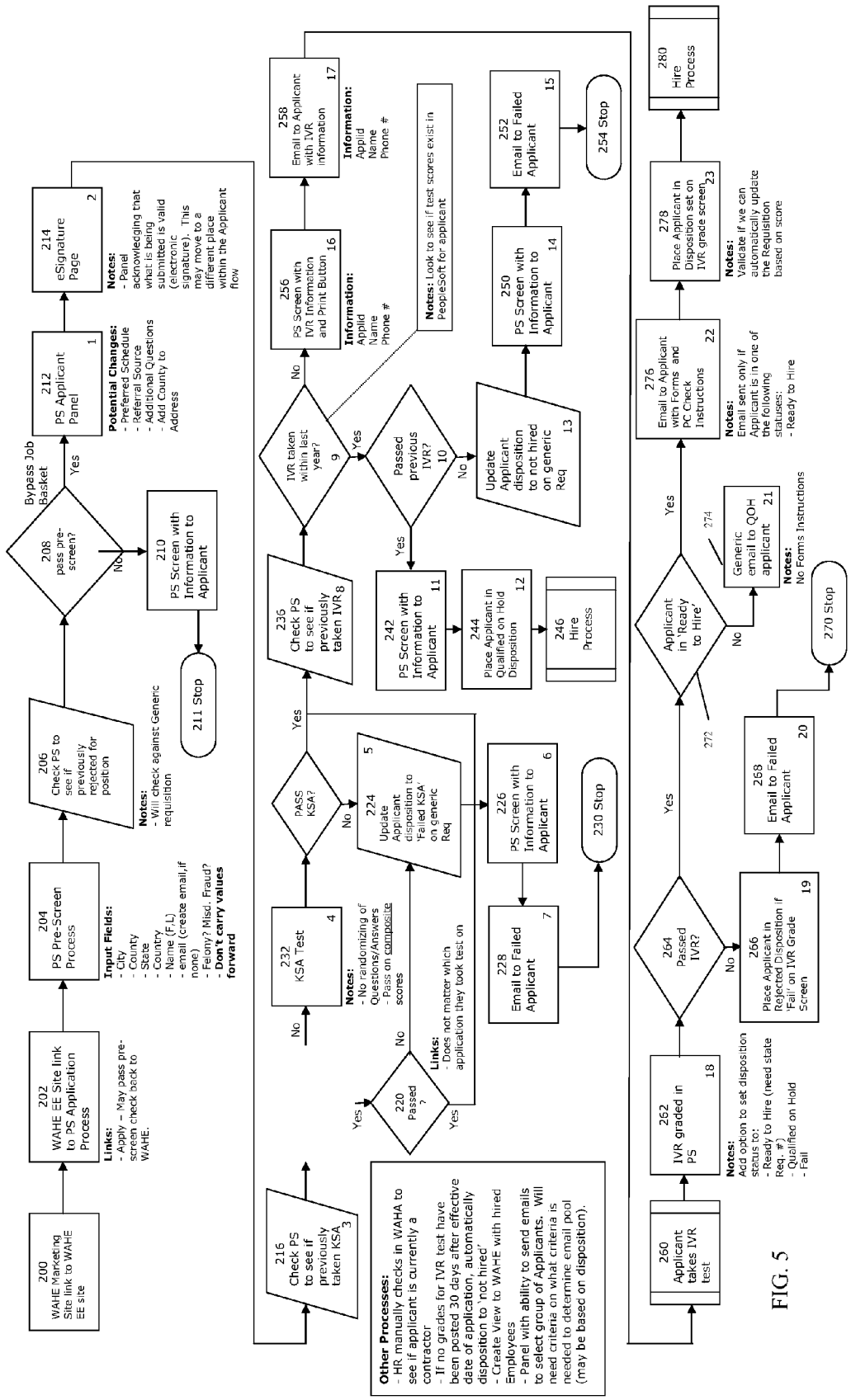
FIG. 5 is a flowchart providing a more detailed construction of the employment application process of FIG. 1, according to another form of the invention.
Figure 6:
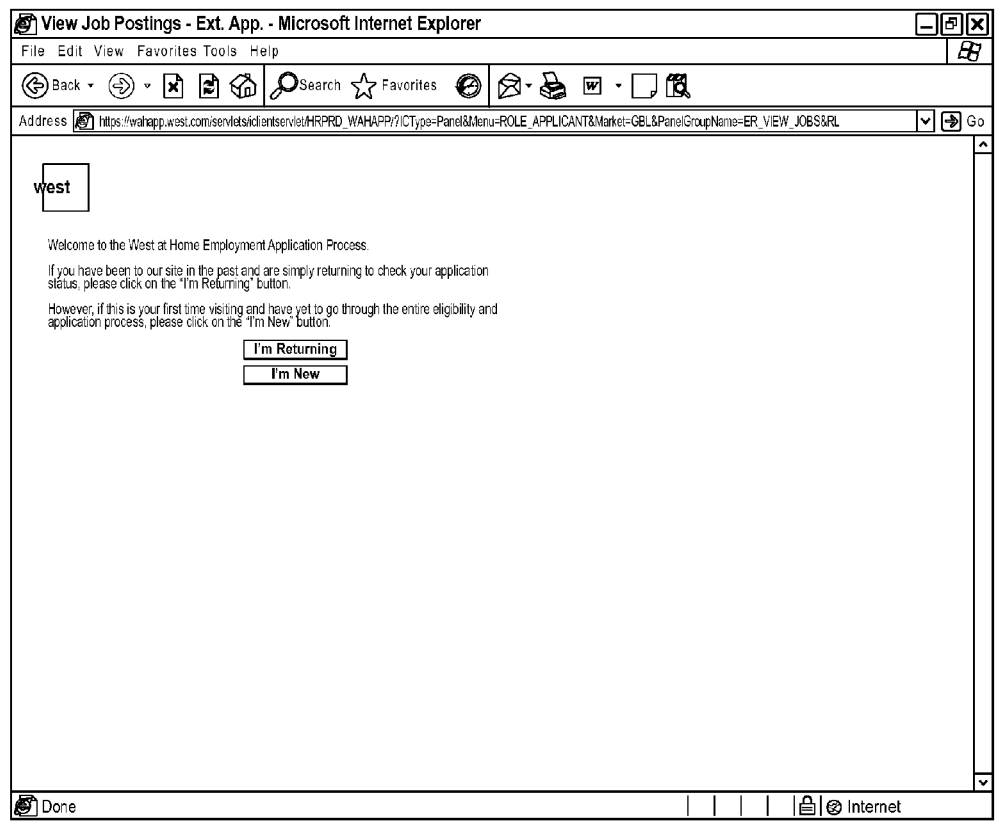
FIG. 6 is a GUI screen shot of a web page showing an internet connection to a website from which is launched an internet-based implementation of the process of FIG. 5.
Figure 7A:
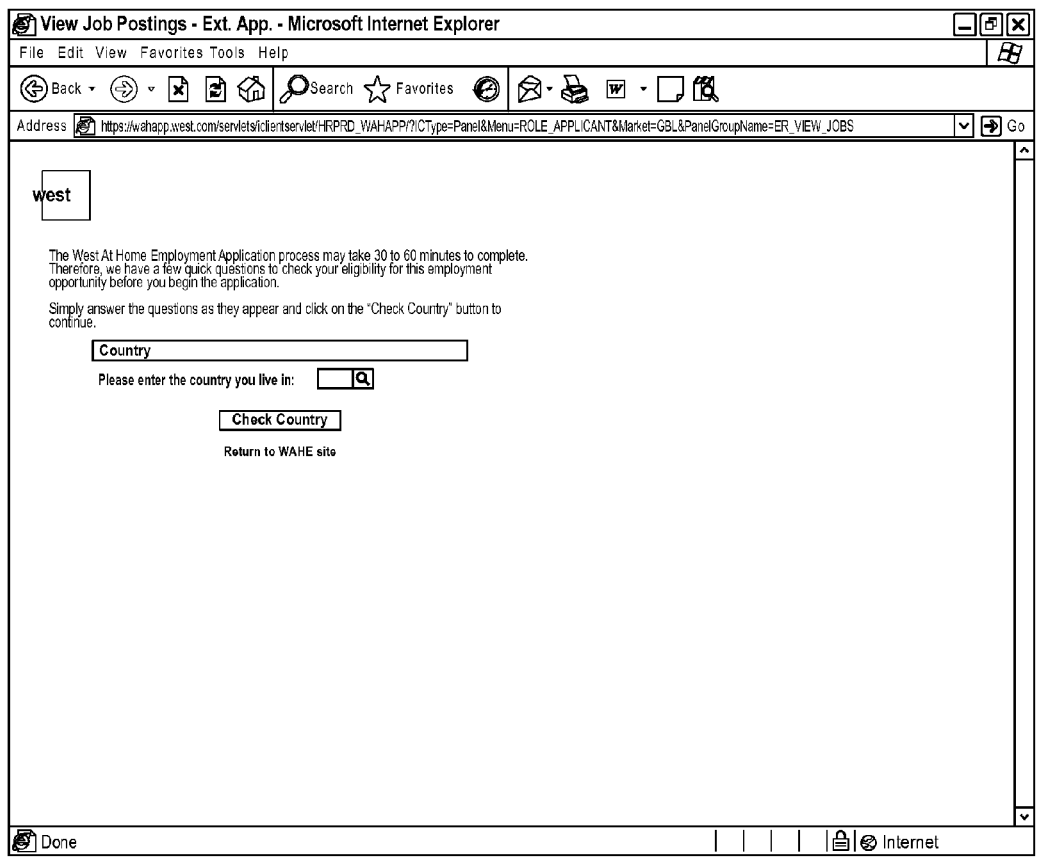
FIGS. 7A-D are GUI screen shots of web pages for implementing the eligibility determination stage of the process of FIG. 5.
Figure 7B:
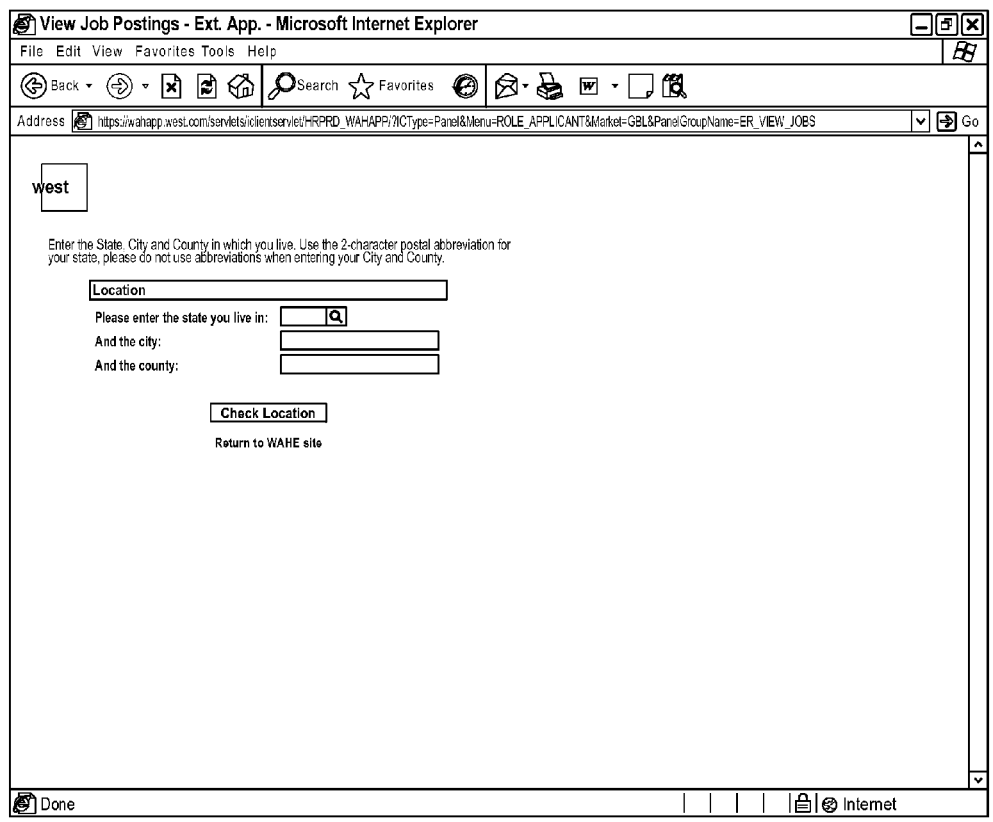
Figure 7C:
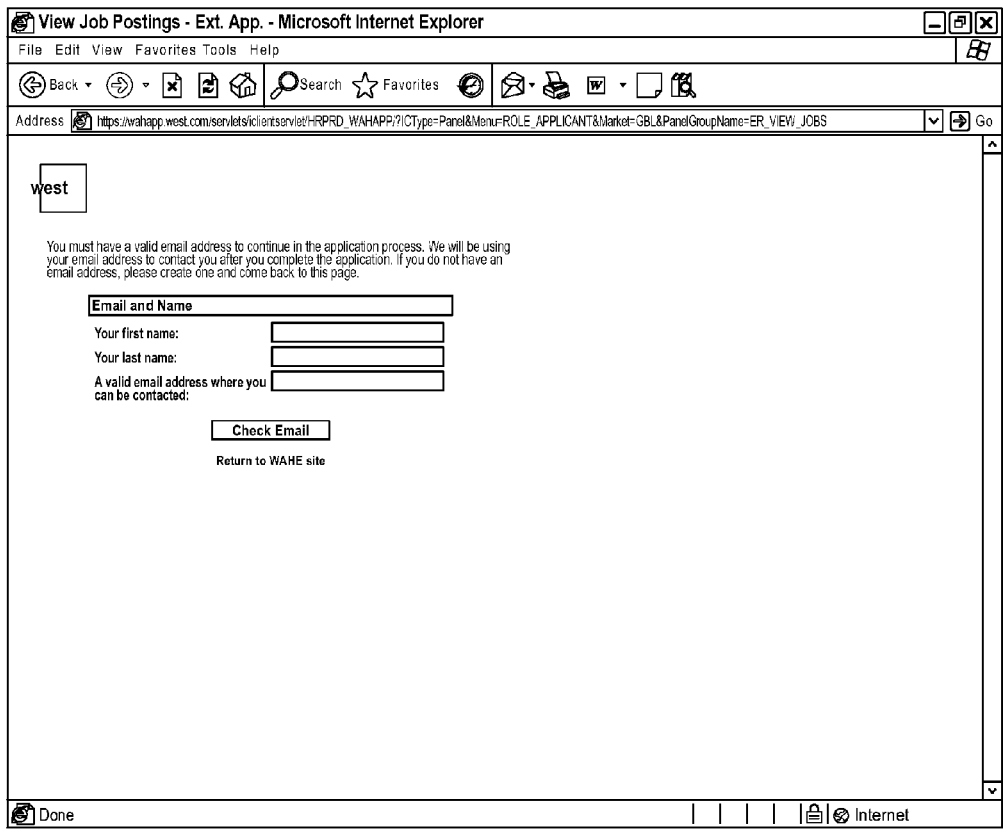
Figure 7D:

Referring now to FIG. 5, there is shown a flow diagram providing a more detailed and developed flowchart for performing the process of FIG. 1, according to another embodiment of the present invention. The flowchart of FIG. 5 details a process suitable for implementation in the web-ready, internet-based environment of FIG. 4.

Accordingly, the discussion of FIG. 5 will also refer to FIG. 6, FIGS. 7A-D, FIGS. 8A-C, FIGS. 9A-O, FIGS. 10A-U, and FIGS. 11A-C. These figures show GUI (graphical user interface) screen shots of web pages that are presented by web browser 150 (FIG. 4) for display at the client-side computer terminal 142. The screen shots depict a succession of web pages that implement the employment application process of the invention. The screen shots are generally self-explanatory regarding the content and functionality of the displayed web pages.

Referring to FIG. 5 (in conjunction with FIG. 4), the process is initiated by the candidate who accesses, via client 142, the website hosted by server 144 where the employment application processing program 152 is maintained (step 200). This access thus establishes a link to program 152, in effect causing program 152 to commence running (step 202). FIG.

6 shows a web page indicating that the user has accessed the website and can now navigate through the employment application process. The process is launched once the user, via GUI 148, clicks the appropriate tab.

In one form, the employment application process is built, controlled, and managed using PeopleSoft (PS) Enterprise applications provided by Oracle Corporation. In particular, program 152 is designed and constructed using PeopleSoft application software.

Returning to FIG. 5, the application process proceeds to the eligibility determination, which serves as a pre-screening process before the formal application sequence is initiated (step 204). FIGS. 7A-D show a sequence of web pages used to collect information from the candidate for making the eligibility determination. The input fields are not limited to those specified in the web pages, but may reflect any eligibility criteria developed by the employer. In that case, the content of the web pages can readily be modified to incorporate other desired criteria.

Figure 8A:
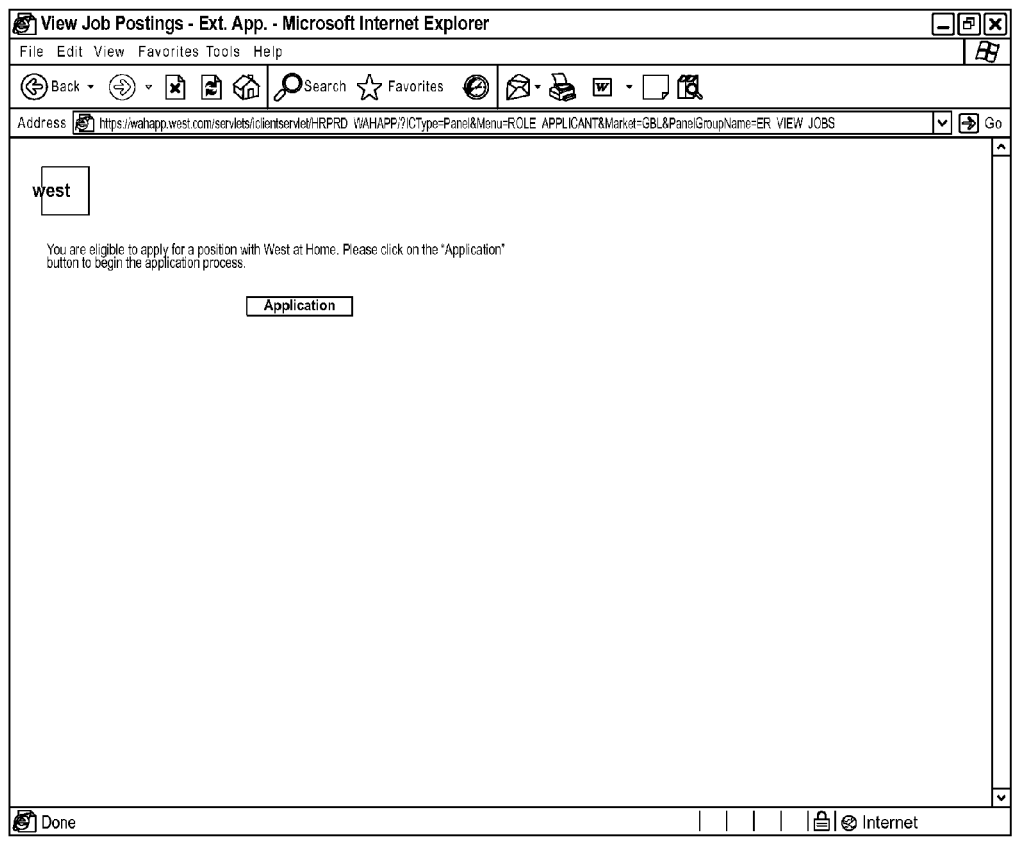
FIGS. 8A-C are GUI screen shots of web pages serving as introductory material in advance of the formal application process of FIG. 5.

Before proceeding to an evaluation of the eligibility inputs, the process first checks to see if the candidate was previously rejected (step 206). The evaluation is performed and a decision is made on eligibility (step 208). If the candidate does not meet the eligibility criteria, the applicant is informed of this status and the process is terminated (steps 210, 211). Otherwise, if the candidate is eligible, the process continues. FIG. 8A shows a web page informing the candidate that an affirmative eligibility determination has been made. The candidate can then launch the formal application process by activating the "Application" tab.

Figure 8B:
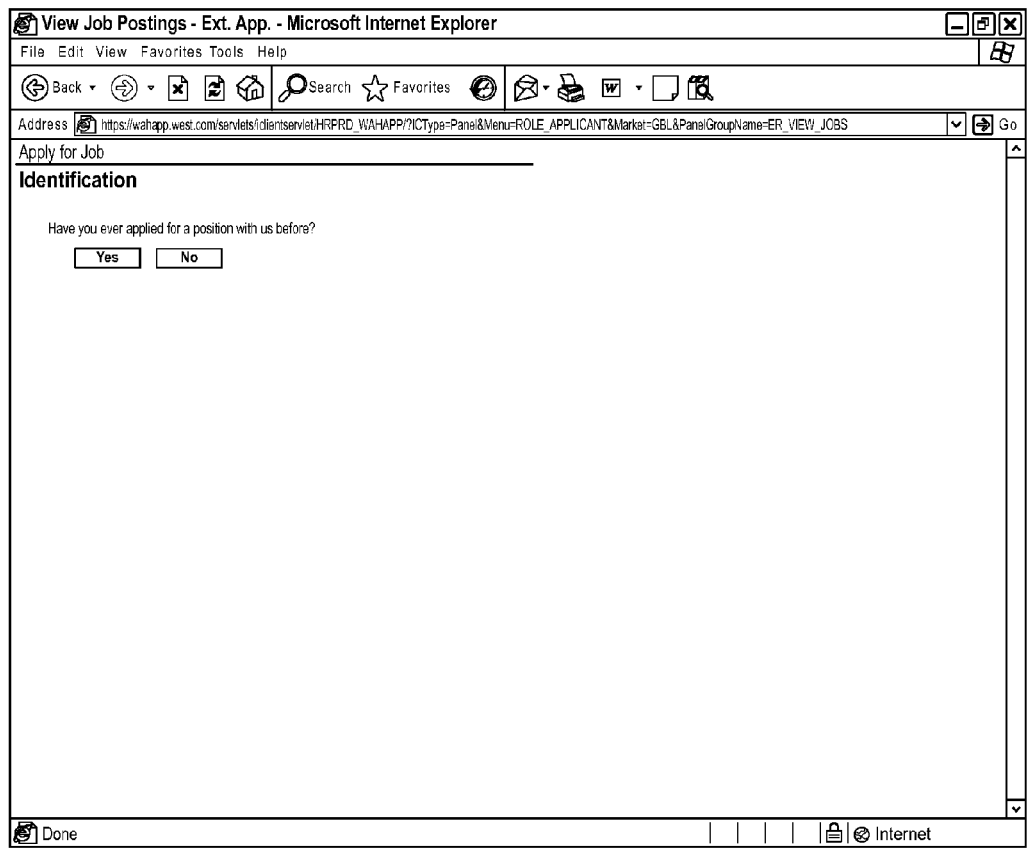
Figure 8C:

First, before the application data is requested, the process collects identification information, as illustrated by the web pages of FIGS. 8B-C.

Next, the formal, substantive application process is accessed (step 212). Here, the operations of the resume building and evaluation stage are conducted. FIGS. 9A-J show the sequence of web pages that the candidate advances through during the resume building process. The progression and content of web pages are preferably ordered in a logical manner to collect information in an orderly fashion. A tracking feature is included at the top of each pages, depicted in the form of a linear sequence of encircled numbers, to indicate the progress that the candidate is making in the resume building process. The candidate navigates from one page to the next, and can even return to a previous page to correct or add information, by use of the "Previous" and "Next" tabs.

As shown, the information can be collected using any conventional combination of input mechanisms, such as drop-down menus or manual input fields.

Figure 9A:
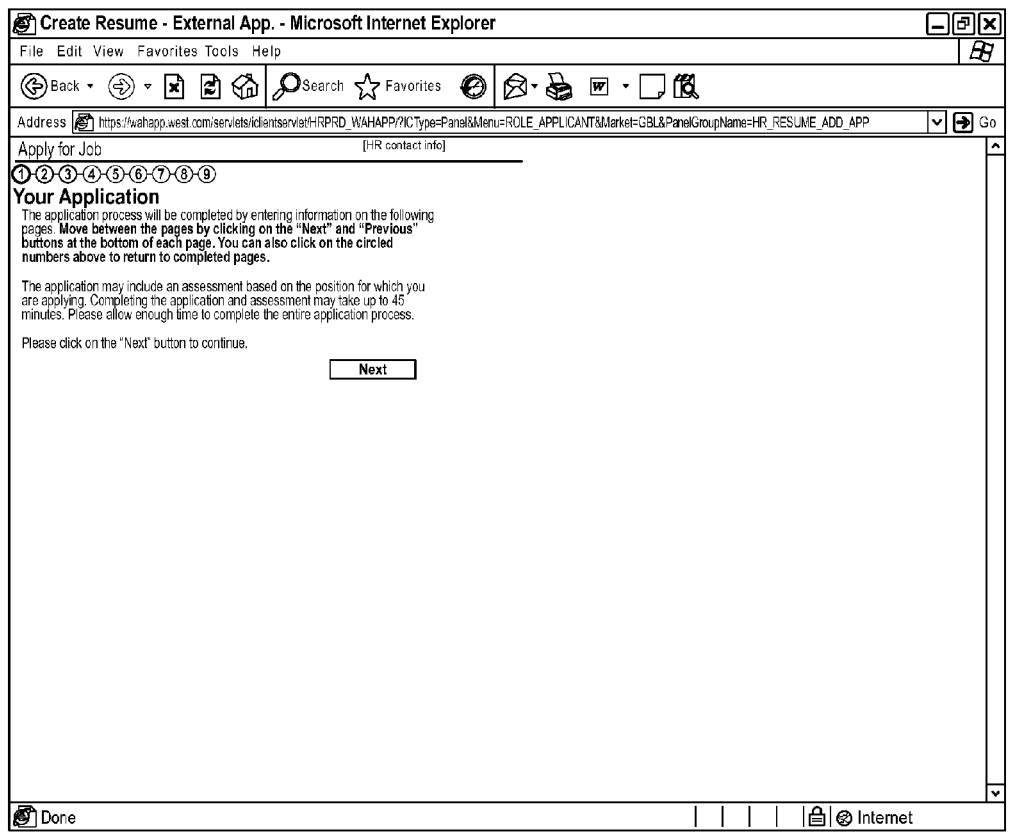
FIGS. 9A-O are GUI screen shots of web pages for implementing the resume building and evaluation stage of the process of FIG. 5.
Figure 9B:
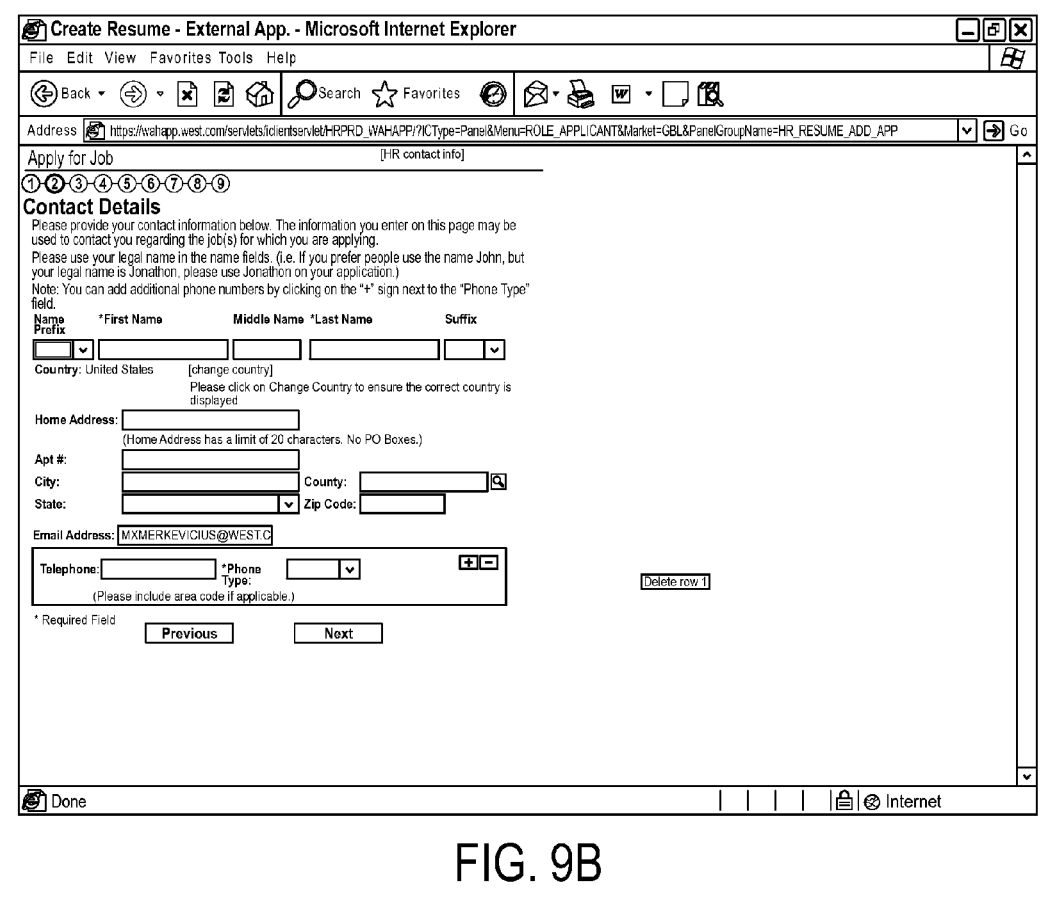
Figure 9C:
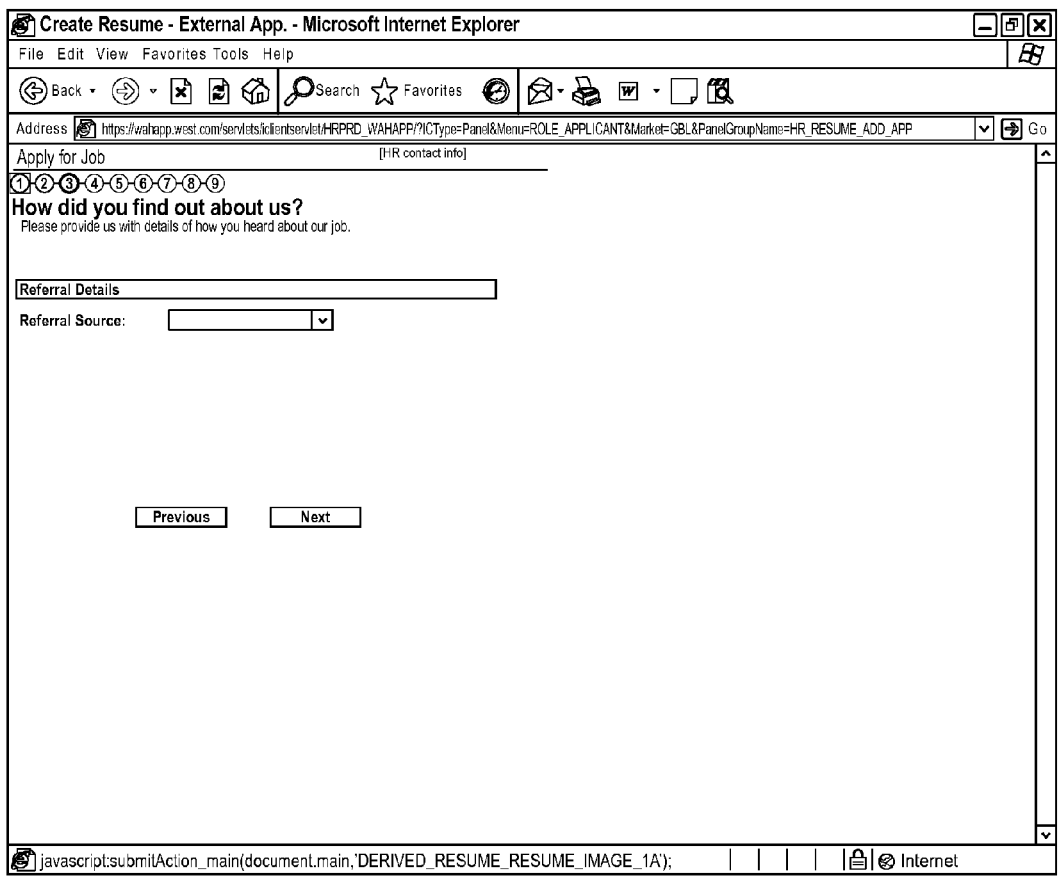
Figure 9D:
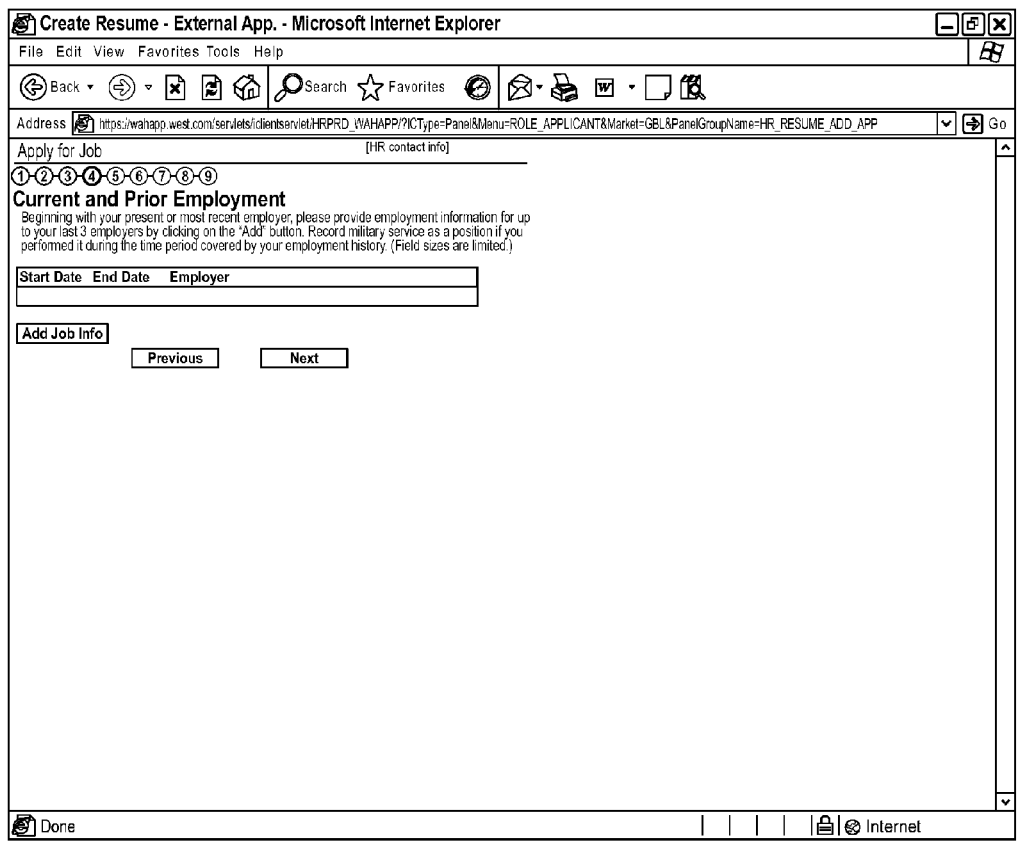
Figure 9E:
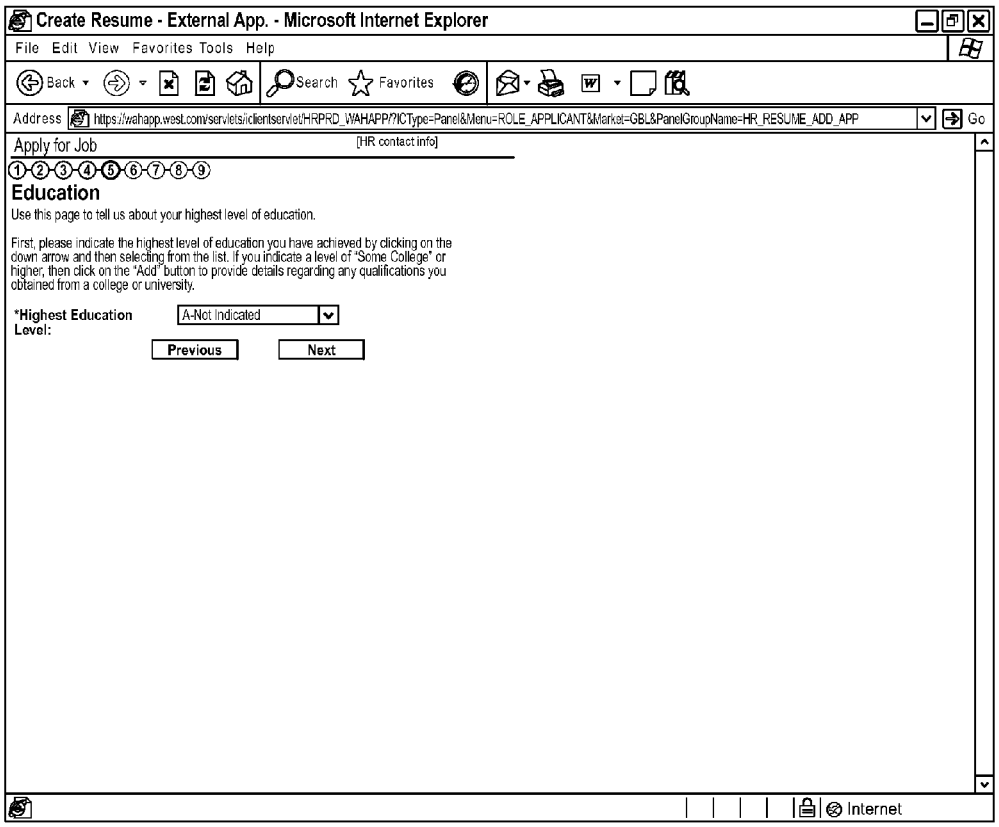
Figure 9F:
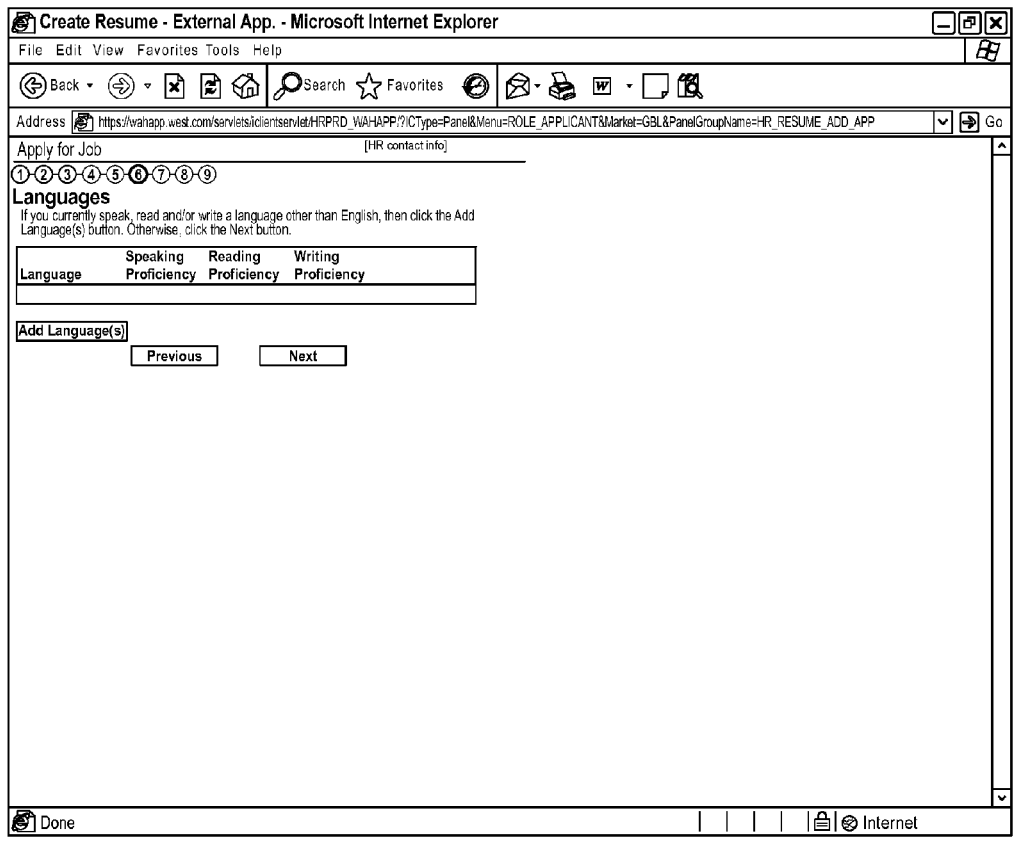
Figure 9G:
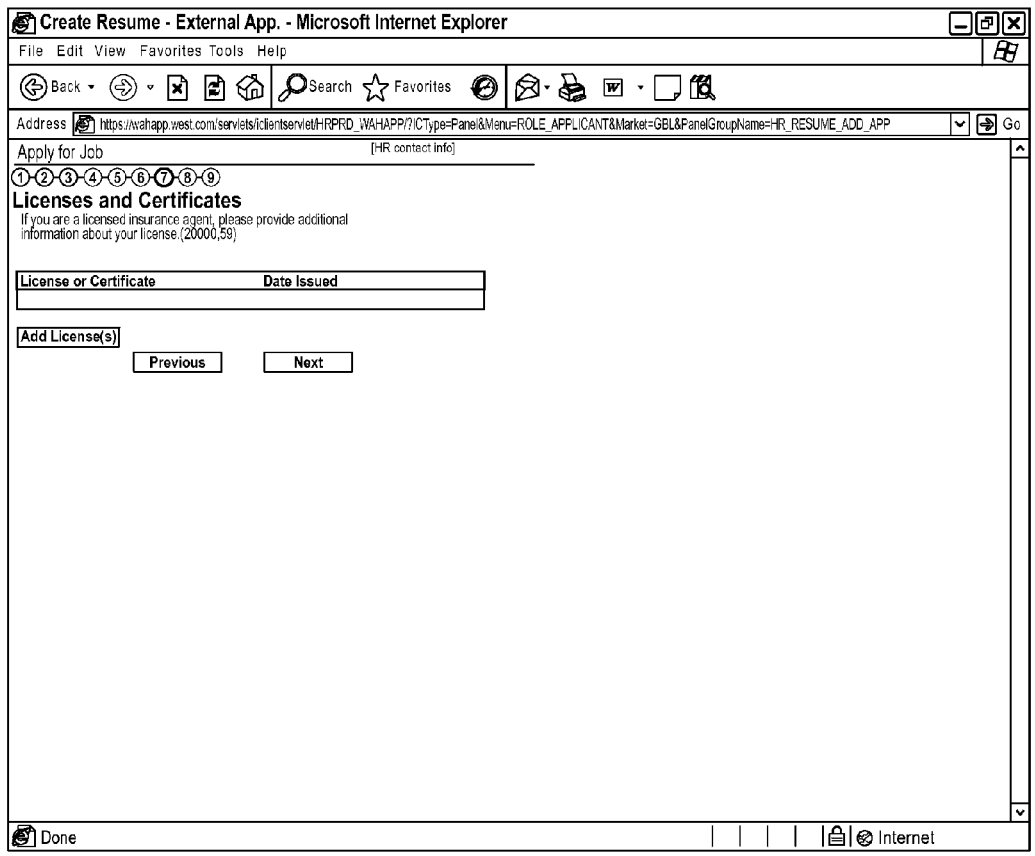
Figure 9H:
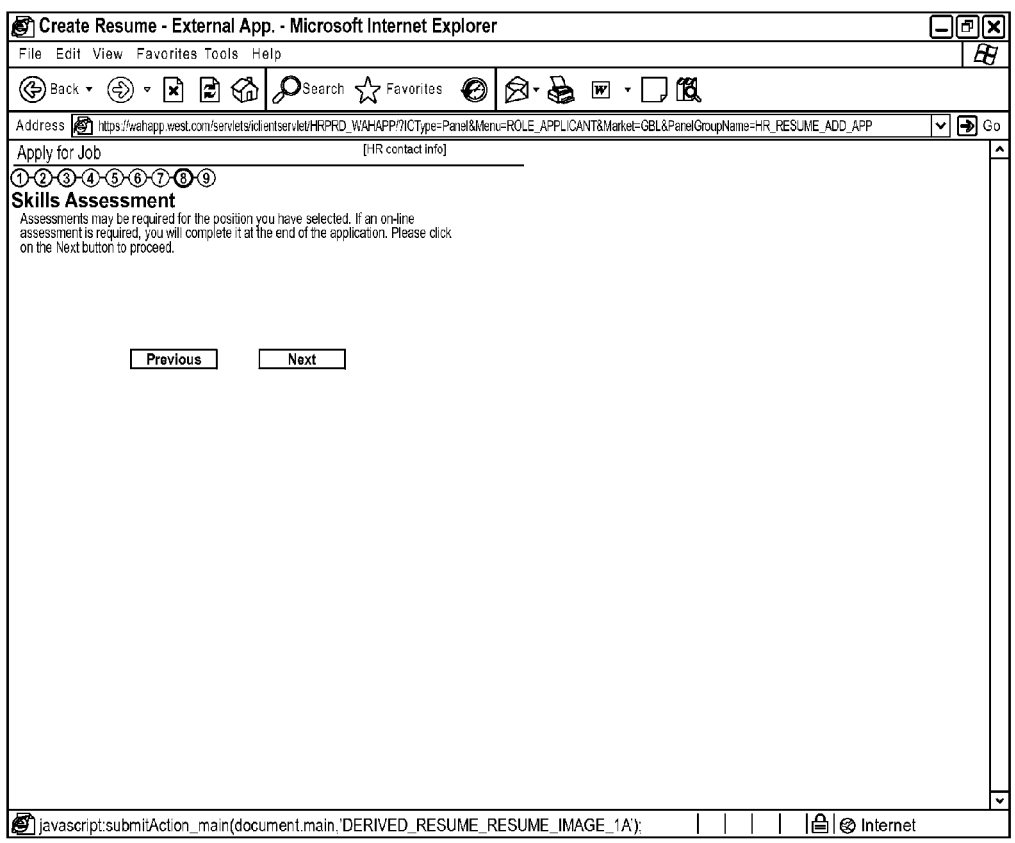
Figure 9I:
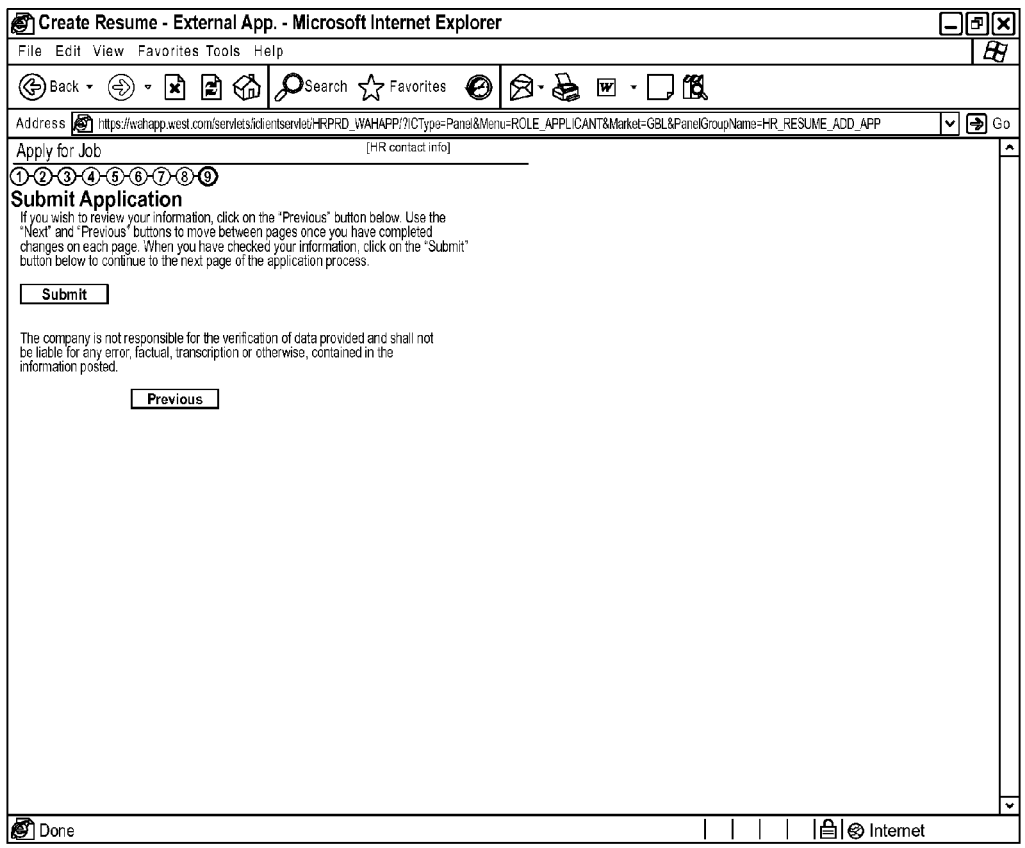
Figure 9J:
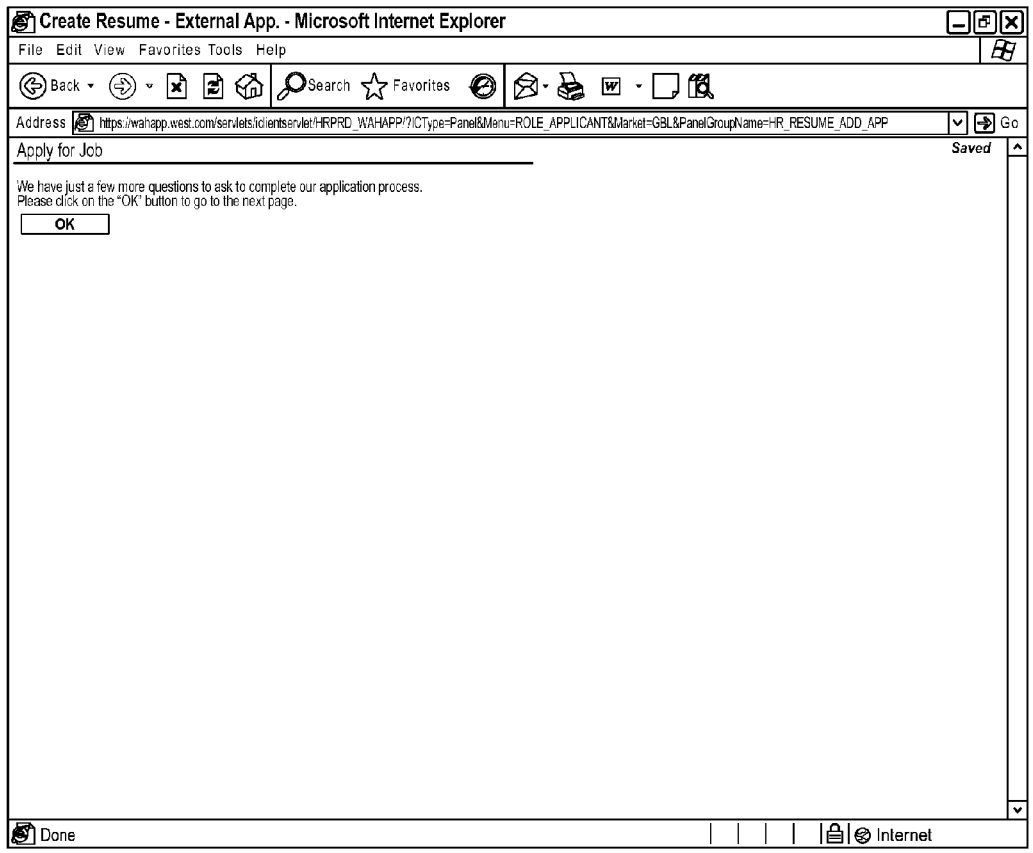
Figure 9K:
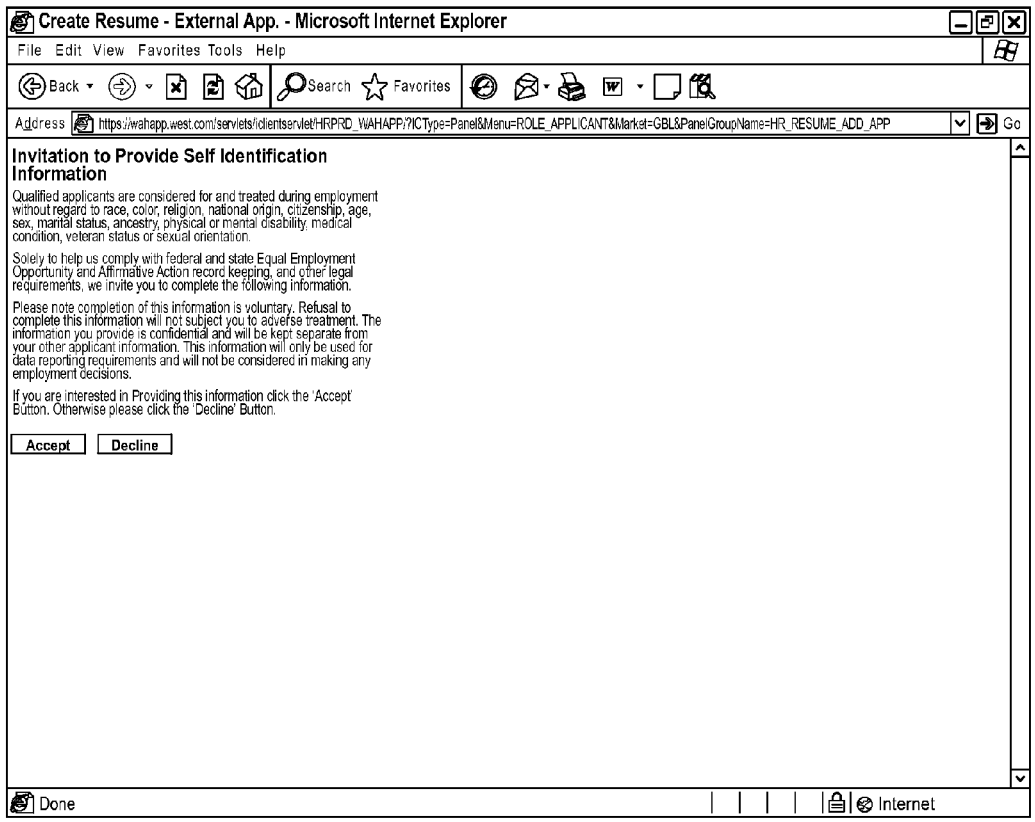
Figure 9L:
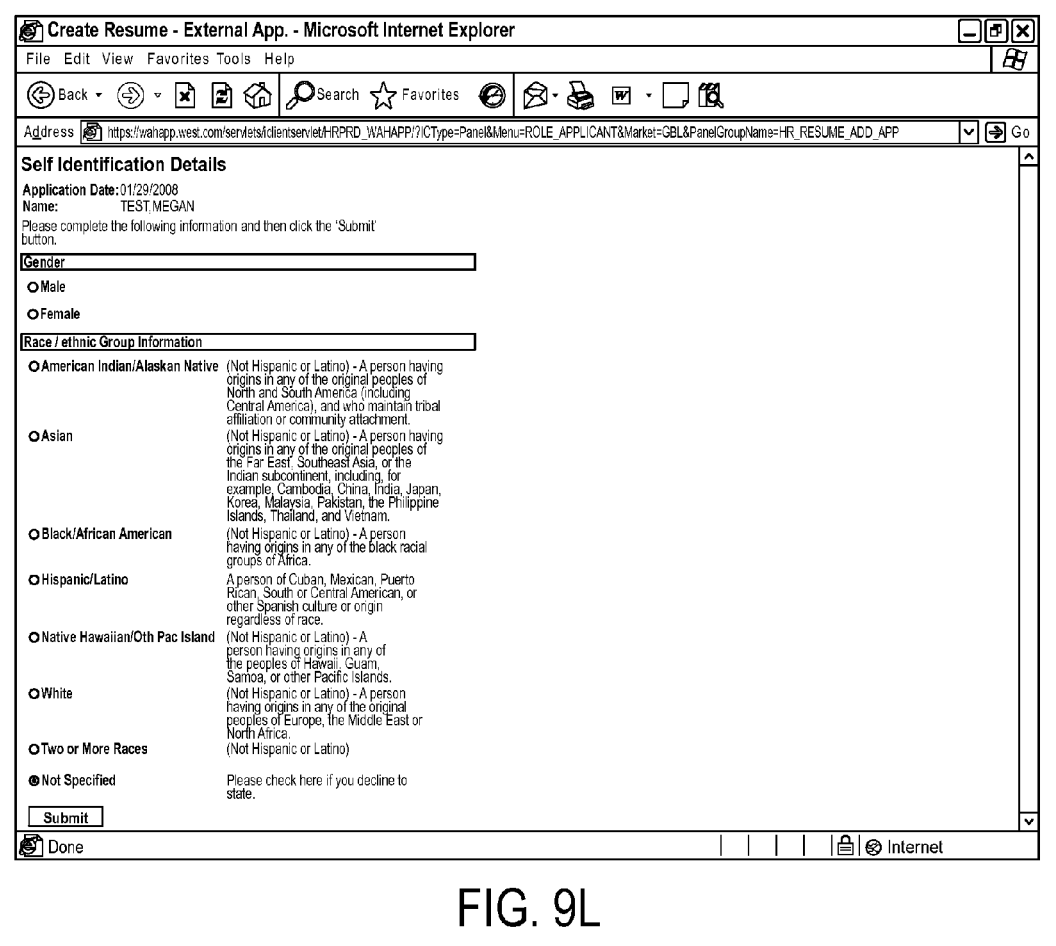
Figure 9M:
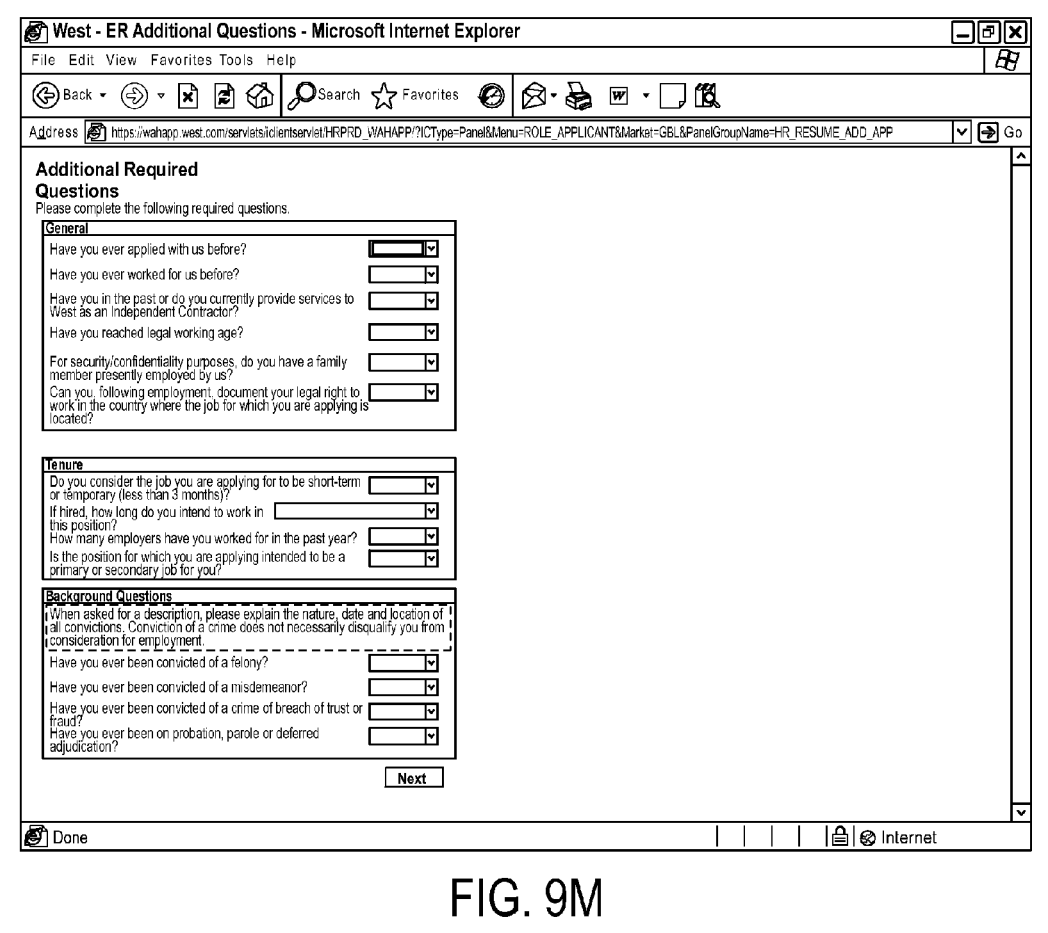
Figure 9O:
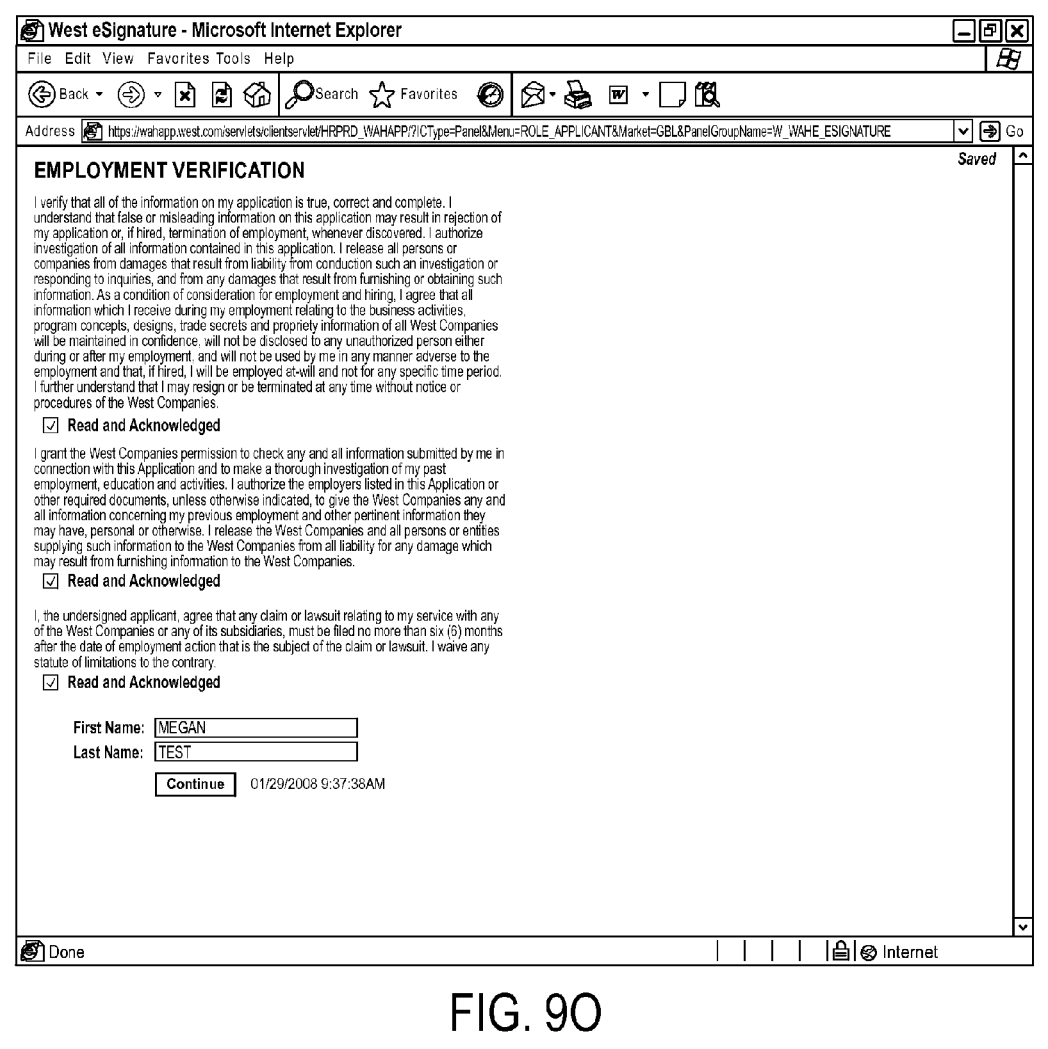

The collection of candidate qualification information finishes with the web page shown in FIG. 9J. However, the process typically requests additional optional data, such as self-identification information (FIGS. 9K-L), and various mandatory data (FIG. 9M). The resume building process ends with a panel that requests the applicant to acknowledge that what is being submitted is valid, as evidenced with an e-signature, depicted in the web pages of FIGS. 9N-O (step 214).

Figure 10A:
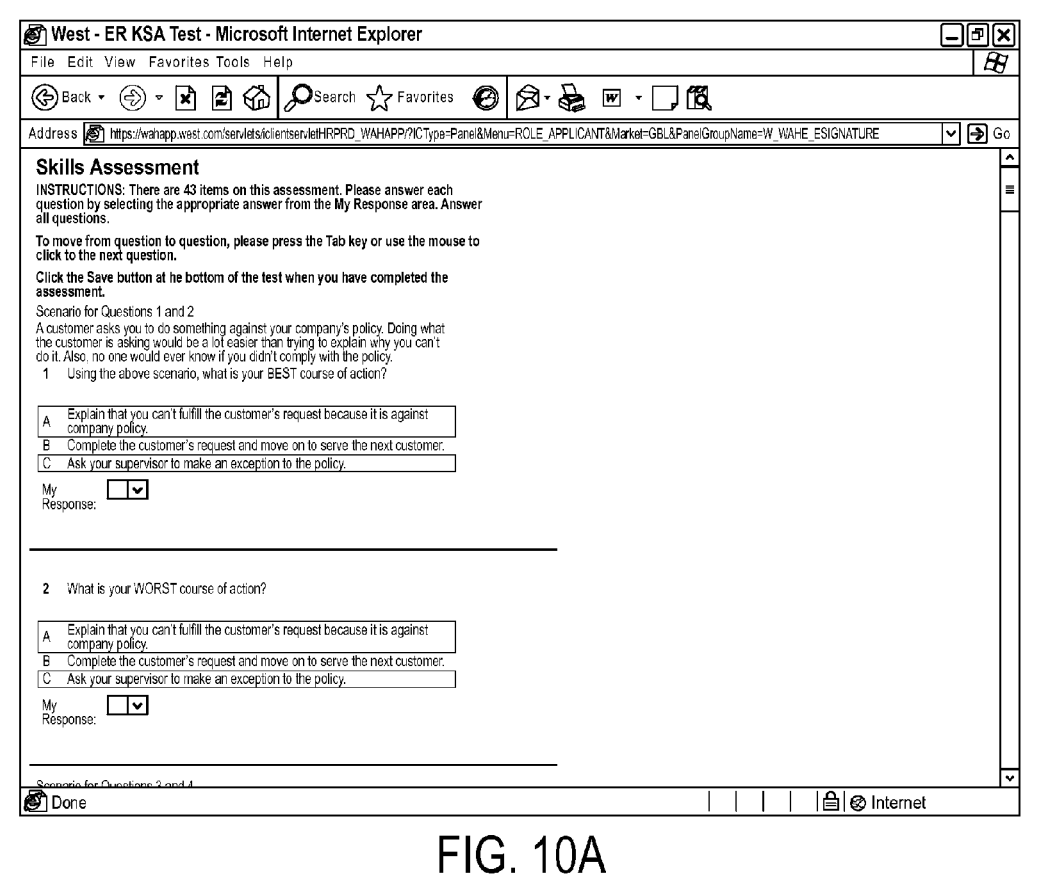
Figure 10B:
FIGS. 10A-U are GUI screen shots of web pages for implementing the KSA assessment test stage of the process of FIG. 5.
Figure 10C:
Figure 10D:
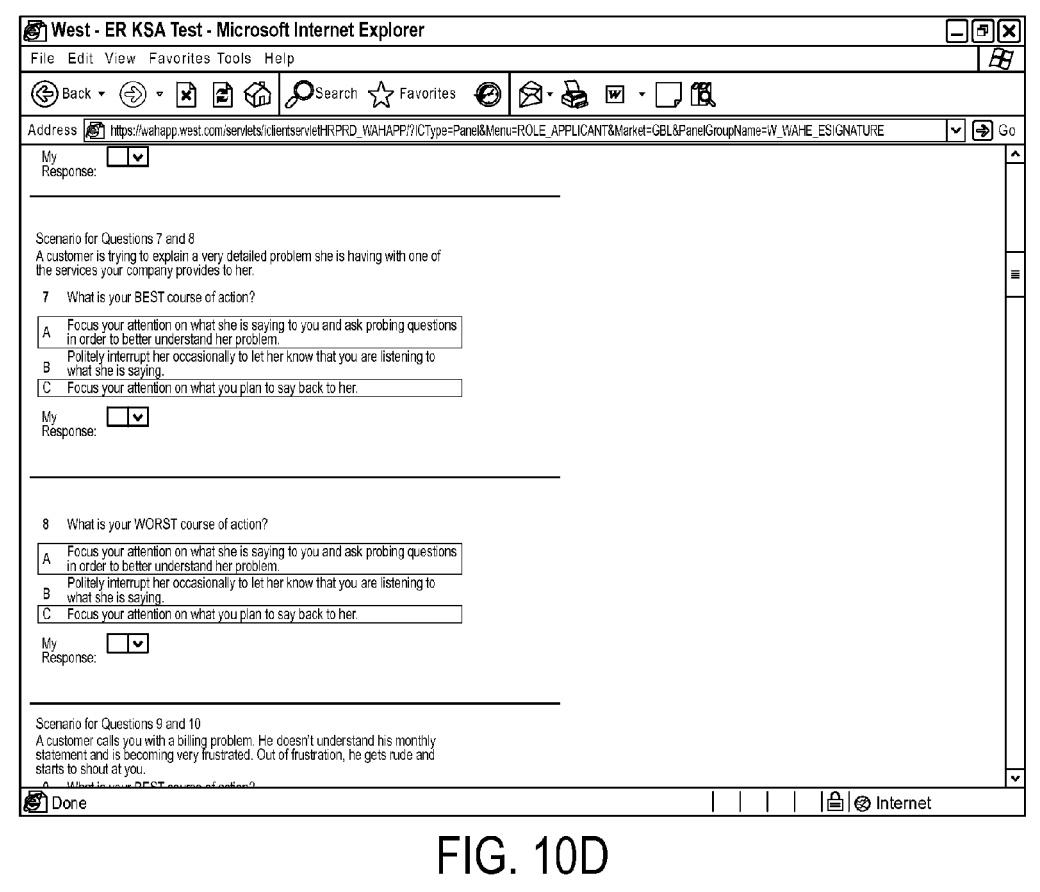
Figure 10E:
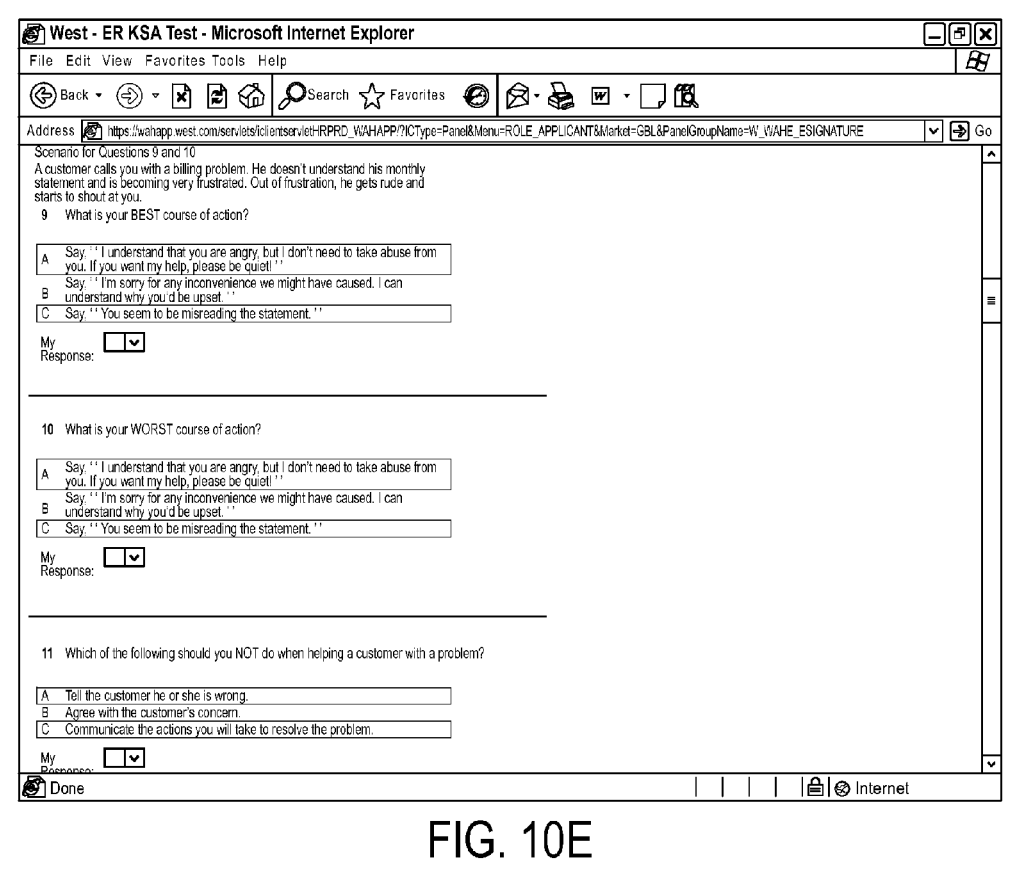
Figure 10F:
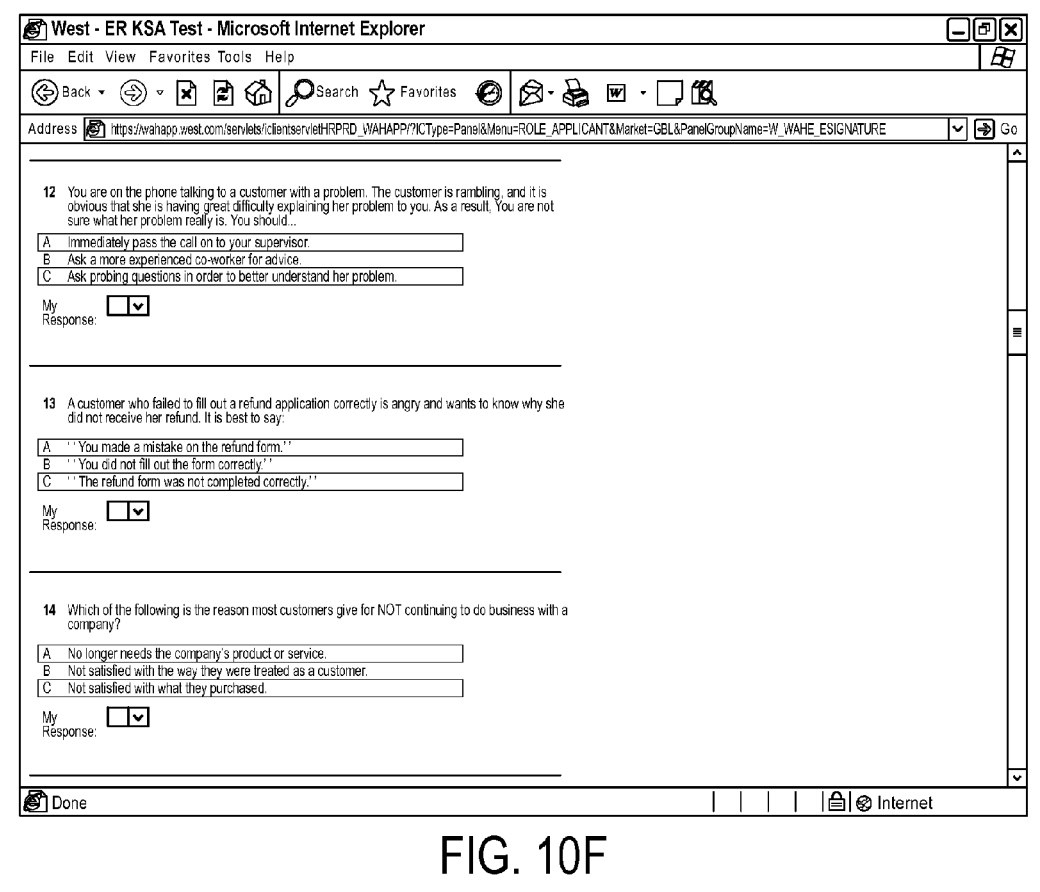
Figure 10G:
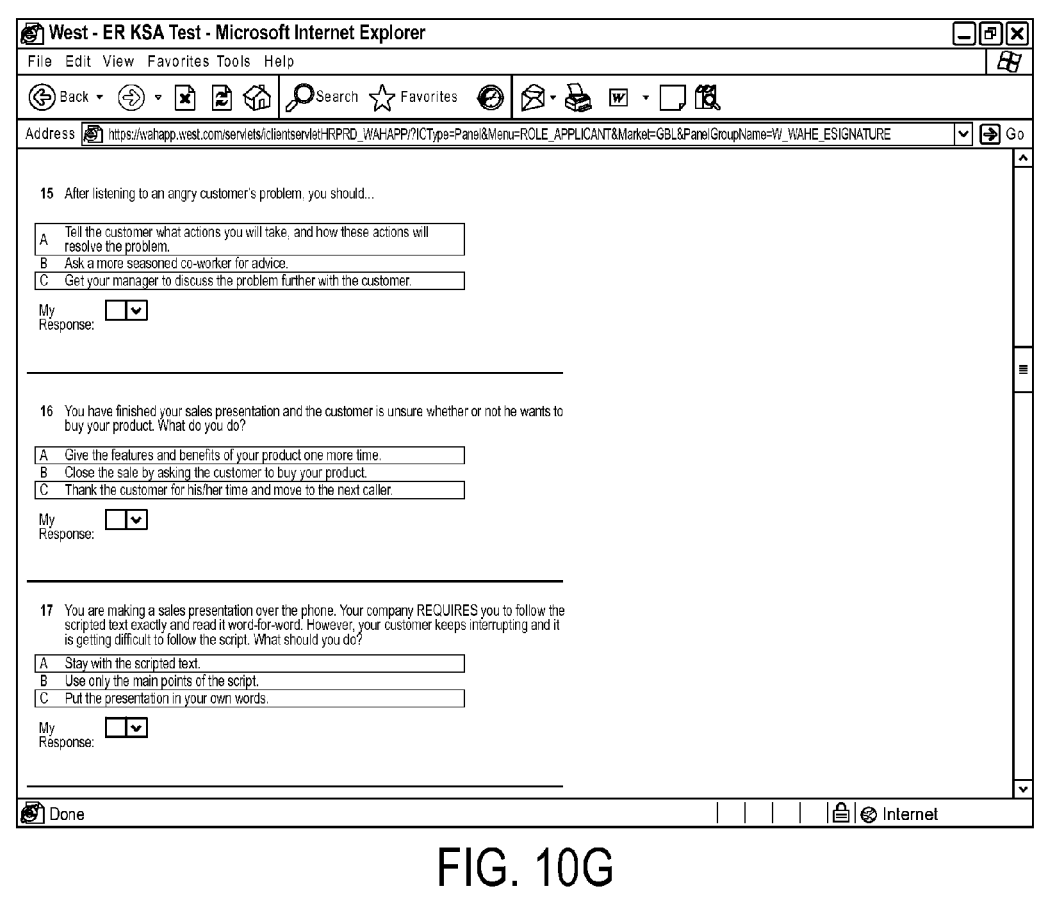
Figure 10I:
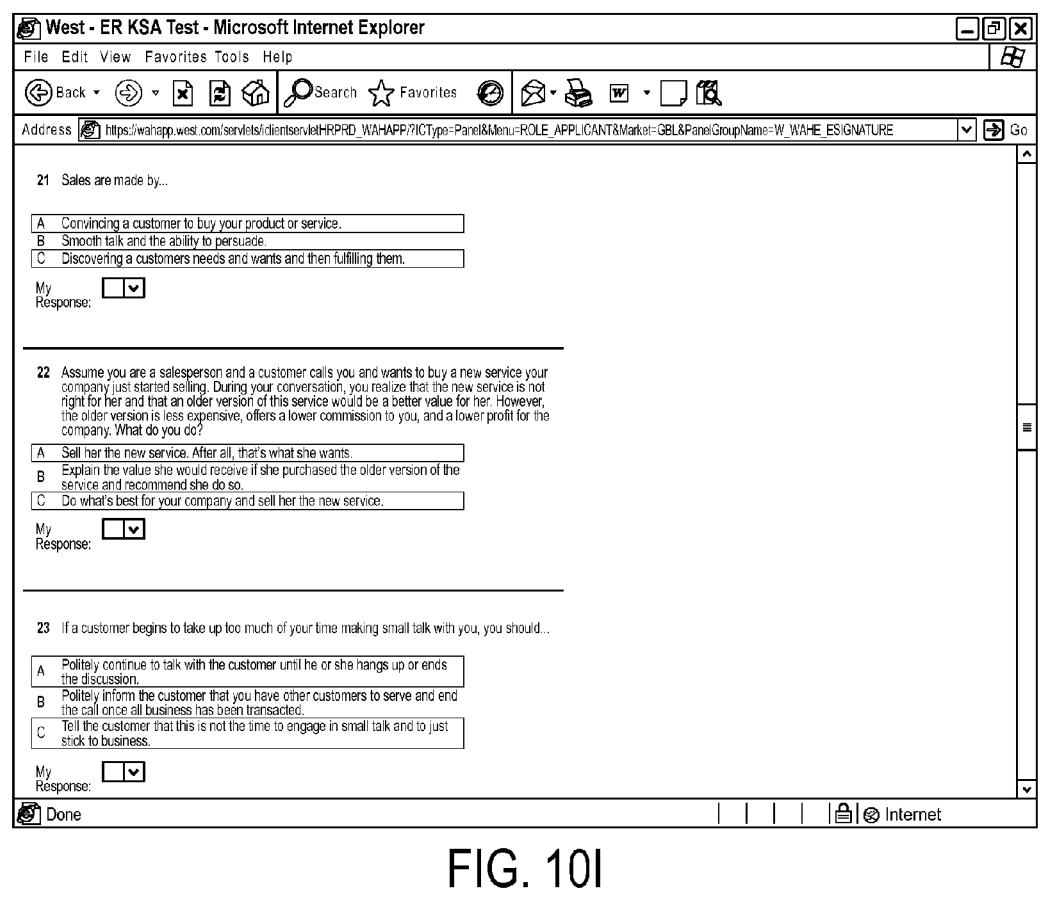
Figure 10N:
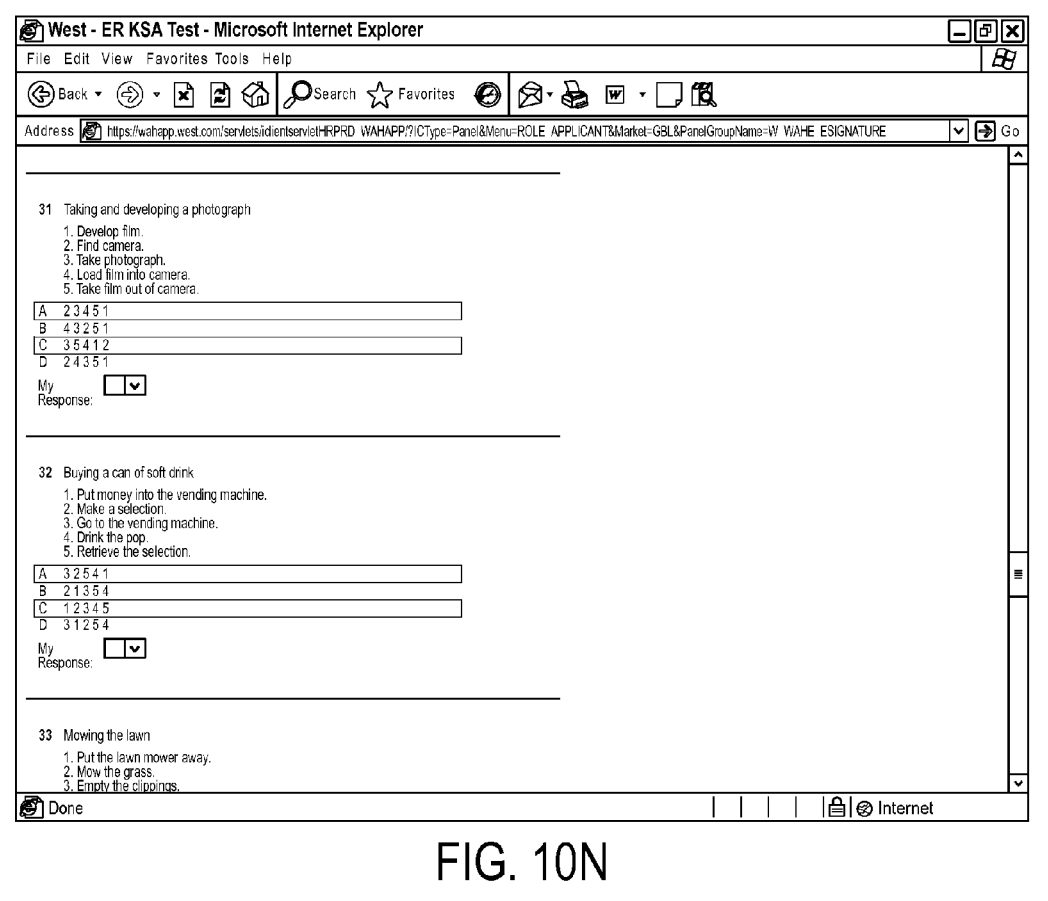
Figure 10O:
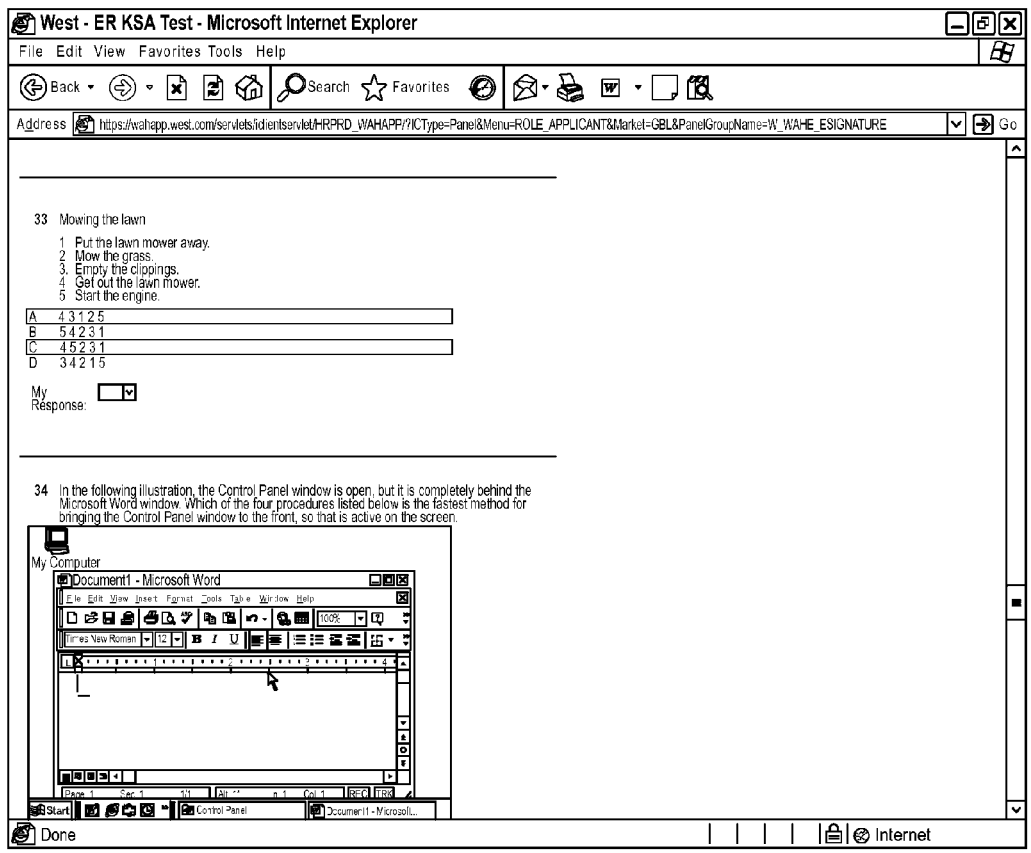
Figure 10P:
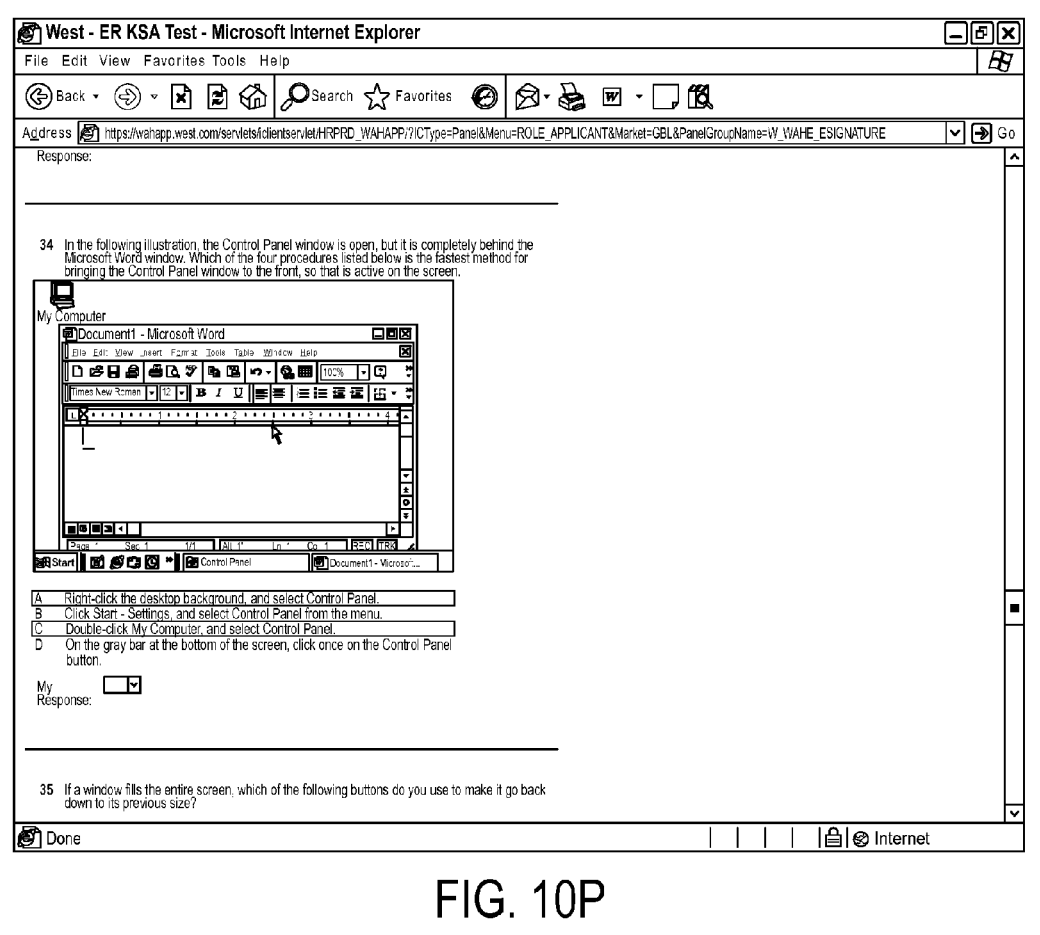
Figure 10Q:
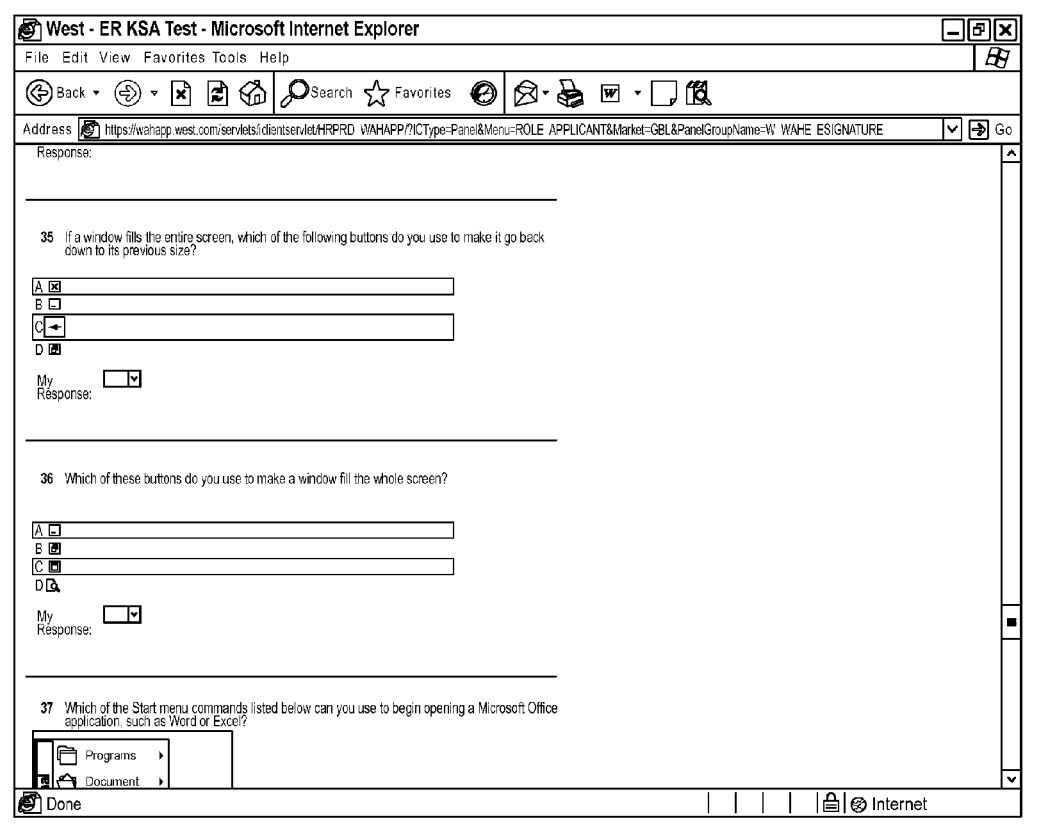
Figure 10R:
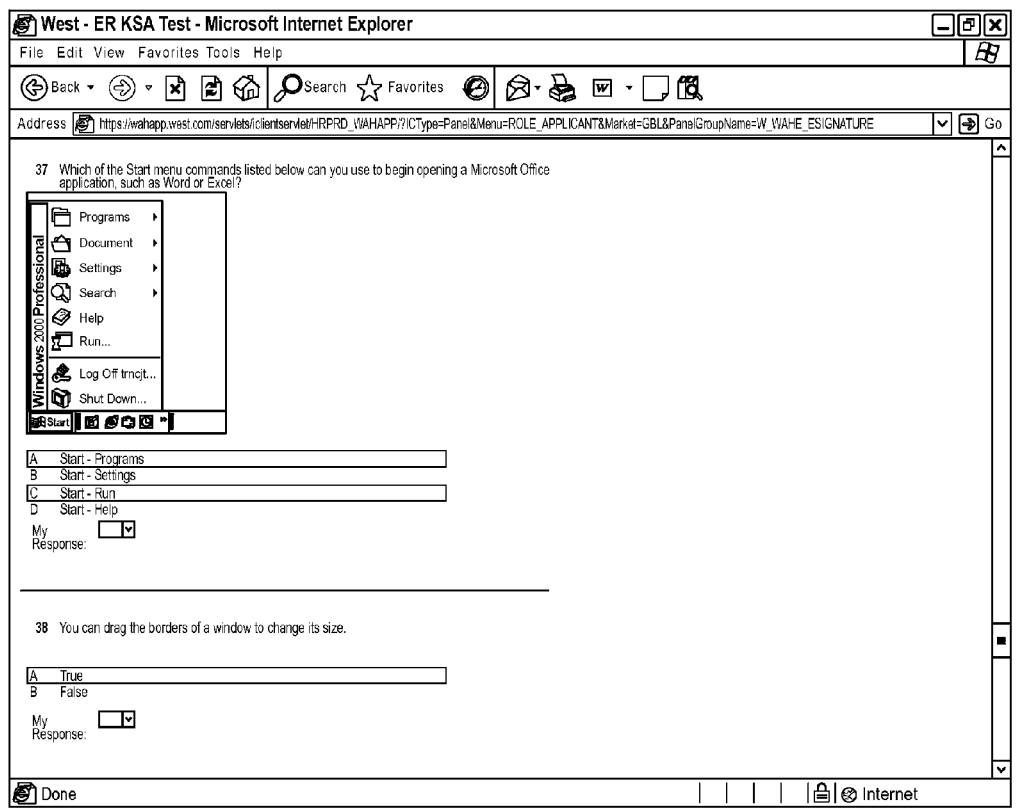
Figure 10S:
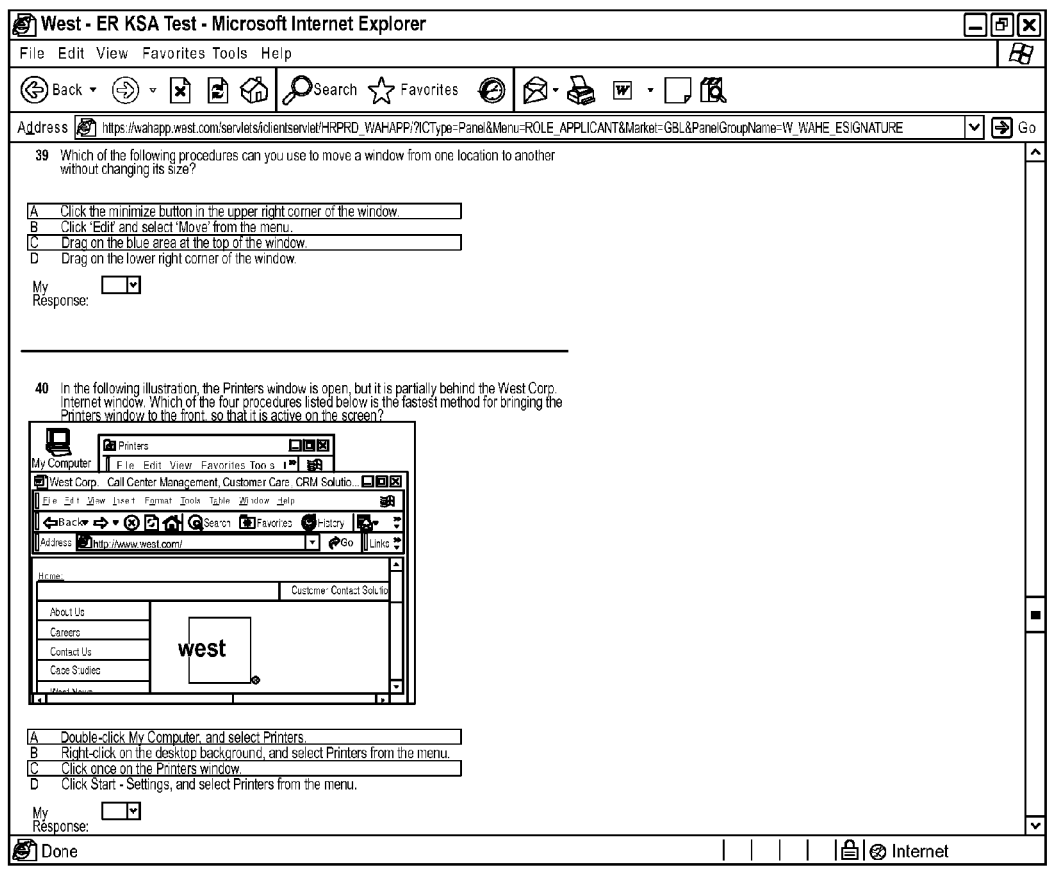
Figure 10T:
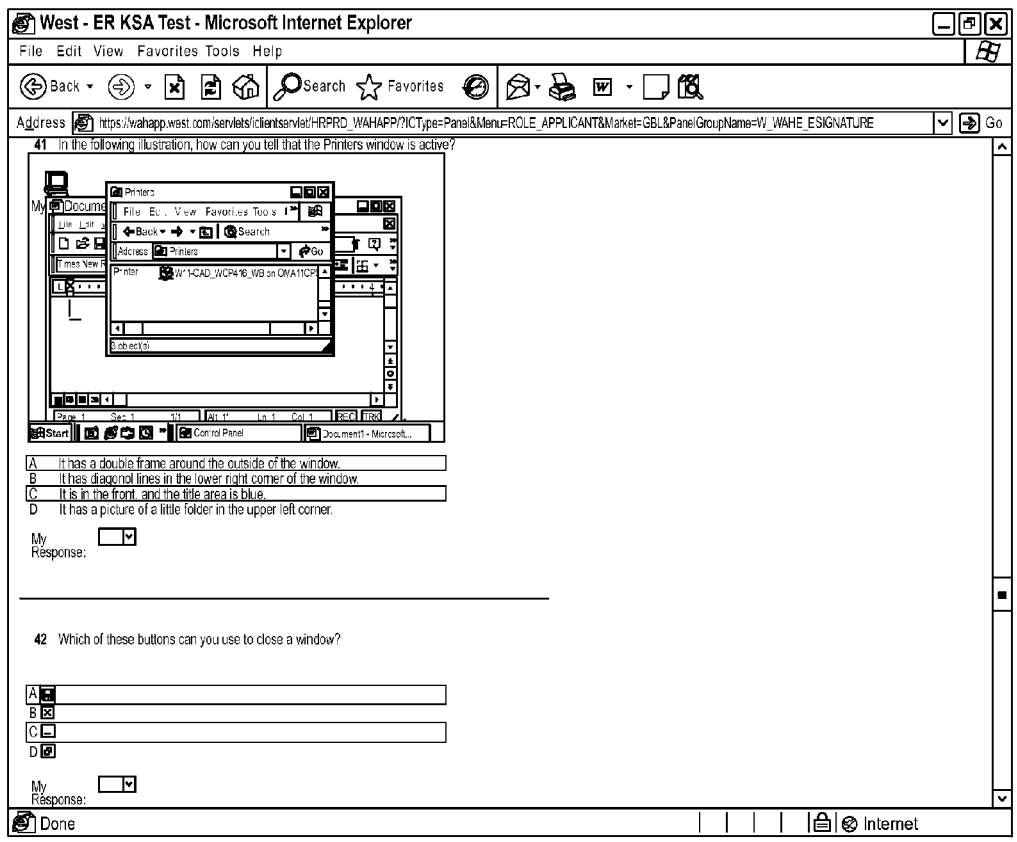
Figure 10U:
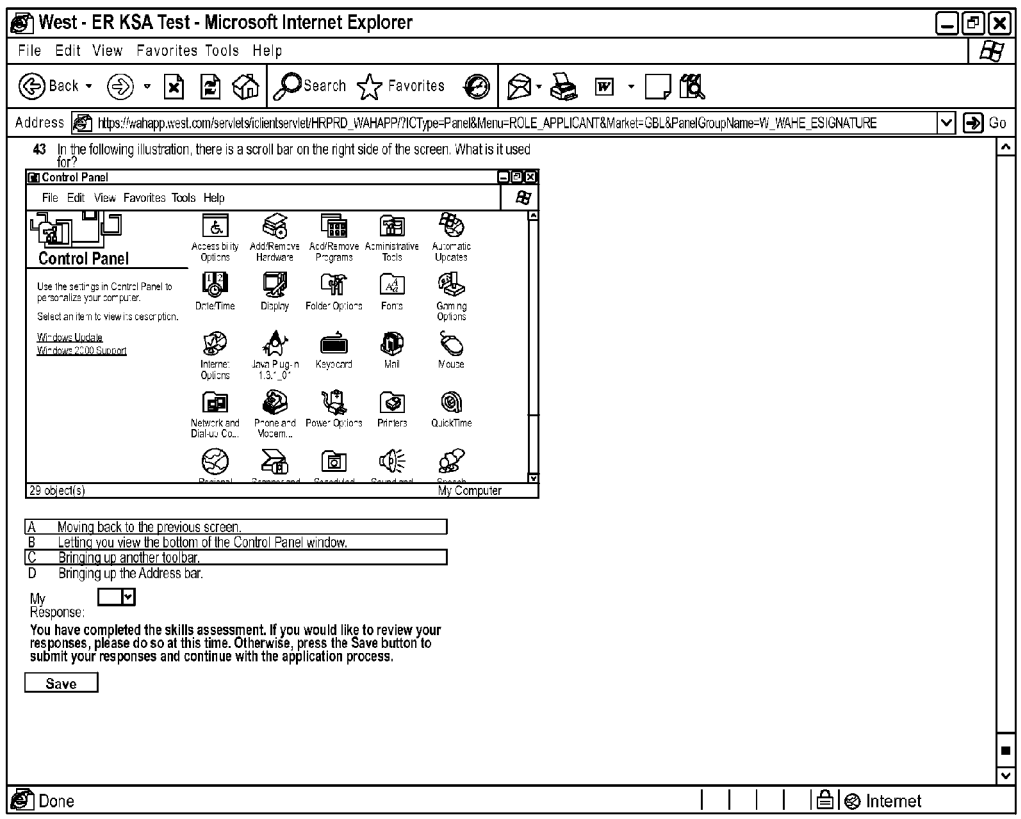
Figure 11A:
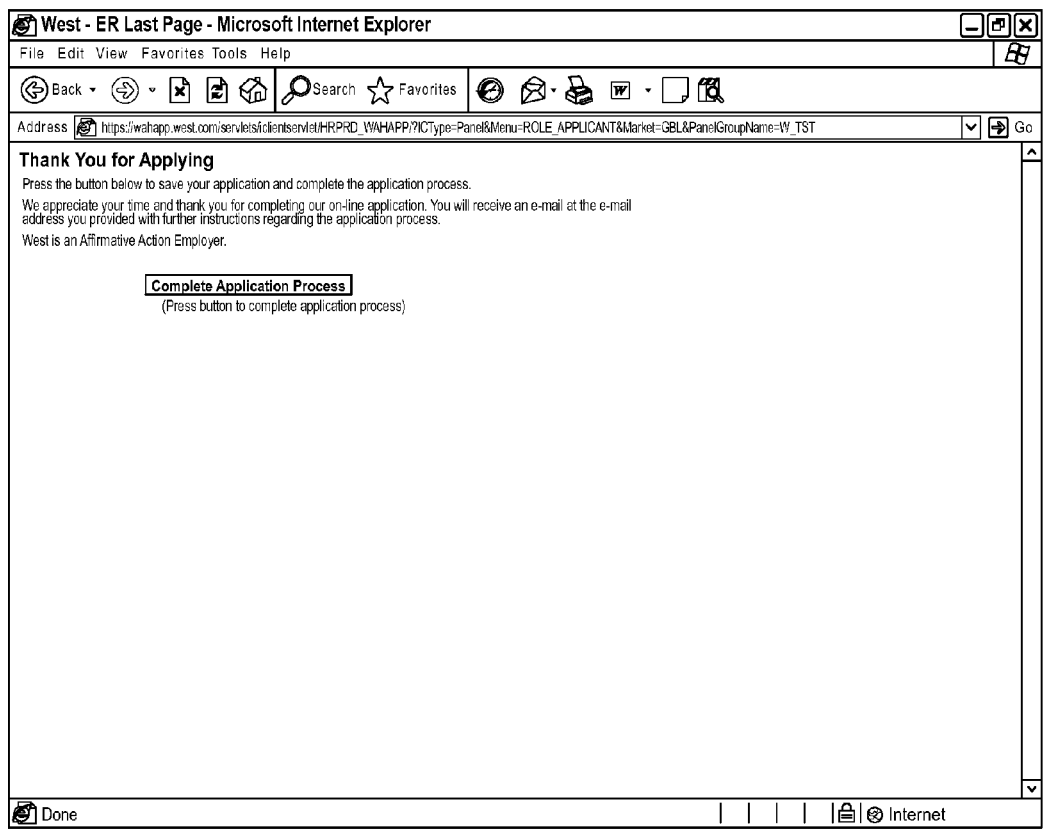
FIGS. 11A-C are GUI screen shots of web pages for finalizing part of the process of FIG. 5, namely, to submit the application completed to-date for review.
Figure 11B:
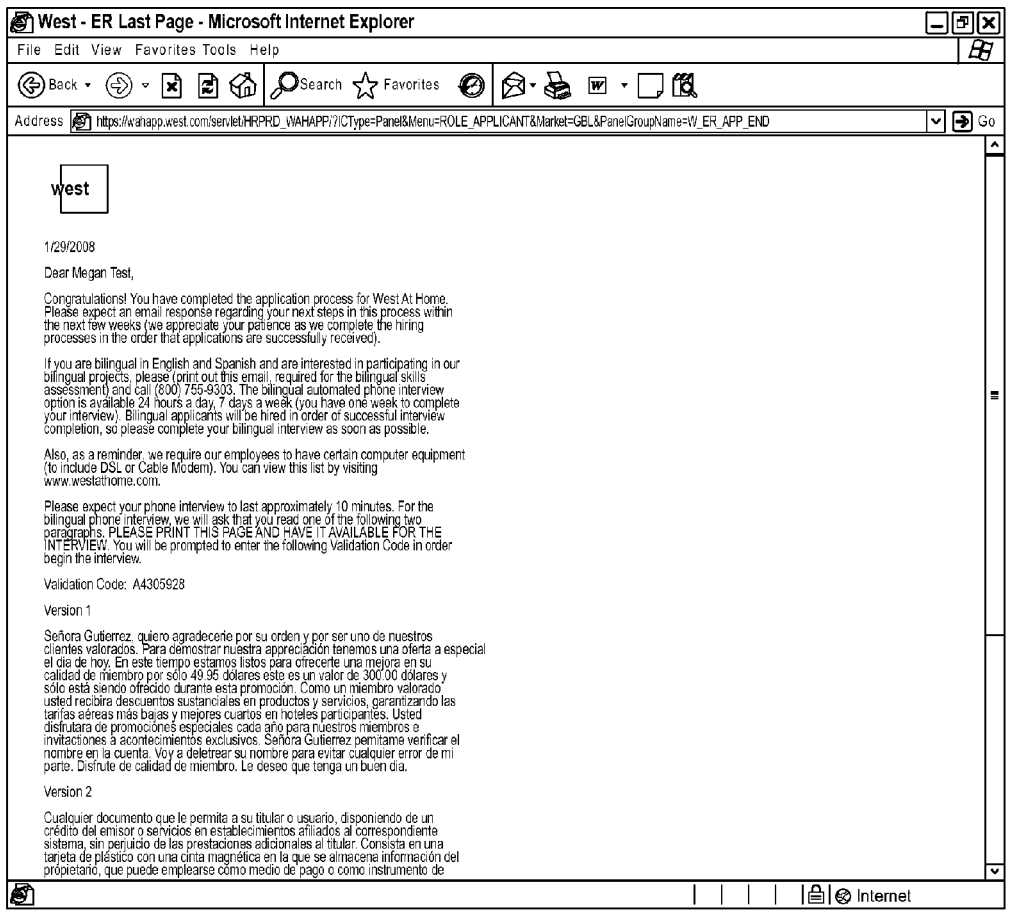
Figure 11C:
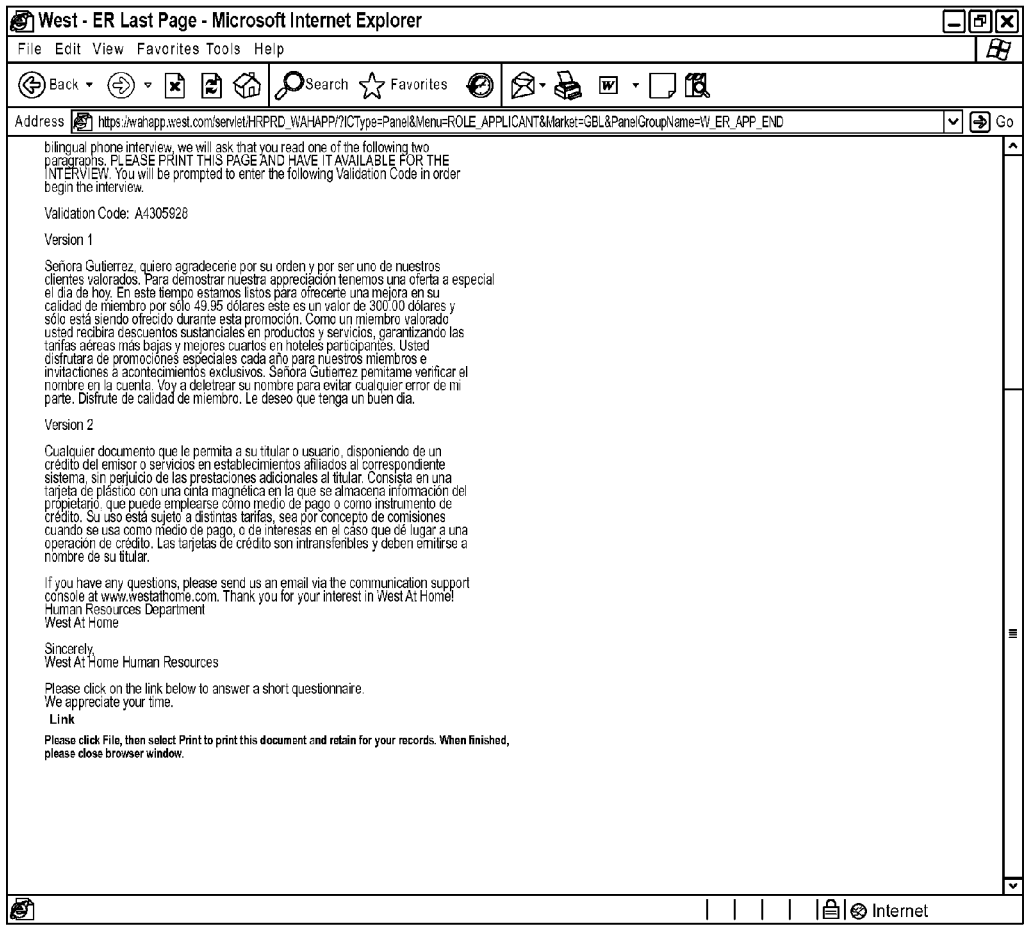

Following completion of the resume building stage, the process advances to the KSA assessment test, as depicted in the web pages shown in FIGS. 10A-U. As shown, the KSA assessment test presents a series of forty-three multiple choice questions over a succession of web pages, which the candidate responds to from the given answer selections. This testing scheme is easy to evaluate since a score is readily determined by comparing the user-furnished answers with the correct answers stored in the evaluation criteria 158 of database 154 at server 144. Any testing scheme may be used known to those skilled in the art.

Returning to FIG. 5, the KSA assessment scheme first checks the process manager (program 152) to see if the candidate previously took the KSA test (steps 216, 218). If so, and the candidate passed the prior test, then the candidate is advanced to the next stage, the interview process (step 220 and flow direction 222). If the candidate did not pass the prior test, then the applicant disposition is designated as 'failed the KSA,' a notice is sent to the applicant disclosing this updated disposition, and the application process is terminated (steps 224, 226, 228, 230).

Referring again to decision step 218, if the candidate has not previously taken the KSA test, then the KSA assessment test is administered to the candidate (step 232). The test administration is depicted in the sequence of web pages shown in FIGS. 10A-U. The candidate finishes the application process—insofar as the resume building and KSA assessment stages are concerned—and submits the application for review. This submission, and subsequent confirmation of receipt of the application, is indicated by the web pages shown in FIGS. 11A-C.

The KSA assessment test is then graded, and a determination is made whether a passing score was achieved (step 234). If not, the process proceeds to termination (steps 224, 226, 228, 230). If the candidate passes, the process proceeds to the interview portion.

First, before launching the IVR dialogue, the process checks to see whether the candidate has previously taken the IVR within the last year (steps 236, 238). If so, the results are still valid. If the candidate passed this prior valid IVR, then the candidate status is designated 'qualified on hold' (QOH), which permits the candidate to proceed to the hiring process, i.e., the candidate is approved for employment (steps 240, 242, 244, 246). If the candidate did not pass this prior valid IVR, then the process is terminated, namely, the applicant disposition is changed to 'not hired,' and an email notification is sent to the applicant disclosing this decision (steps 240, 248, 250, 252, 254).

If the candidate has not previously taken an IVR, then interview scheduling information is generated and emailed to the applicant (steps 238, 256, 258). At this point, at the initiative of the applicant (i.e., the applicant calls the IVR system at the appointed time and number), the IVR test is taken (step 260).

Reference is briefly made to FIGS. 12A-B, FIGS. 13A-F, FIGS. 14A-Z, and FIGS. 15A-B, which depict GUI screen shots of web pages pertaining to the various courses of action taken by the application process depending upon the outcome of the IVR test results.

As mentioned previously, in the web-based embodiment of the invention, a server hosts the website from which the executable employment application program can be launched. To start the application procedure, the candidate first accesses the relevant website by using the client browser to navigate to the known employer website, and then launches the program from there, e.g., by activating the "Application" button in FIG. 8A. During this process, the candidate can establish an account with the employer, allowing the candidate to resume the process if an interruption occurs or the candidate does not finish the application in one session. The candidate can also retrieve notices from the account sent by the employer, such as status updates indicating the outcome of any evaluations.

Figure 12A:
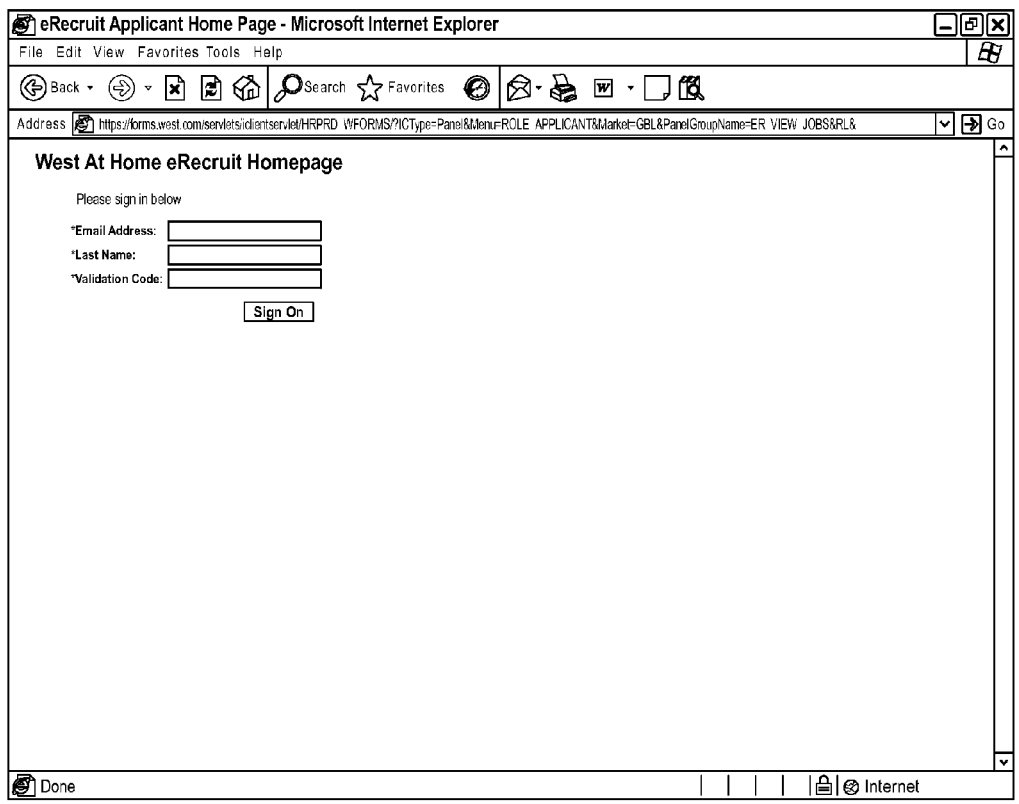
FIGS. 12A-B are GUI screen shots of web pages for facilitating a login to a website that facilitates the process of FIG. 5.
Figure 12B:
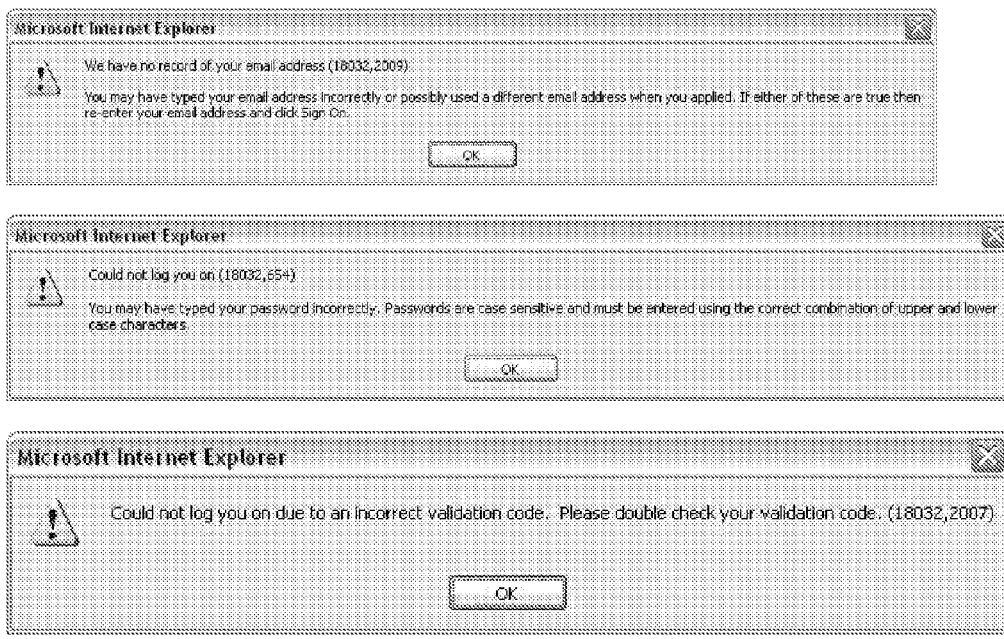

For example, following completion of the interview when the candidate takes the IVR test, the candidate can log into the individual account maintained by the employer to check on the test results. FIG. 12A shows a web page depicting such a login screen. FIG. 12B shows different web page replies when an error is made in the login attempt.

Figure 13A:
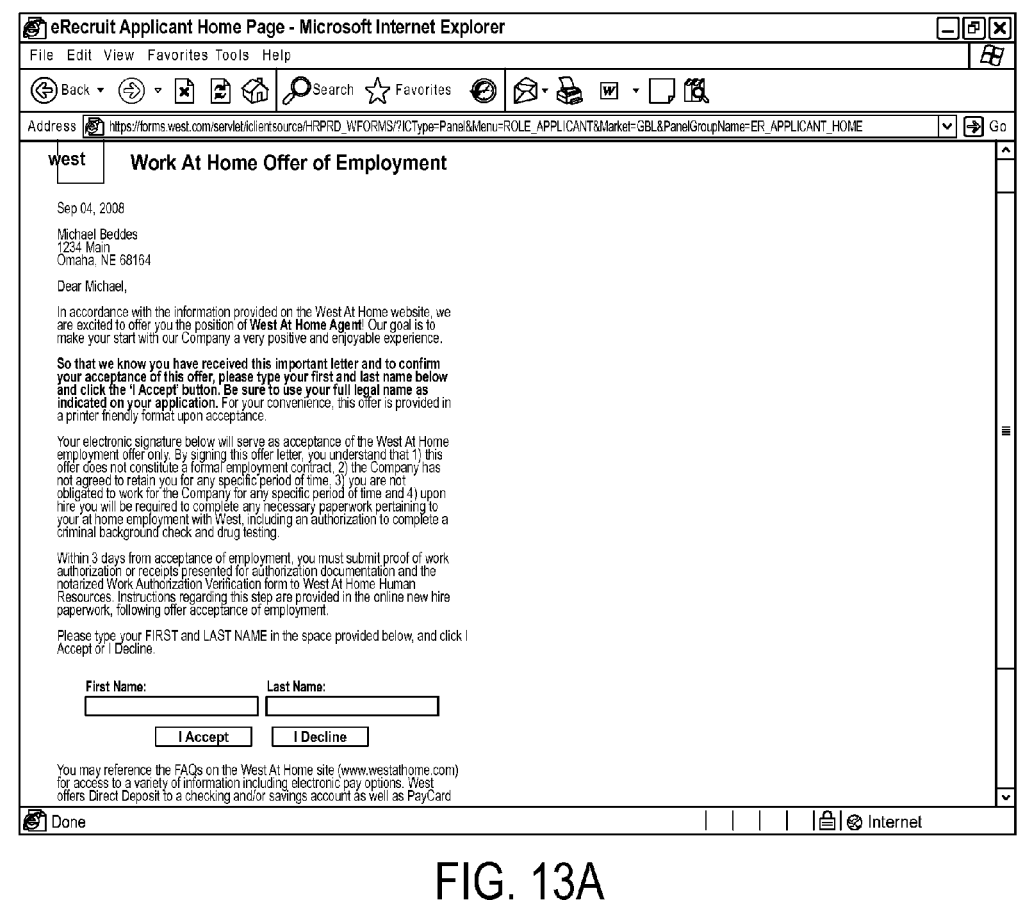
Figure 13B:
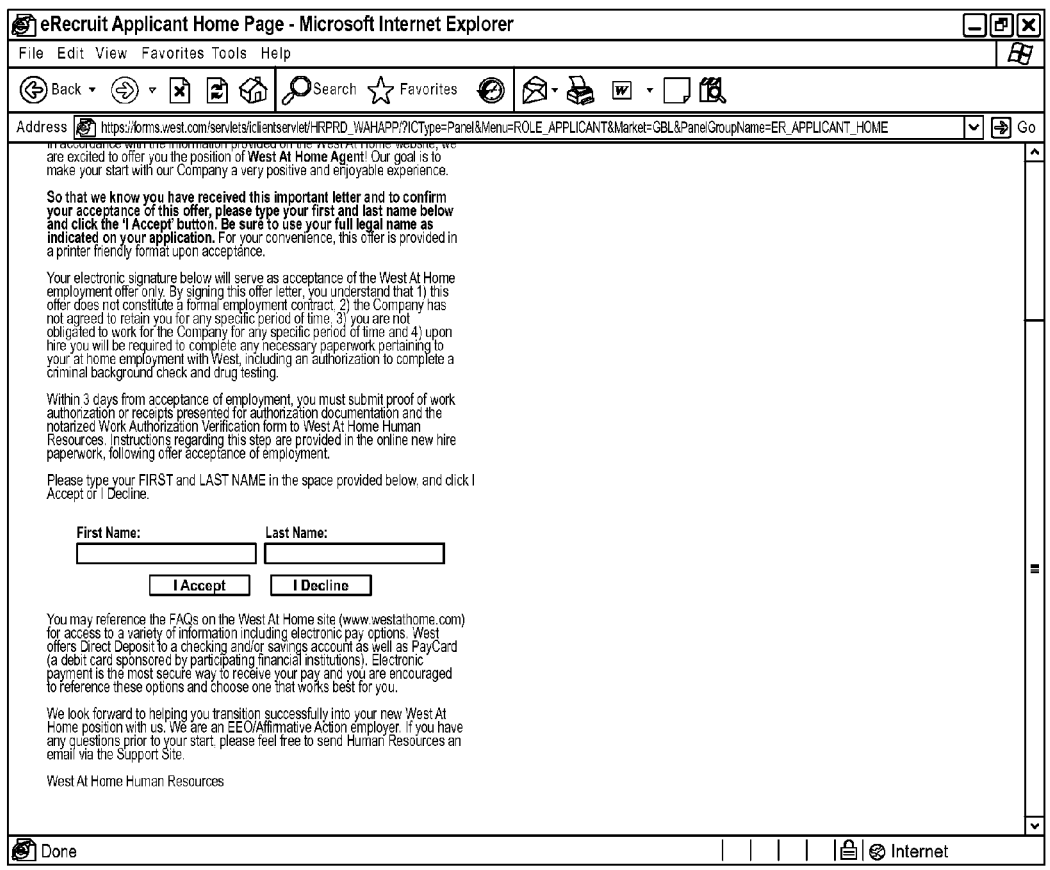
Figure 13C:
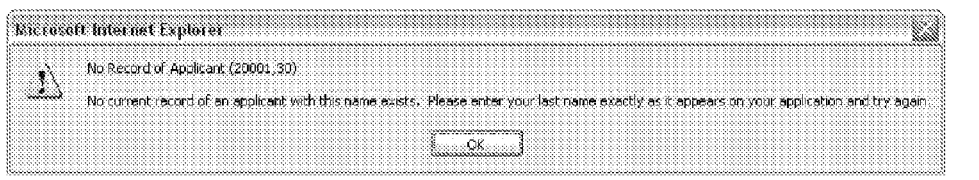
Figure 13C:
Figure 13C:
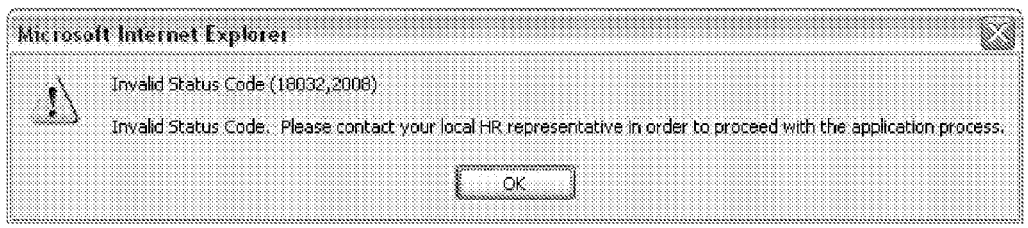
Figure 13D:
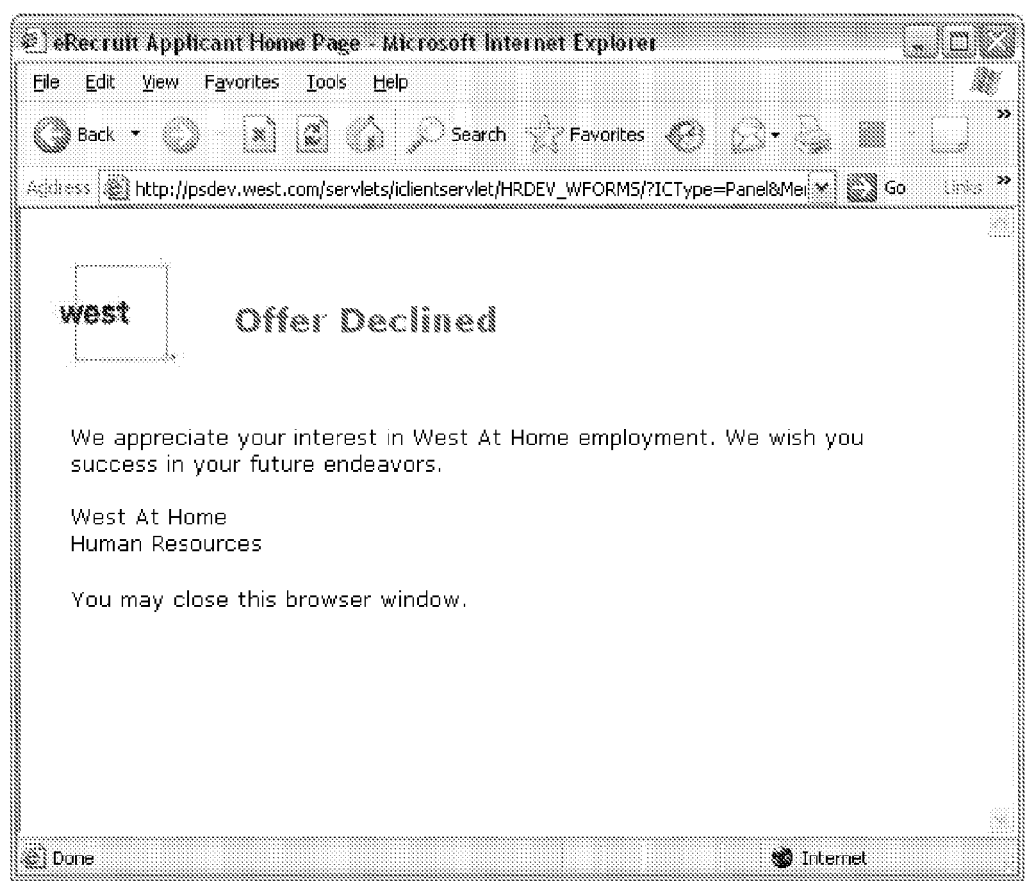
Figure 13E:

If the candidate passes the IVR test, the candidate would receive an email letter constituting an offer of employment, such as the one shown in the web page of FIGS. 13A-B. Such a letter would be posted to the candidate email account and accessed by the candidate upon successful login to the account. As shown in FIG. 13B, the candidate is asked to submit an e-signature and either accept or decline the offer. FIG. 13C shows different web page replies when an error occurs as the candidate attempts to submit the reply to the offer. FIG. 13D shows the web page that is displayed in reply to the candidate declining the offer, while FIG. 13E shows the web page in reply to the candidate accepting the offer.

Returning to the process of FIG. 5, following completion of the IVR test, the IVR test is graded and a determination is made whether a passing score was achieved (steps 262, 264). If failure occurs, the applicant receives a 'fail' designation and a rejected disposition, which is communicated to the applicant; the application process is then terminated (steps 266, 268, 270).

Otherwise, if the candidate passes the IVR test, the candidate is next reviewed for placement in a 'ready to hire' category (step 272). If such placement is not ordered, the applicant is placed into QOH status, and notified of this development (step 274). Otherwise, if the candidate is deemed 'ready to hire,' then the candidate is extended an offer of employment. FIGS. 13A-B show exemplary web pages used to make such an offer. And, if the candidate accepts the offer, a reply web page such as shown in FIG. 13E is displayed.

At this juncture, the application process is essentially closed, concluding with the offer of employment. Further tasks still remain, though. As indicated in FIG. 13E, the new hire is requested to fill out various forms supplied to the candidate in the same online format that was used to navigate through the application process.

Figure 14C:
FIGS. 14A-Z are GUI screen shots of web pages presenting the online forms listed in the web page of FIG. 13F.
Figure 14D:
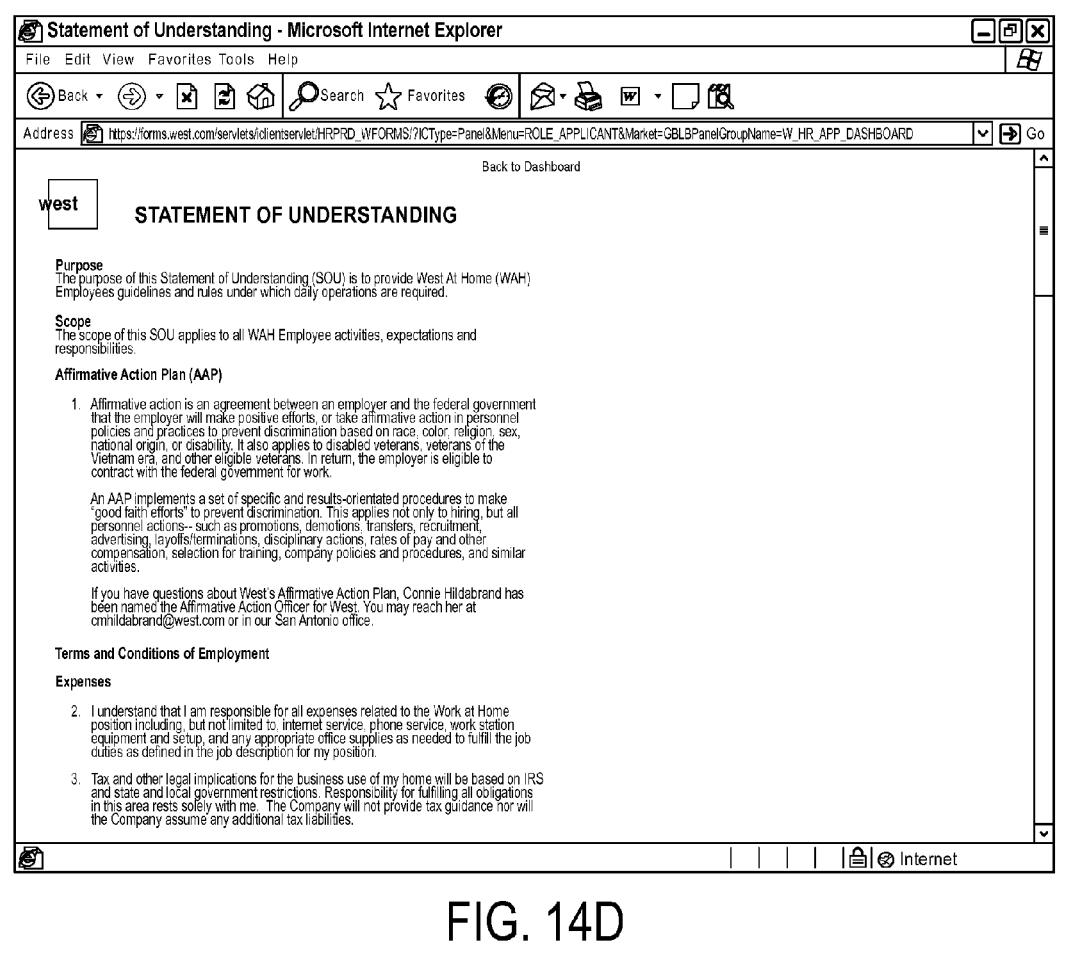
Figure 14E:
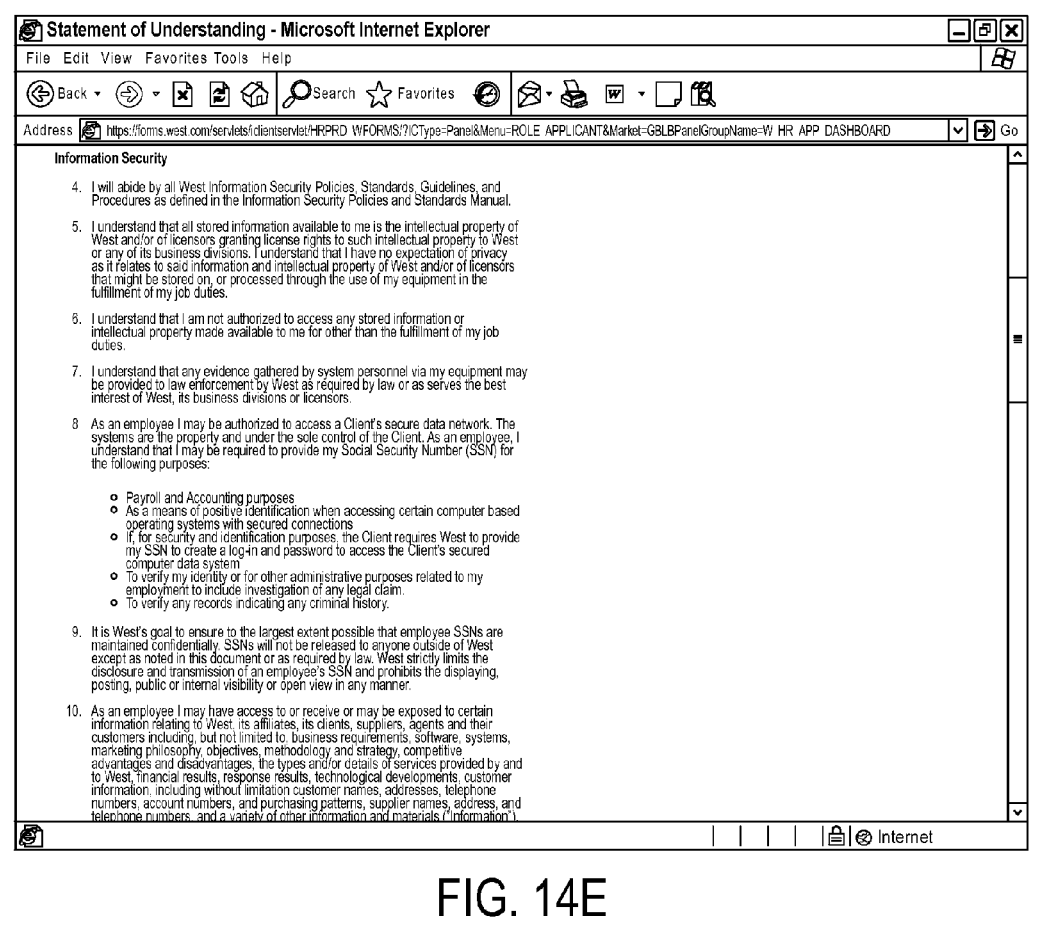
Figure 14F:
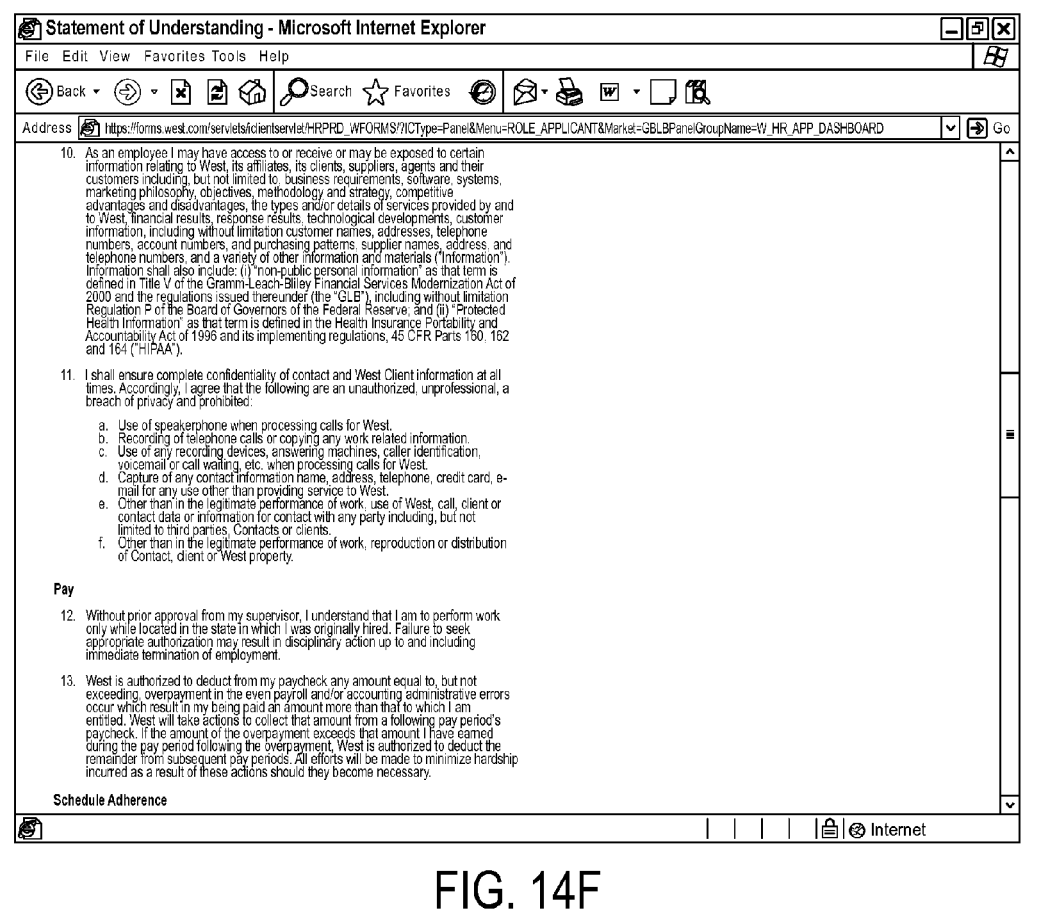
Figure 14J:
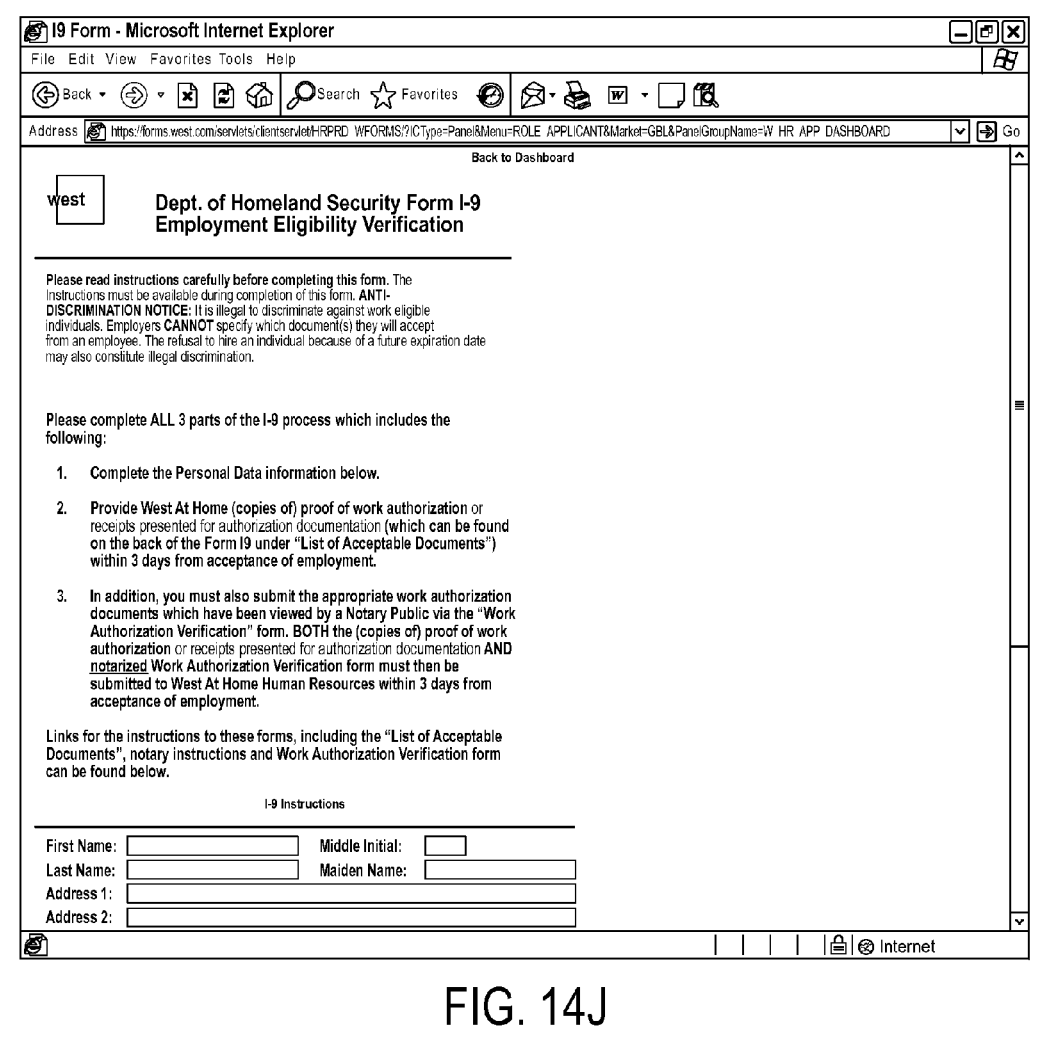
Figure 14K:
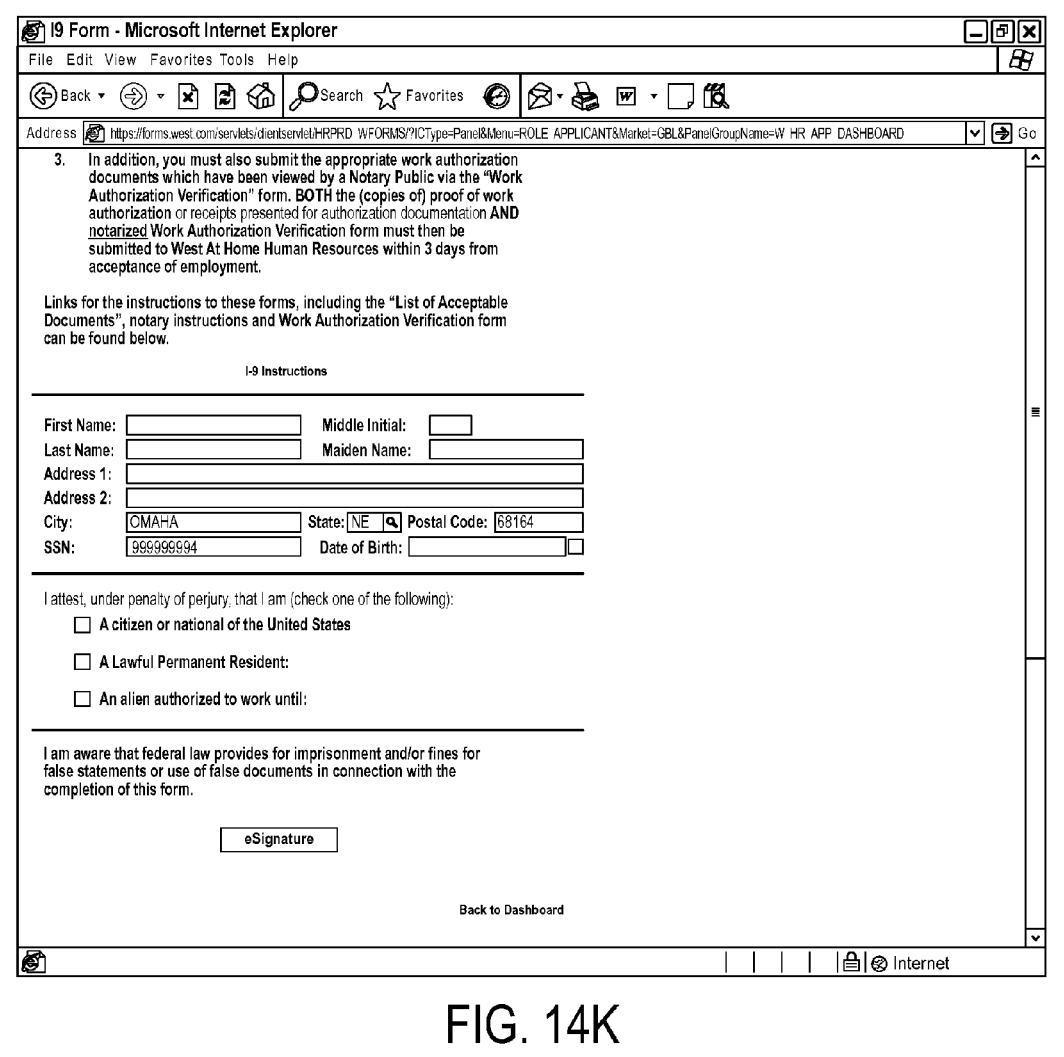
Figure 14N:
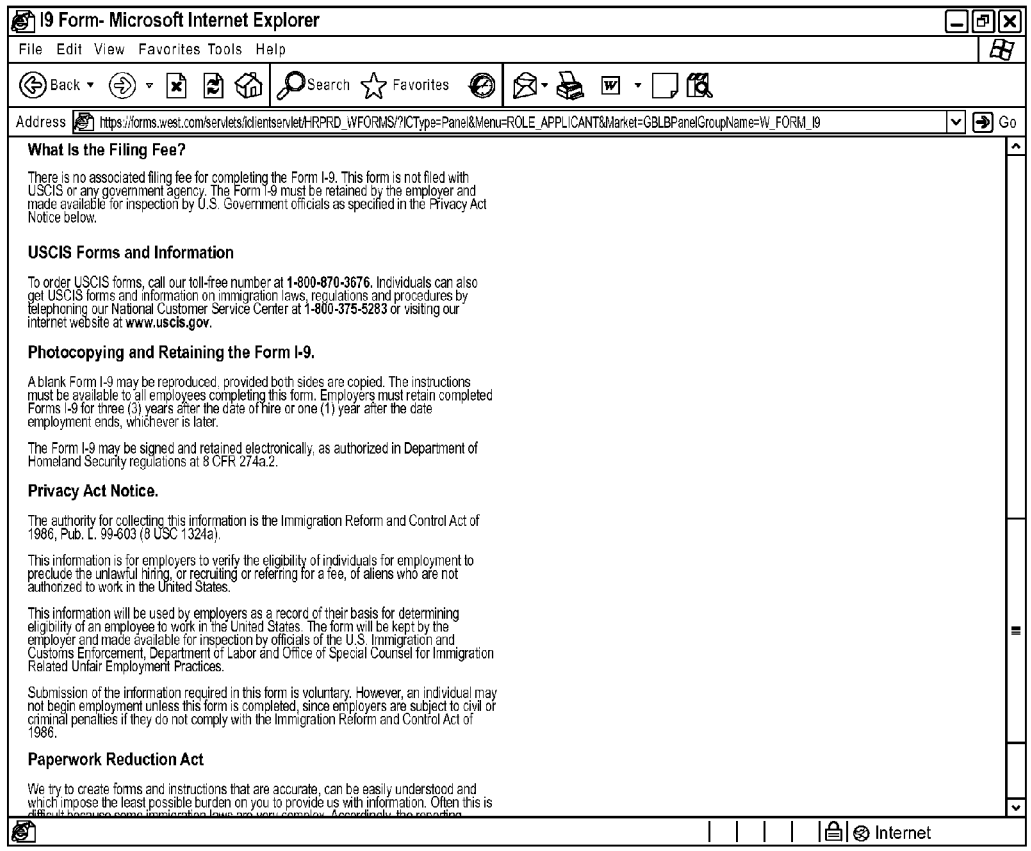
Figure 14O:
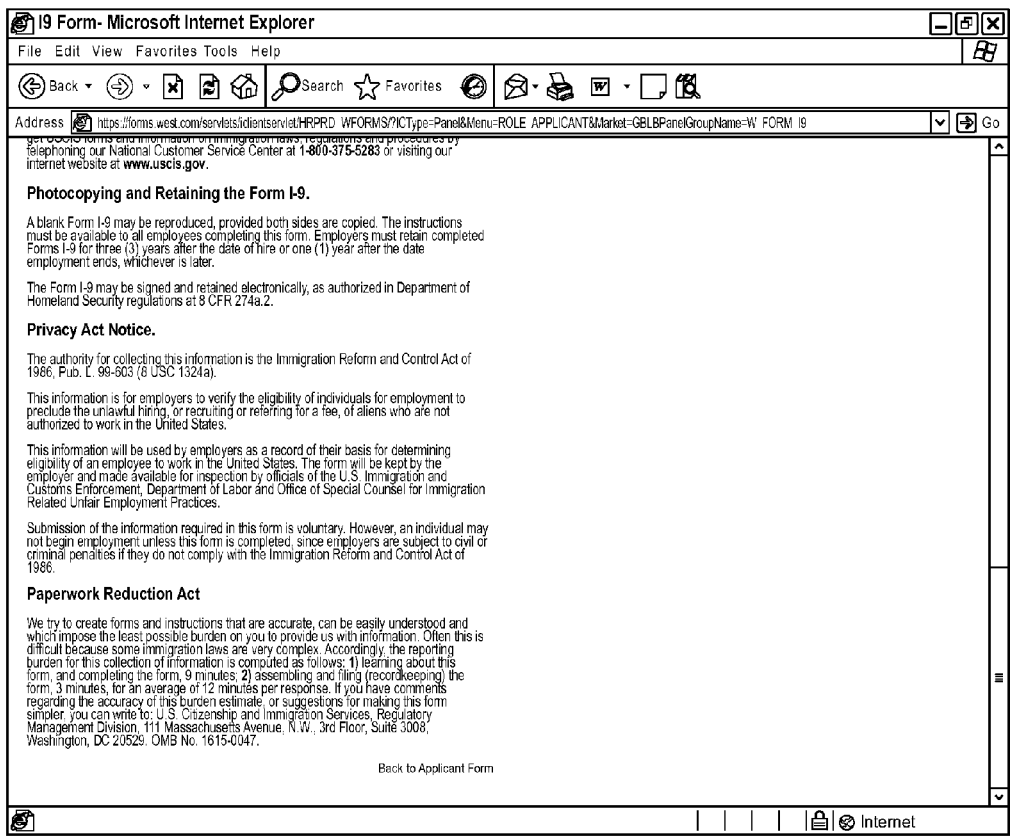
Figure 14Q:
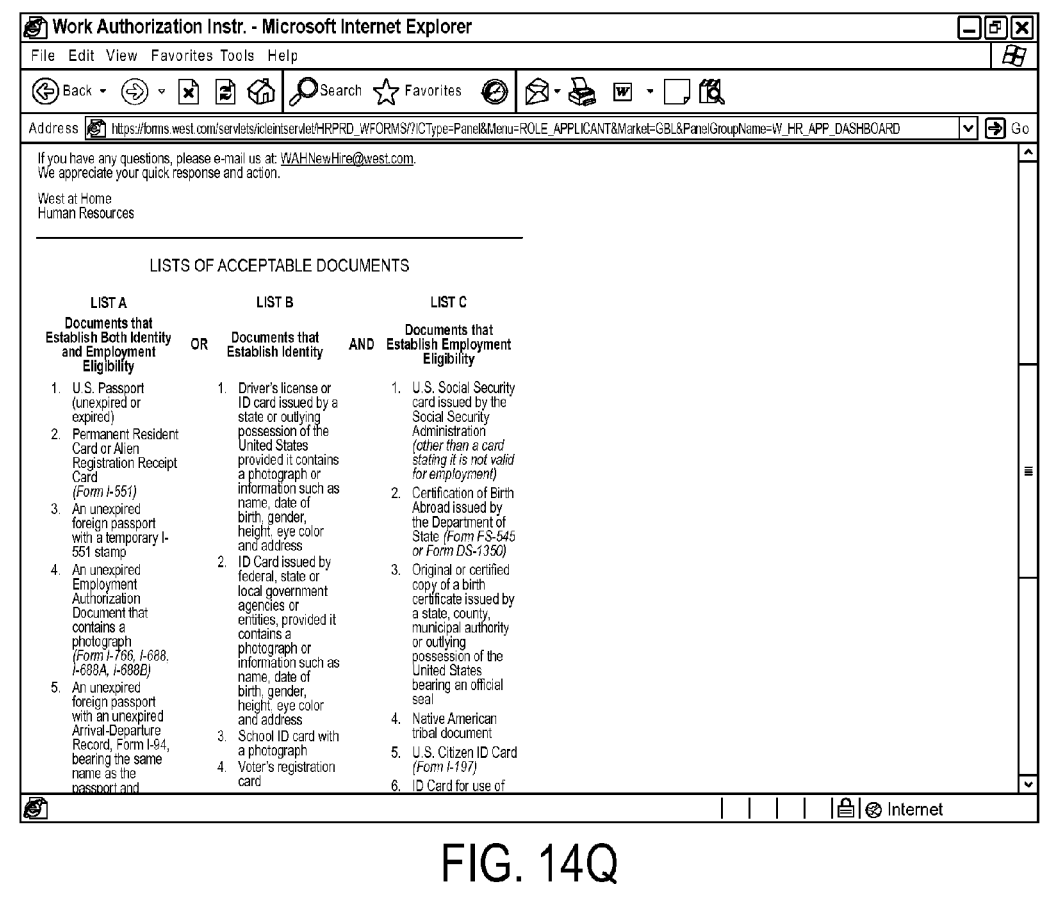
Figure 14S:
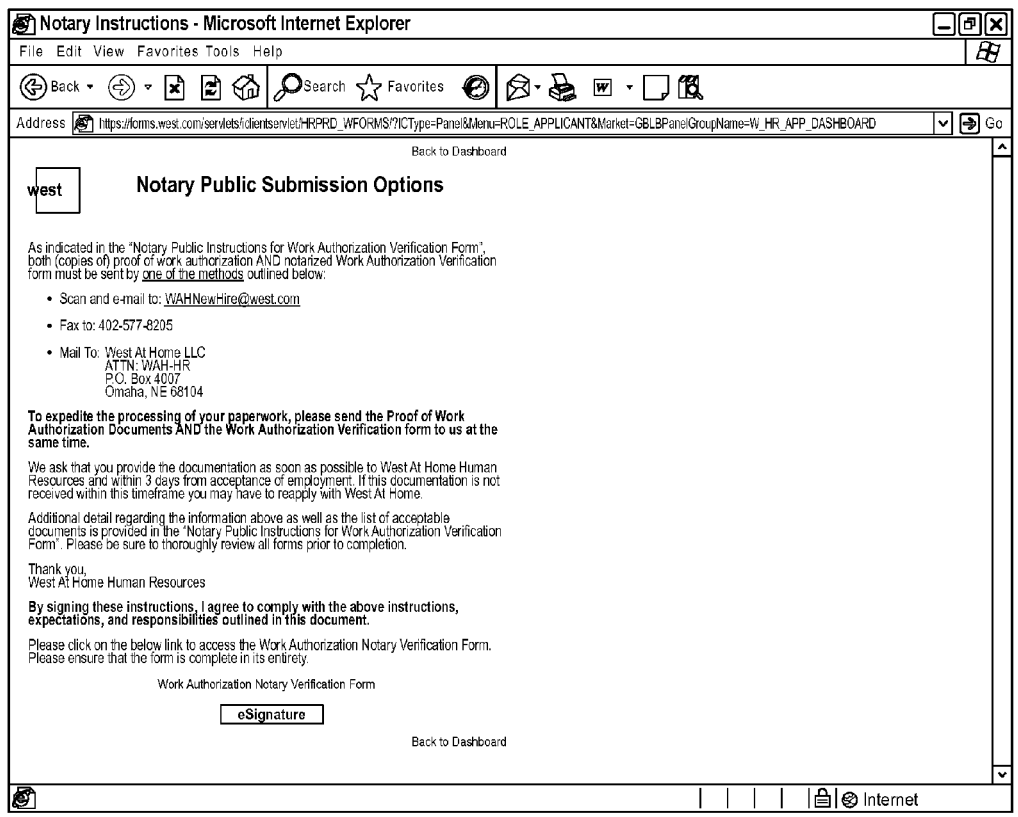
Figure 14T:
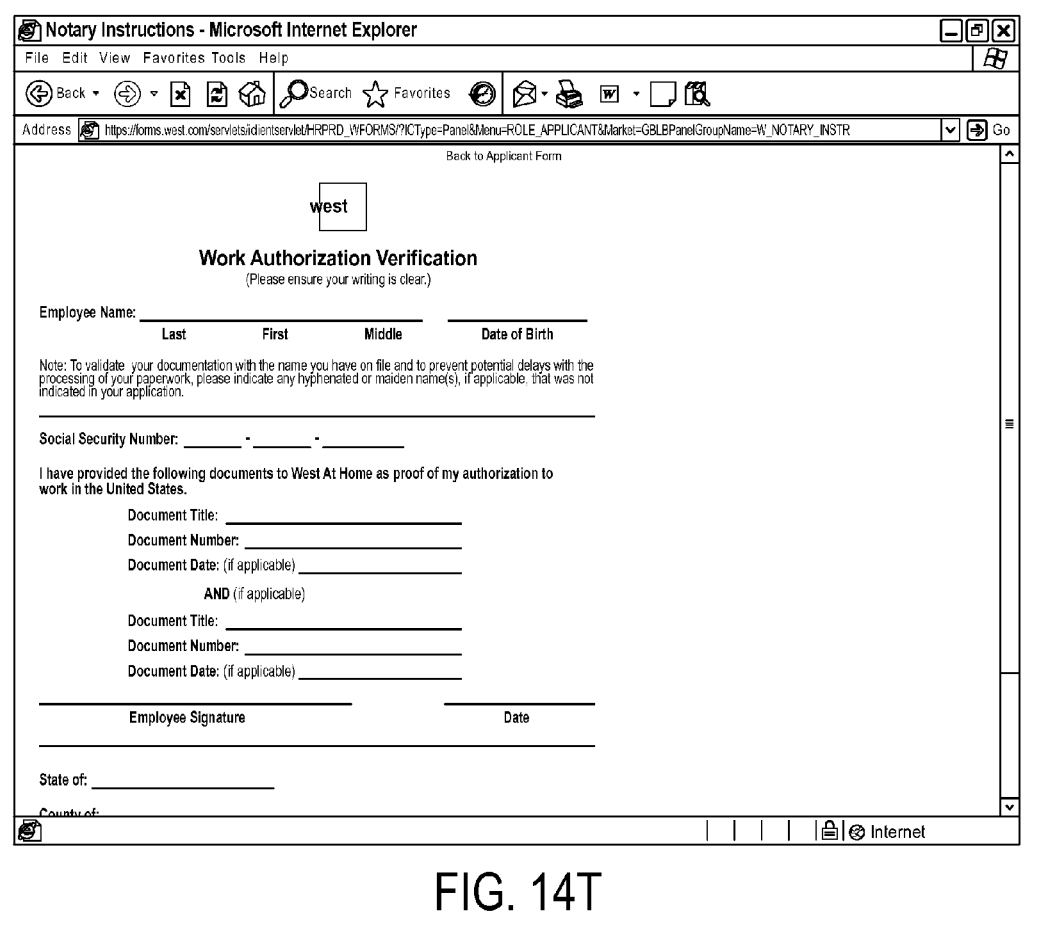
Figure 14U:
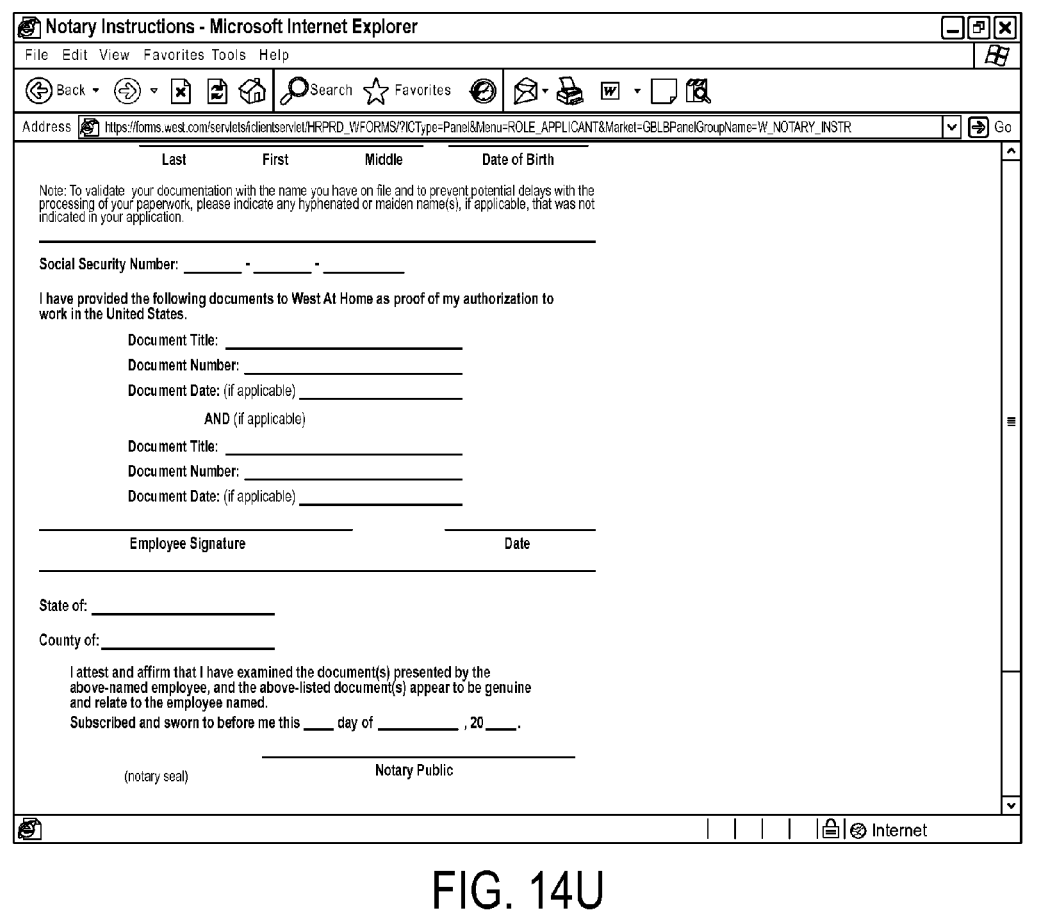
Figure 14X:
Figure 14Y:
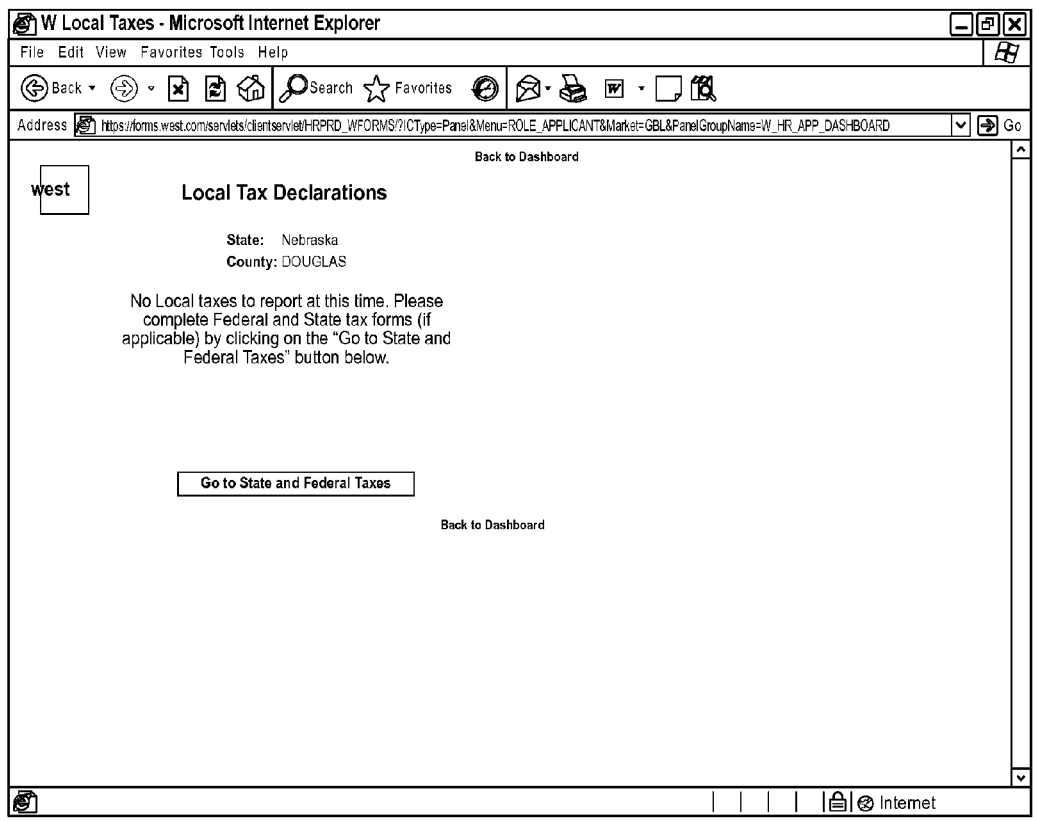
Figure 14Z:
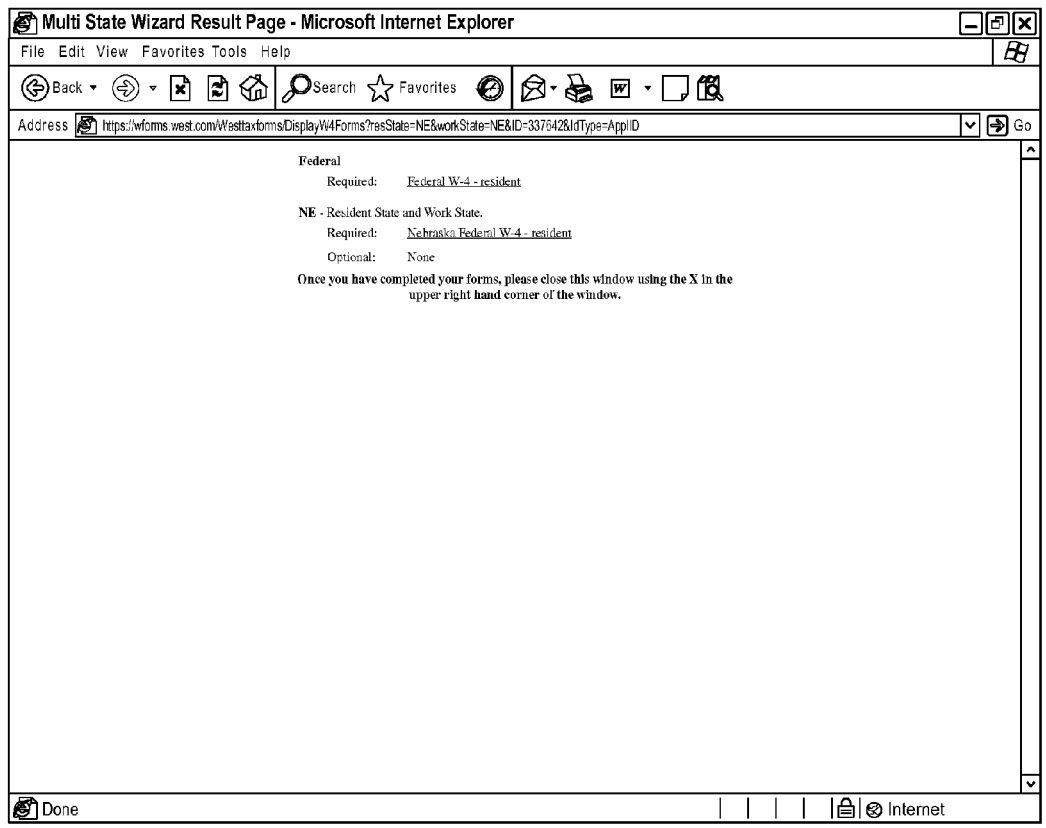

To facilitate completion of the forms, the candidate is sent the forms via email or otherwise redirected to the area of the website where the forms are located (step 276). For example, a web page such as that shown in FIG. 13F may be displayed to provide an itemized listing of all of the requisite forms. From this opening web page (or applicant form dashboard), the candidate can advance through a succession of web pages containing the fillable forms, as shown in FIGS. 14A-Z.

Figure 15A:
FIGS. 15A-B are GUI screen shots of web pages illustrating content for submitting the completed online forms shown in FIGS. 14A-Z.
Figure 15B:
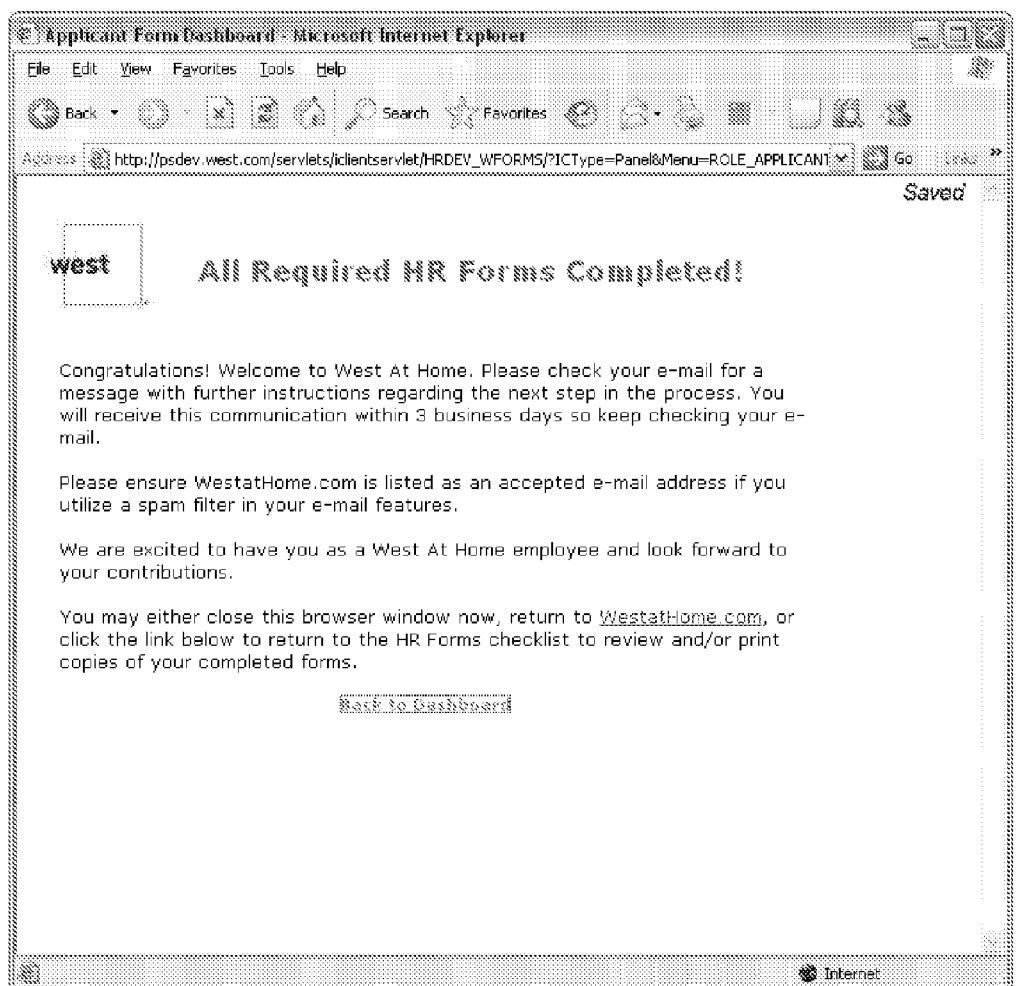

Once the forms are completed and submitted, the applicant is placed in the disposition set by the IVR grading scheme (step 278). For example, each candidate who passes the IVR test receives an employment ranking depending on the IVR test score. FIG. 15A shows a web page to facilitate submission of the forms. Once an integrity check is performed on the forms to determine if they are complete, an online notice is sent to the candidate indicating successful completion (FIG. 15B). At this point, the entire process is finished (step 280).

With regard to operations discussed herein implemented by an electronic or computer configuration, these functions may be implemented using any combination of hardware and software. Suitable programming techniques known to those skilled in the art can be used to control, direct, and manage the operations specified by any of the processors discussed herein. For example, the processor functionalities can incorporate computer-executable instructions that perform the indicated operations when executed by a microprocessor or other such data facility.

While this invention has been described as having a preferred methodology and design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of evaluating an applicant for employment, comprising the steps of:
receiving via a receiver from the applicant, via an interactive electronic medium, first data relating to qualifications of the applicant the qualifications comprising at least one of applicant education, prior applicant experience, applicant work history, applicant professional affiliations, applicant achievements, applicant recognitions, and applicant job skills, the applicant providing the first data in response to at least one corresponding first query communicated via the interactive medium during a first stage of the employment evaluation;
evaluating via a processor qualification data received from the applicant to determine whether the candidate possesses one of an adequate, sufficient, and satisfactory qualification level to permit continuance of the application process;
identifying the qualification level of the applicant to be at least at a satisfactory qualification level prior to proceeding to a second stage of the employment evaluation;
evaluating via the processor the first data received from the applicant, according to predetermined criteria and storing the first data in a memory;
receiving from the applicant, via the interactive medium, second data suitable for making an assessment of the applicant relative to work performance competency, the applicant providing the second data in response to at least one corresponding second query communicated via the interactive medium and storing the second data in the memory;
identifying the work performance competency of the applicant to be at least at a satisfactory knowledge skills and abilities (KSA) level prior to proceeding to a third stage of the employment evaluation;
evaluating via the processor the second data received from the applicant, according to predetermined criteria;
retrieving from a database predefined correct answers;
comparing the predefined correct answers to at least one of the first data and the second data;
evaluating the results of the comparing operation;
calculating a score based on a measured correlation between the predefined correct answers and the at least one of the first data and the second data;
initiating an interactive voice response (IVR) candidate selection operation that facilitates a live interview stage with the applicant over a voice connection;
retrieving interview questions from an automated query generator and submitting the questions to the applicant over the voice connection;
receiving answers to the questions from the applicant over the voice connection;
comparing the answers to predetermined criteria stored in a database via an evaluator module;
determining evaluation results and transmitting the evaluation results to a controller to determine a next course of action; and determining a suitability of the applicant for employment, based on the results of the first data evaluation, the second data evaluation, the live interview stage, and the calculated score.

2. The method of claim 1, further includes the steps of:
receiving from the applicant, via the interactive medium, third data relating to employment eligibility of the applicant, the applicant providing the third data in response to at least one corresponding third query communicated via the interactive medium;
determining an eligibility of the applicant for employment, using the third data; and
proceeding to cause the at least one first query communication and the at least one second query communication upon a satisfactory determination of eligibility.

3. The method of claim 1, further includes the steps of:
following a favorable determination of suitability of the applicant for employment, conducting an automated interview with the applicant and generating interview data representative thereof;
evaluating the interview data; and
generating a hiring decision concerning the applicant, based on the results of the interview data evaluation.

4. The method of claim 3, further includes the step of:
following an affirmative hiring decision, receiving from the applicant, via the interactive medium, fourth data relating to new hire information, the applicant providing the fourth data in response to at least one corresponding fourth query communicated via the interactive medium.

5. The method of claim 1, further includes the step of:
generating a plurality of user-interactive web pages to facilitate communication of the at least one first query and the at least one second query, and to facilitate collection of the first data and the second data submitted by the applicant in response to the queries.

6. The method of claim 1, further includes the steps of:
providing a client, a server, and an operative connection between the client and the server;
conducting at least one communication session between the client and the server;
enabling the server, in the at least one communication session, to communicate to the client the at least one first query and the at least one second query;
enabling the applicant, in the at least one communication session, to communicate to the server, via the client, the first data and the second data; and
the server performing the evaluation of the first data, the evaluation of the second data, and the determination of suitability of the applicant for employment.

7. The method of claim 6, wherein:
the step of enabling the server to communicate to the client includes the step of generating at least one web page for transmission to the client; and
the step of enabling the applicant to communicate to the server via the client includes the step of the applicant interacting with the at least one web page transmitted by the server.

8. The method of claim 6, further includes the steps of:
the server maintaining a website; and
facilitating conduct of the at least one communication session by the client obtaining access to the website.

9. The method of claim 1, wherein the first data includes resume information, and the second data includes information indicative of at least one of knowledge, skills, and abilities of the applicant.

10. A method of evaluating an applicant for employment, the method comprising:
generating via a processor at least one query relevant to an application for employment by presenting at least one first query relating to eligibility for employment, at least one second query relating to qualifications, and at least one third query relating to an assessment regarding work performance competency, the qualifications comprising at least one of applicant education, prior applicant experience, applicant work history, applicant professional affiliations, applicant achievements, applicant recognitions, and applicant job skills;
enabling the applicant to provide at least one response to the at least one first query, the at least one second query and the at least one third query during a first stage of the employment evaluation;
evaluating via the processor qualification data received from the applicant to determine whether the candidate possesses one of an adequate, sufficient, and satisfactory qualification level to permit continuance of the application process;
identifying the qualification level of the applicant to be at least at a satisfactory qualification level prior to proceeding to a second stage of the employment evaluation;
identifying the work performance competency of the applicant to be at least at a satisfactory knowledge skills and abilities (KSA) level prior to proceeding to a third stage of the employment evaluation;
including a computing facility, for processing and evaluating the at least one applicant response to determine a suitability of the applicant for employment;
retrieving from a database predefined correct answers;
comparing the predefined correct answers to the at least one response;
evaluating the results of the comparing operation;
calculating a score based on a measured correlation between the predefined correct answers and the at least one response;
initiating an interactive voice response (IVR) candidate selection operation that facilitates a live interview stage with the applicant over a voice connection;
retrieving interview questions from an automated query generator and submitting the questions to the applicant over the voice connection;
receiving answers to the questions from the applicant over the voice connection;
comparing the answers to predetermined criteria stored in a database via an evaluator module;
determining evaluation results and transmitting the evaluation results to a controller to determine a next course of action; and
providing a determination of eligibility of the applicant for employment responsive to applicant responses to the at least one second query, the live interview stage, and applicant responses to the at least one third query by comparing the applicant responses to the at least one second query and the applicant responses to the at least one third query and the applicant responses to the live interview stage to predetermined criteria and based on the calculated score.

11. The method as recited in claim 10, wherein:
the generating is performed via a server;
the enabling is performed via a client, the client configured for operative communication with the server; and
the processing and evaluating are performed via an executable program, the program configured for operation by the server.

12. The method as recited in claim 10, wherein:
the generating further comprises providing at least one web page presenting the at least one query; and
the enabling is performed via an internet-enabled client having a graphical user interface, the client facilitating access to and presentation of the at least one web page, the client configured for operative communication with the server.

13. The method as recited in claim 10, further comprising:
conducting an automated interview with the applicant via an interactive voice response system and generating interview data representative of the interview; and
evaluating the generated interview data and generating a hiring decision concerning the applicant based on the results of the interview data evaluation.

14. A non-transitory computer-readable storage medium having computer-executable instructions for execution by a processor, that, when executed, cause the processor to:
generate at least one first query during a first stage of the employment evaluation relating to applicant qualifications, the qualifications comprising at least one of applicant education, prior applicant experience, applicant work history, applicant professional affiliations, applicant achievements, applicant recognitions, and applicant job skills;
generate at least one second query relating to an assessment of the applicant relative to work performance competency;
receive at least one response to the at least one first query and to the at least one second query;
evaluate via the processor qualification data received from the applicant to determine whether the candidate possesses one of an adequate, sufficient, and satisfactory qualification level to permit continuance of the application process;
identify the qualification level of the applicant to be at least at a satisfactory qualification level prior to proceeding to a second stage of the employment evaluation;
receive information representative of an interview conducted with the applicant;
process and evaluate the at least one first query response, the at least one second query response, and the received interview information to determine a suitability of the applicant for employment, using the processing and evaluation results as the basis for the suitability determination;
identifying the work performance competency of the applicant to be at least at a satisfactory knowledge skills and abilities (KSA) level prior to proceeding to a third stage of the employment evaluation;
compare the at least one received response to predetermined criteria specifying an acceptability metric;
retrieve from a database predefined correct answers;
compare the predefined correct answers to the at least one response;
evaluate the results of the compare operation;
initiate an interactive voice response (IVR) candidate selection operation that facilitates a live interview stage with the applicant over a voice connection;
retrieve interview questions from an automated query generator and submitting the questions to the applicant over the voice connection;
receive answers to the questions from the applicant over the voice connection;
compare the answers to predetermined criteria stored in a database via an evaluator module;
determine evaluation results and transmitting the evaluation results to a controller to determine a next course of action; and
calculate a score based on a measured correlation between the predefined correct answers, the at least one response and the live interview stage and wherein the suitability determination is further based on the score.

15. The non-transitory computer-readable storage medium of claim 14, wherein the instructions further cause the processor to:
generate at least one query relevant to eligibility for employment;
receive at least one response to the at least one eligibility query;
render an eligibility determination based on the at least one received eligibility query response; and
use the eligibility determination to decide whether to proceed with operations in furtherance of the application for employment.

16. The non-transitory computer-readable storage medium of claim 14, wherein the instructions further cause the processor to:
generate web page content communicating the at least one generated query;
receive at least one web page submission responsive to the at least one query communicated by the generated web page content; and
process and evaluate the at least one received web page submission.

* * * * *